United States Patent
Akutsu et al.

(10) Patent No.: US 9,759,920 B2
(45) Date of Patent: Sep. 12, 2017

(54) LIGHT REFLECTING MEMBER, LIGHT BEAM EXTENSION DEVICE, IMAGE DISPLAY DEVICE, AND OPTICAL DEVICE

(71) Applicant: Sony Corporation, Tokyo (JP)

(72) Inventors: Katsuyuki Akutsu, Kanagawa (JP); Hirotaka Akao, Tokyo (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 14/604,122

(22) Filed: Jan. 23, 2015

(65) Prior Publication Data

US 2015/0138647 A1    May 21, 2015

Related U.S. Application Data

(63) Continuation of application No. 13/678,604, filed on Nov. 16, 2012, now Pat. No. 8,976,453.

(30) Foreign Application Priority Data

Nov. 30, 2011    (JP) .................. 2011-261282

(51) Int. Cl.
*G02B 27/14* (2006.01)
*G02B 27/01* (2006.01)
(Continued)

(52) U.S. Cl.
CPC ....... *G02B 27/0172* (2013.01); *G02B 6/0018* (2013.01); *G02B 6/0031* (2013.01);
(Continued)

(58) Field of Classification Search
CPC ................................ G02B 27/0172
(Continued)

(56) References Cited

U.S. PATENT DOCUMENTS 5,781,165 A    7/1998   Tabata
7,778,508 B2   8/2010   Hirayama
(Continued)

FOREIGN PATENT DOCUMENTS

CN    1406344 A    3/2003
CN    101589327 A   11/2009
(Continued)

OTHER PUBLICATIONS

U.S. Appl. No. 13/053,697, filed Mar. 22, 2011 Mukawa et al.
(Continued)

*Primary Examiner* — James Jones
(74) *Attorney, Agent, or Firm* — Wolf, Greenfield & Sacks, P.C.

(57) ABSTRACT

An image display device includes an image generating device, a light guide unit which includes a light guide plate and first and second deflection sections, and a light beam extension device which extends light incident from the image generating device, along a Z direction when an incident direction of light incident on the light guide plate is set to be an X direction and a direction of propagation of light in the light guide plate is set to be a Y direction, and emits the light to the light guide unit, wherein the light beam extension device includes a first reflecting mirror on which light from the image generating device is incident, and a second reflecting mirror which emits light incident from the first reflecting mirror to the light guide unit, and each of the first and second reflecting mirrors has a light reflecting surface having a sawtooth-shaped cross-sectional shape.

18 Claims, 42 Drawing Sheets

(51) Int. Cl.
　　　*F21V 8/00*　　　　(2006.01)
　　　*G02B 17/02*　　　(2006.01)
　　　*G02B 17/00*　　　(2006.01)
(52) U.S. Cl.
　　　CPC .......... *G02B 17/006* (2013.01); *G02B 17/02* (2013.01); *G02B 27/0101* (2013.01); *G02B 2027/0125* (2013.01)
(58) Field of Classification Search
　　　USPC ................................................. 359/630–633
　　　See application file for complete search history.

(56) References Cited

U.S. PATENT DOCUMENTS

| | | | |
|---|---|---|---|
| 8,411,134 B2 | 4/2013 | Tomita | |
| 8,570,242 B2 | 10/2013 | Chosokabe et al. | |
| 8,797,433 B2 | 8/2014 | Kaizu et al. | |
| 8,861,090 B2 | 10/2014 | Mukawa | |
| 8,907,865 B2 | 12/2014 | Miyawaki et al. | |
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,164,221 B2 | 10/2015 | Akutsu et al. | |
| 9,201,242 B2 | 12/2015 | Miyawaki et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,569,897 B2 | 2/2017 | Miyawaki et al. | |
| 9,658,456 B2 | 5/2017 | Mukawa | |
| 2010/0128107 A1 | 5/2010 | Tomita | |
| 2011/0019250 A1* | 1/2011 | Aiki | G02B 5/32 359/15 |
| 2011/0164294 A1* | 7/2011 | Shimizu | G02B 27/0172 359/13 |
| 2011/0241975 A1 | 10/2011 | Mukawa et al. | |
| 2011/0248904 A1 | 10/2011 | Miyawaki et al. | |
| 2011/0248905 A1 | 10/2011 | Chosokabe et al. | |
| 2012/0044571 A1 | 2/2012 | Mukawa | |
| 2012/0086623 A1* | 4/2012 | Takagi | G02B 6/0053 345/7 |
| 2012/0127434 A1 | 5/2012 | Sasazaki et al. | |
| 2012/0218426 A1 | 8/2012 | Kaizu et al. | |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0300766 A1 | 11/2013 | Mukawa | |
| 2014/0022284 A1 | 1/2014 | Chosokabe et al. | |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2014/0347252 A1 | 11/2014 | Miyawaki et al. | |
| 2015/0062699 A1 | 3/2015 | Hayashi | |
| 2015/0109679 A1 | 4/2015 | Mukawa et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260994 A1 | 9/2015 | Akutsu et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2016/0154243 A1 | 6/2016 | Aiki | |
| 2017/0069140 A1 | 3/2017 | Mukawa | |
| 2017/0115492 A1 | 4/2017 | Miyawaki et al. | |

FOREIGN PATENT DOCUMENTS

| | | |
|---|---|---|
| CN | 101963703 A | 2/2011 |
| JP | 09-504623 A | 5/1997 |
| JP | 2000-162710 A | 6/2000 |
| JP | 2005-062313 A | 3/2005 |
| JP | 2005-521099 A | 7/2005 |
| JP | 2006-162767 A | 6/2006 |
| JP | 2007-012530 A | 1/2007 |
| JP | 2007-094175 A | 4/2007 |

OTHER PUBLICATIONS

U.S. Appl. No. 13/078,147, filed Apr. 1, 2011 Miyawaki et al.
U.S. Appl. No. 13/677,410, filed Nov. 15, 2012 Akutsu et al.
U.S. Appl. No. 13/678,604, filed Nov. 16, 2012 Akutsu et al.
U.S. Appl. No. 14/458,354, filed Aug. 13, 2014 Miyawaki et al.
U.S. Appl. No. 14/581,037, filed Dec. 23, 2014, Mukawa et al.
U.S. Appl. No. 14/733,700, filed Jun. 8, 2015, Miyawaki et al.
U.S. Appl. No. 14/797,663, filed Jul. 13, 2015, Akutsu et al.
U.S. Appl. No. 13/207,673, filed Aug. 11, 2011, Mukawa.
U.S. Appl. No. 14/337,620, filed Jul. 22, 2014, Mukawa.
U.S. Appl. No. 13/779,008, filed Feb. 27, 2013, Mukawa.
U.S. Appl. No. 13/875,593, filed May 2, 2013, Mukawa.
U.S. Appl. No. 14/370,362, filed Jul. 2, 2014, Machida et al.
U.S. Appl. No. 14/758,818, filed Jul. 1, 2015, Mukawa.
U.S. Appl. No. 14/612,484, filed Feb. 3, 2015, Mukawa.
U.S. Appl. No. 14/612,710, filed Feb. 3, 2015, Mukawa.
U.S. Appl. No. 14/640,437, filed Mar. 6, 2015, Mukawa.
U.S. Appl. No. 14/659,784, filed Mar. 17, 2015, Hirano et al.
U.S. Appl. No. 14/659,943, filed Mar. 17, 2015, Hirano et al.
U.S. Appl. No. 12/624,576, filed Nov. 24, 2009, Tomita.
U.S. Appl. No. 13/399,222, filed Feb. 17, 2012, Kaizu et al.
U.S. Appl. No. 14/326,963, filed Jul. 9, 2014, Kaizu et al.
U.S. Appl. No. 14/422,103, filed Feb. 17, 2015, Takahota et al.
U.S. Appl. No. 14/655,243, filed Jun. 24, 2015, Tanaka et al.
U.S. Appl. No. 14/762,615, filed Jul. 22, 2015, Ato et al.
U.S. Appl. No. 14/781,972, filed Oct. 2, 2015, Tanaka et al.
U.S. Appl. No. 14/782,054, filed Oct. 2, 2015, Tanaka et al.
U.S. Appl. No. 14/889,502, filed Nov. 6, 2015, Takahota et al.
U.S. Appl. No. 14/903,639, filed Jan. 8, 2016, Tanaka et al.

* cited by examiner

FIG. 3A
[FIRST A IMAGINARY PLANE]
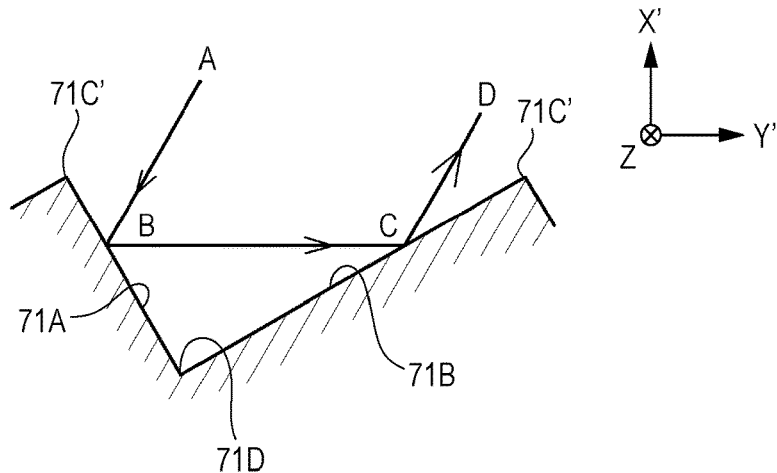
FIG. 3B
[FIRST B IMAGINARY PLANE]
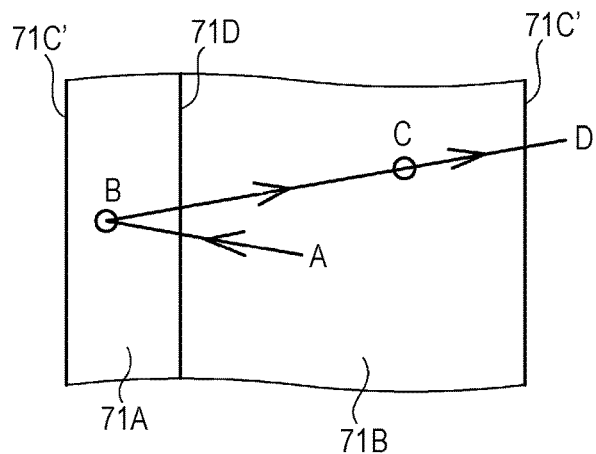
FIG. 3C
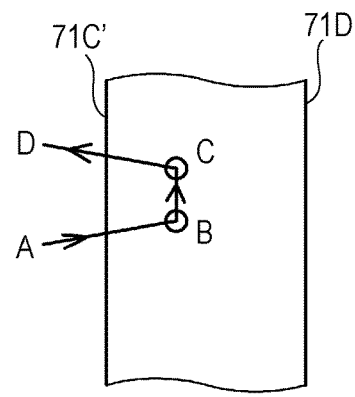
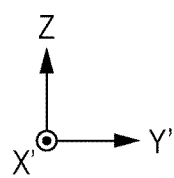
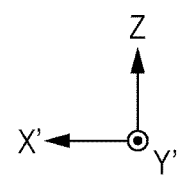

FIG. 4A
[SECOND A IMAGINARY PLANE]
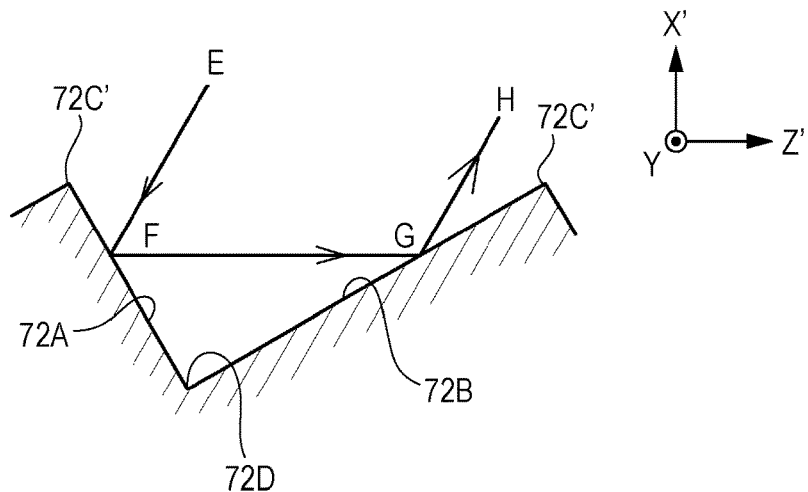
FIG. 4B
[SECOND B IMAGINARY PLANE]
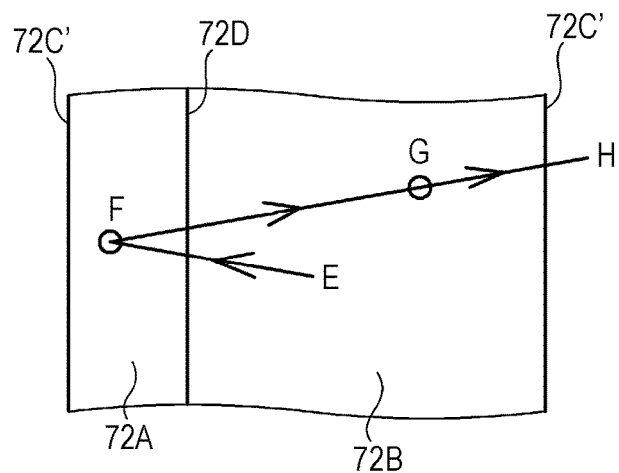
FIG. 4C
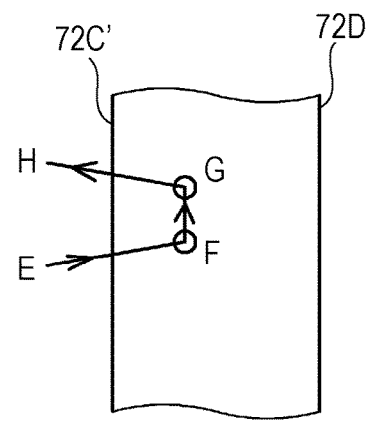
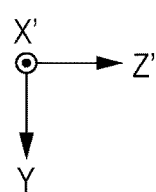
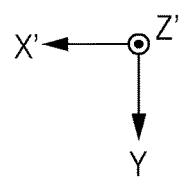

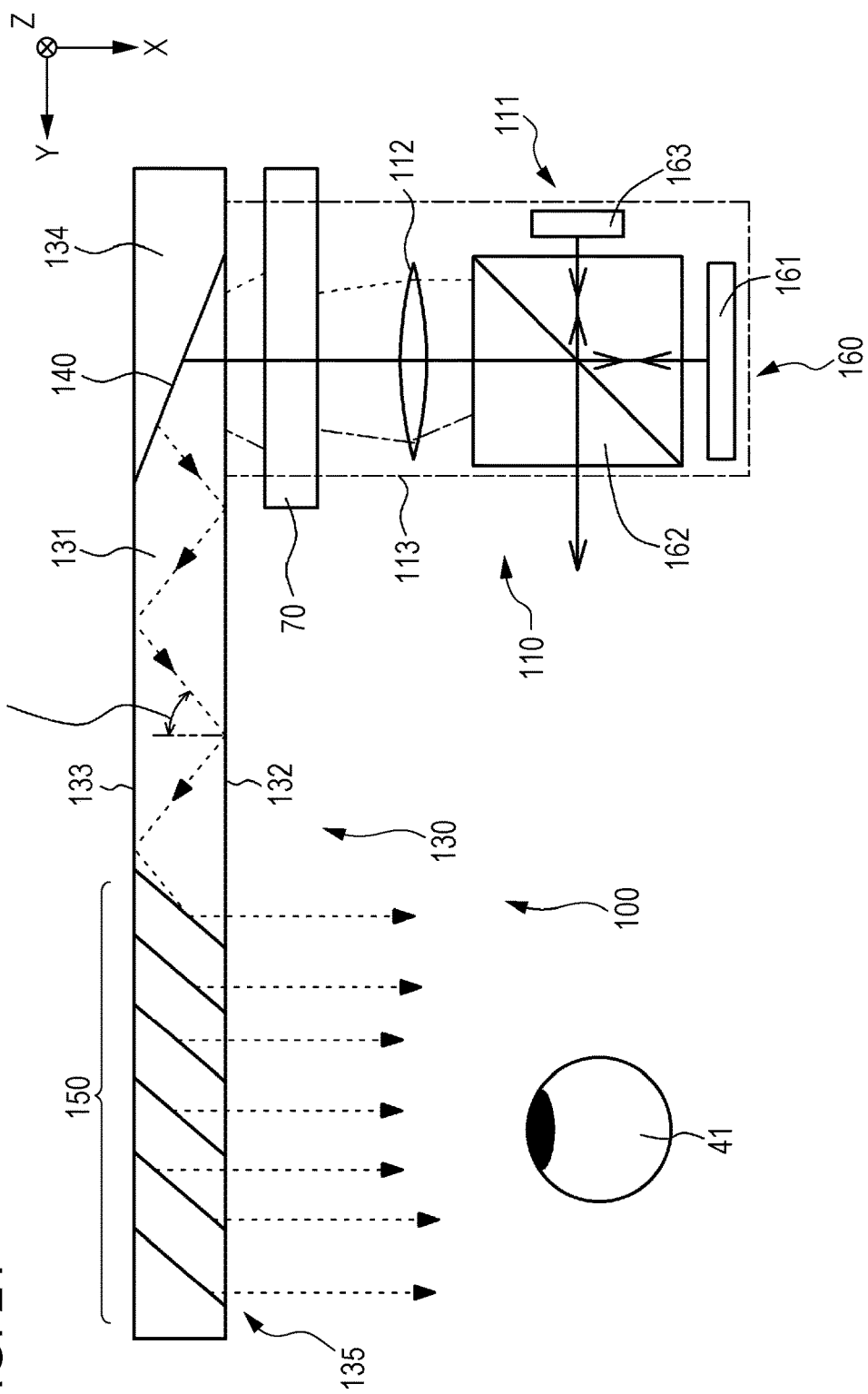

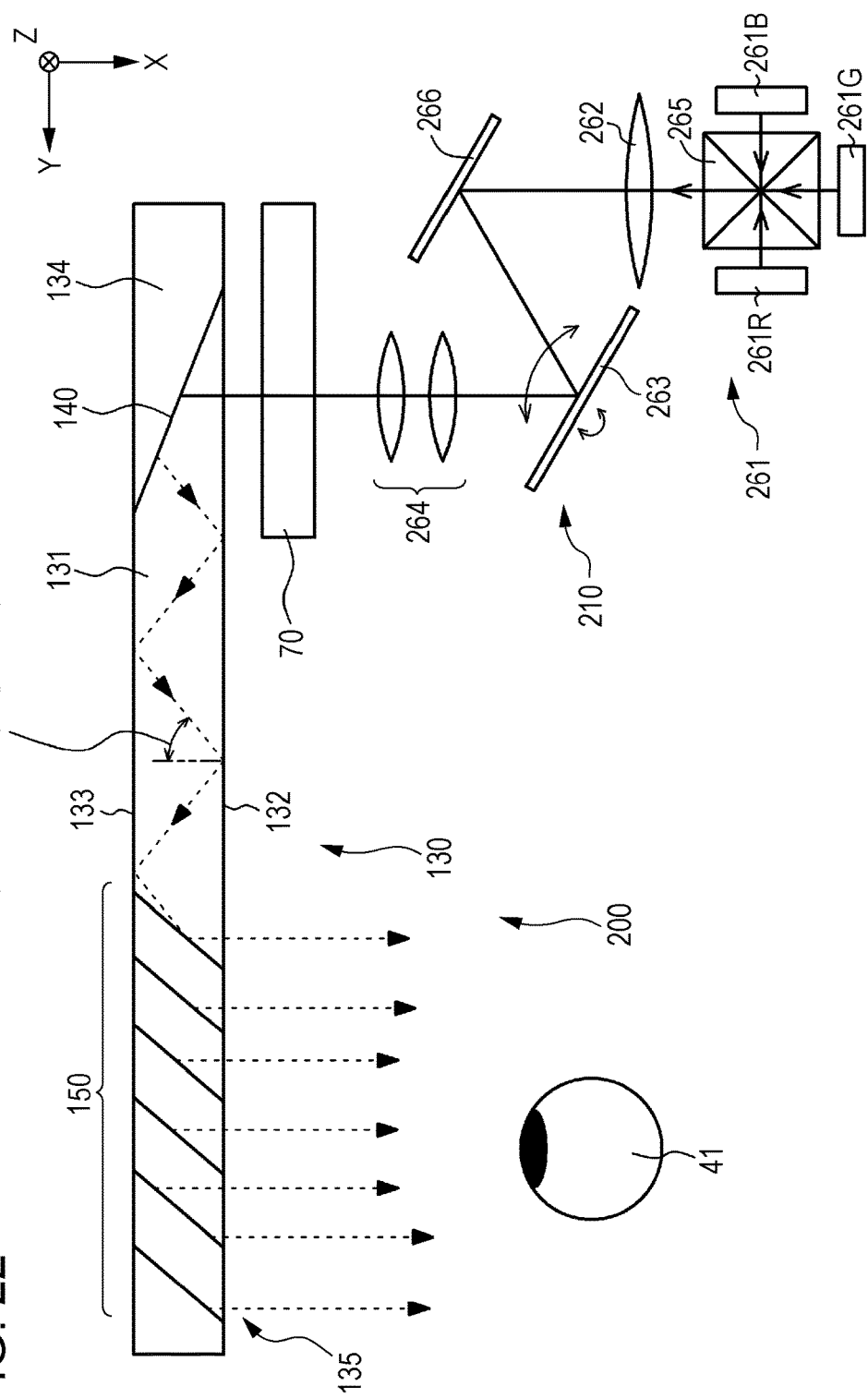

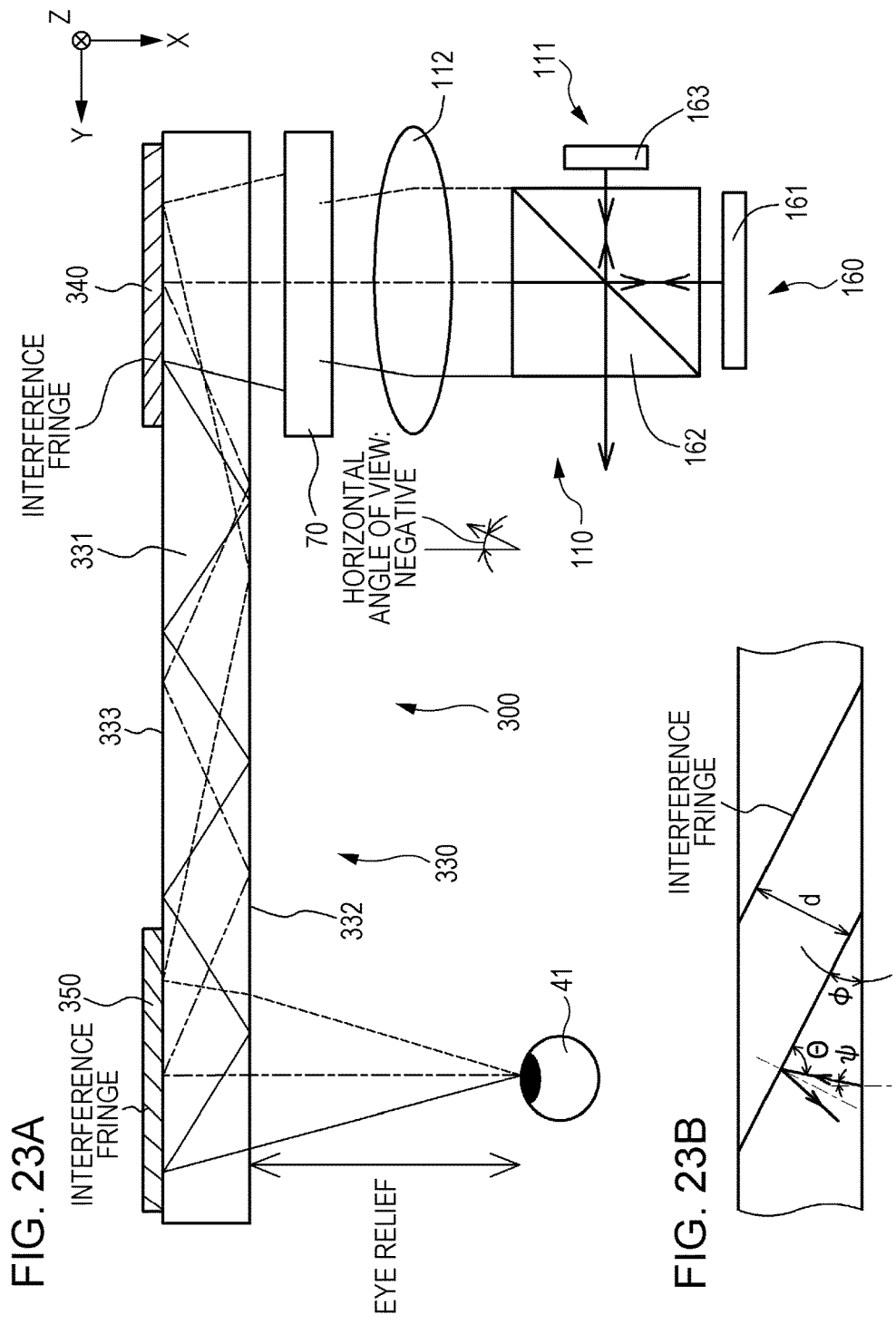

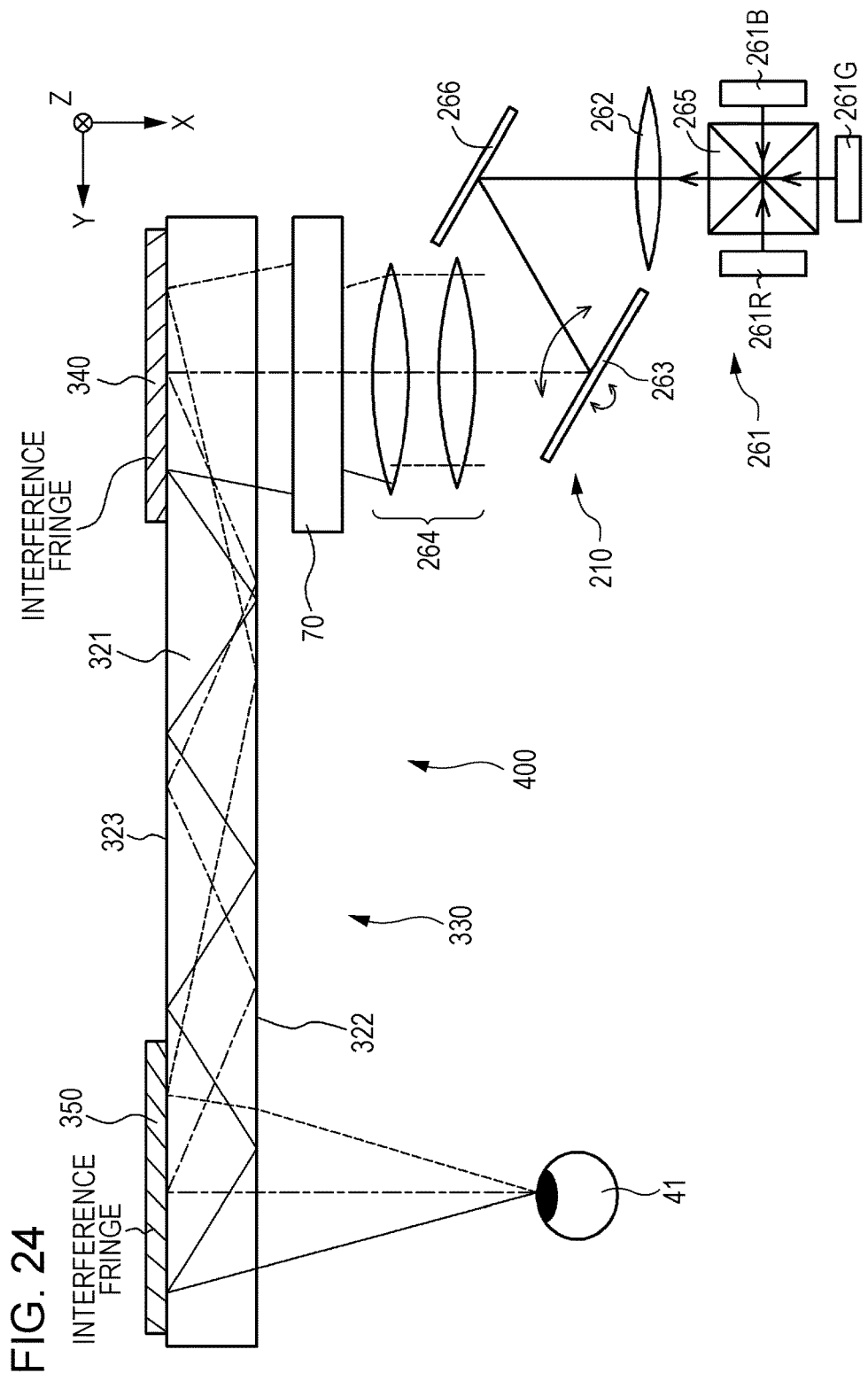

LIGHT REFLECTING MEMBER, LIGHT BEAM EXTENSION DEVICE, IMAGE DISPLAY DEVICE, AND OPTICAL DEVICE

CROSS REFERENCES TO RELATED APPLICATIONS

This application is a continuation of and claims the benefit under 35 U.S.C. §120 of U.S. patent application Ser. No. 13/678,604, titled "LIGHT REFLECTING MEMBER, LIGHT BEAM EXTENSION DEVICE, IMAGE DISPLAY DEVICE, AND OPTICAL DEVICE," filed on Nov. 16, 2012, which claims the benefit under 35 U.S.C. §119 of Japanese Patent Application No. 2011-261282, filed on Nov. 30, 2011, each of which is hereby incorporated by reference in its entirety.

BACKGROUND

The present disclosure relates to a light reflecting member, a light beam extension device with the light reflecting member incorporated therein, an optical device with the light beam extension device incorporated therein, and an image display device with the optical device incorporated therein.

A virtual image display device (an image display device) for making an observer observe a virtual image made by enlarging a two-dimensional image formed by an image forming device by a virtual image optical system is disclosed in, for example, Japanese Unexamined Patent Application Publication (Translation of PCT Application) No. 2005-521099 or Japanese Unexamined Patent Application Publication No. 2006-162767.

As illustrated as a conceptual diagram in FIG. 40, an image display device 1000 includes an image forming device 1011 having a plurality of pixels arranged in the form of a two-dimensional matrix, a collimating optical system 1012 which turns light emitted from the pixels of the image forming device 1011 into collimated light, and a light guide unit 1030 in which light turned into the collimated light by the collimating optical system 1012 is incident thereon, is guided therein, and then emitted therefrom. The light guide unit 1030 includes a light guide plate 1031 in which incident light is propagated by total reflection in the inside and then emitted therefrom, a first deflection section 1040 (constituted by, for example, a single light reflecting film) which reflects light incident on the light guide plate 1031 such that the light incident on the light guide plate 1031 is totally reflected in the inside of the light guide plate 1031, and a second deflection section 1050 (constituted by, for example, a light reflecting multilayer film having a multilayer laminated structure) which emits light propagated by total reflection in the inside of the light guide plate 1031 from the light guide plate 1031. Then, if, for example, a HMD (Head Mounted Display) is constituted using the image display device 1000, a reduction in the weight and a reduction in the size of the device can be attained.

Alternatively, a virtual image display device (an image display device) using a hologram diffraction grating in order to make an observer observe a virtual image made by enlarging a two-dimensional image formed by an image forming device by a virtual image optical system is disclosed in, for example, Japanese Unexamined Patent Application Publication No. 2007-094175 or Japanese Unexamined Patent Application Publication No. 2007-012530.

As illustrated as conceptual diagrams in FIGS. 41 and 42, an image display device 1100 basically includes an image forming device 1111 displaying an image, a collimating optical system 1112, and a virtual image optical system (a light guide unit 1130) on which light displayed on the image forming device 1111 is incident and which guides the light to a pupil 41 of an observer. Here, the light guide unit 1130 includes a light guide plate 1131, and a first diffraction grating member 1140 and a second diffraction grating member 1150 each constituted by a reflection type volume hologram diffraction grating provided at the light guide plate 1131. Then, light emitted from each pixel of the image forming device 1111 is incident on the collimating optical system 1112, and collimated light is created by the collimating optical system 1112 and is incident on the light guide plate 1131. The collimated light is incident and emitted from a first surface 1132 of the light guide plate 1131. On the other hand, the first diffraction grating member 1140 and the second diffraction grating member 1150 are mounted on a second surface 1133 of the light guide plate 1131 which is parallel to the first surface 1132 of the light guide plate 1131.

SUMMARY

Image display light emitted from the image forming device 1111 is turned into parallel pencil groups in which angles of view (that is, emitting angles of lights emitted from the respective pixels of the image forming device 1111) are different from each other at the collimating optical system 1112 in an X-Y plane illustrated in FIG. 41. The parallel pencil groups are turned into luminous flux groups in which angles of view are different from each other in an X-Z plane orthogonal to the above plane, and are incident on the light guide plate 1131. In addition, in FIG. 41, typical parallel pencils in the X-Y plane are represented by parallel pencils $r_1$ (shown by a solid line), $r_2$ (shown by a dashed-dotted line), and $r_3$ (shown by a dotted line), and in FIG. 42, typical parallel pencils in the X-Z plane are represented by parallel pencils $R_1$ (shown by a solid line), $R_2$ (shown by a dashed-dotted line), and $R_3$ (shown by a dotted line).

In the image display device 1100 illustrated, a left-and-right (horizontal) direction is set to be a Y direction and an up-and-down (longitudinal) direction is set to be a Z direction. That is, image display light displaying a picture, a variety of information, or the like is guided from a lateral direction with respect to the pupil 41 of the observer and is then incident on the pupil 41. In addition, in a case where the image display device is applied to the head mounted display (HMD), good observation of an external world becomes possible by disposing the image forming device or the like in the lateral direction in this manner without disposing it on the upper side with respect to the pupil 41.

On the other hand, in such a configuration, since a propagation distance of light which is guided in the inside of the light guide plate 1131 becomes relatively long, problems described below arise.

Here, in the configuration described above, the image display light incident from the first surface 1131 of the light guide plate 1131 is incident on the first diffraction grating member 1140 constituted by a reflection type volume hologram diffraction grating disposed on the second surface 1133 facing the first surface 1132. In addition, the reflection type volume hologram diffraction grating is configured to have an equal interference fringe pitch of a hologram surface regardless of a position.

In light diffracted and reflected by the first diffraction grating member 1140, in the inside of the light guide plate 1131, with respect to an X direction component in the X-Y plane, each of the luminous flux $r_1$, $r_2$, and $r_3$ is guided while repeating total reflection between the first surface 1132 and the second surface 1133 in a state of being a parallel pencil, and advances in the Y direction toward the second diffraction grating member 1150 constituted by a reflection type volume hologram diffraction grating provided at the other end of the light guide plate 1131. Here, since the light guide plate 1131 is thin and as described above, an optical path advancing in the light guide plate 1131 is relatively long, as illustrated in FIG. 41, the number of total reflections up to the second diffraction grating member 1150 is different according to a horizontal angle of view. For this reason, the number of reflections of the collimated light $r_3$ which is incident while being inclined toward the second diffraction grating member 1150 (that is, the horizontal angle of view is positive), among the collimated lights $r_1$, $r_2$, and $r_3$ which are incident on the light guide plate 1131, becomes smaller than the number of reflections of the collimated light $r_1$ which is incident on the light guide plate 1131 at an angle in the opposite direction to that (that is, the horizontal angle of view is negative). That is, since an interference fringe pitch in the hologram surface of the first diffraction grating member 1140 is an equal interval, an emitting angle which is diffracted and reflected in the first diffraction grating member 1140 becomes larger in the collimated light $r_3$ in which the horizontal angle of view is positive than in the collimated light $r_1$ in which the horizontal angle of view is negative. Then, the collimated light having each angle of view incident on the second diffraction grating member 1150 deviates from a total reflection condition due to diffraction and reflection, is emitted from the light guide plate 1131, and is then incident on the pupil 41 of the observer.

In this manner, in an advance direction of the parallel pencil, the number of reflections in the light guide plate 1131 is different according to the horizontal angle of view. That is, an optical path length is different. However, since all the luminous fluxes propagated are parallel pencils, so to speak, luminous flux groups advance so as to be folded. In these luminous flux groups, luminous flux is present which is reflected folded back at a position across an edge portion of the first diffraction grating member 1140 and the second surface 1133, as will be apparent if reverse light ray tracing is performed in the configuration illustrated in FIG. 14 of Japanese Unexamined Patent Application Publication No. 2007-012530. If reverse light ray tracing is performed, a portion (that is, a portion which is reflected by the second surface 1133) of the luminous flux is repeatedly reflected, thereby being diffracted at different positions of the first diffraction grating member 1140, and reaches the collimating optical system 1112. On the other hand, the residual luminous flux is diffracted at an end portion of the first diffraction grating member 1140 and reaches the collimating optical system 1112 as is. That is, although this luminous flux is a parallel pencil having the same angle of view which is emitted from the same pixel, luminous fluxes becomes present which are diffracted and reflected at different portions of the first diffraction grating member 1140 and combined and propagated in the light guide plate 1131.

From the above, the width in the Y direction of necessary luminous flux in such an optical system, that is, the width in the Y direction of an aperture stop is determined at an end point where luminous flux is folded. In the light guide plate 1131, the position of the first diffraction grating member 1140 which diffracts and reflects parallel pencil groups emitted from the collimating optical system 1112 and incident on the light guide plate 1131 becomes the position of the aperture stop in the Y direction.

On the other hand, in the incident lights $R_1$, $R_2$, and $R_3$ having different horizontal angles of view in the X-Z plane, an X direction component is repeatedly reflected in the light guide plate 1131. However, a Z direction component is not reflected and reaches an emitting portion. That is, light emitted from the collimating optical system 1112 is converged in the X-Z plane, is incident on the light guide plate 1131 from the first surface 1132, and then advances in the Y direction in the light guide plate 1131. Then, these luminous fluxes advance while being reflected by the first surface 1132 and the second surface 1133 of the light guide plate 1131 so as to narrow in the Z direction, reach the second diffraction grating member 1150, are reflected and diffracted by the second diffraction grating member 1150, are emitted from the light guide plate 1131, and are incident on the pupil 41 of the observer. In this manner, in the image display device 1100, the width in the Z direction of necessary luminous flux, that is, the width in the Z direction of the aperture stop is determined at the position of the observing pupil 41.

Since the position in the Z direction of the aperture stop is the position of the observing pupil 41, a distance from the collimating optical system 1112 to the position in the Z direction of the aperture stop becomes the sum of a distance of being propagated by repeating total internal reflection in the inside of the light guide plate 1131 and a distance from the light guide plate 1131 to the pupil 41 of the observer and thus becomes a considerably large distance. On the other hand, since the position in the Y direction of the aperture stop is the position of the first diffraction grating member 1140 disposed at the light guide plate 1131, the position can be reduced compared to the position in the Z direction of the aperture stop. In this manner, since the position of the aperture stop is large in the Z direction, it is necessary to set the diameter in the Z direction of the collimating optical system 1112 to be large compared to the diameter in the Y direction.

Further, if the diameter in the Z direction of the aperture stop in the image forming device 1011 or 1111 is set to be large, in an image which is emitted from the image forming device 1011 or 1111, a light ray angle of a peripheral angle of view becomes large and as a result, display contrast in a liquid crystal display device or the like which is used in the image forming device 1011 or 1111 is reduced, causing deterioration in image quality.

The problems described above also similarly arise in the image display device 1000 illustrated in FIG. 40.

Therefore, it is desirable to provide an image display device which is an image display device for making an observer observe a virtual image made by enlarging a two-dimensional image formed by an image forming device by a virtual image optical system and in which it is not necessary to make the diameter of a lens provided in the image forming device large, an optical device suitable to be incorporated in such an image display device, and a light beam extension device suitable to be incorporated in the optical device.

According to a first embodiment or a second embodiment of the present disclosure, there is provided an image display device including:

(A) an image generating device:

(B) a light guide unit in which light from the image generating device is incident thereon, is guided therein, and then emitted toward the pupil of an observer and which includes (B-1) a light guide plate in which incident light is propagated by total reflection in the inside and then emitted therefrom, (B-2) a first deflection section which is disposed at the light guide plate and deflects light incident on the light guide plate such that the light incident on the light guide plate is totally reflected in the inside of the light guide plate, and (B-3) a second deflection section which is disposed at the light guide plate and deflects the light propagated by total reflection in the inside of the light guide plate over multiple times so as to make the light propagated by total reflection in the inside of the light guide plate be emitted from the light guide plate; and (C) a light beam extension device which extends a light beam incident from the image generating device, along a Z direction when an incident direction of light which is incident on the light guide plate is set to be an X direction and a direction of propagation of light in the light guide plate is set to be a Y direction, and then emits the light beam to the light guide unit, wherein the light beam extension device includes a first reflecting mirror on which light from the image generating device is incident, and a second reflecting mirror on which light from the first reflecting mirror is incident and which emits the light to the light guide unit. In addition, the term "total reflection" means total internal reflection or total reflection in the inside of the light guide plate. The same also applies to the following.

According to a third embodiment or a fourth embodiment of the present disclosure, there is provided an image display device including:

(A) an image generating device:

(B) a light guide unit in which light from the image generating device is incident thereon, is guided therein, and then emitted toward the pupil of an observer and which includes (B-1) a light guide plate in which incident light is propagated by total reflection in the inside and then emitted therefrom, (B-2) a first deflection section which is disposed at the light guide plate and deflects light incident on the light guide plate such that the light incident on the light guide plate is totally reflected in the inside of the light guide plate, and (B-3) a second deflection section which is disposed at the light guide plate and deflects the light propagated by total reflection in the inside of the light guide plate over multiple times so as to make the light propagated by total reflection in the inside of the light guide plate be emitted from the light guide plate; and (C) a light beam extension device which extends a light beam incident from the image generating device, along a Z direction when an incident direction of light which is incident on the light guide plate is set to be an X direction and a direction of propagation of light in the light guide plate is set to be a Y direction, and then emits the light beam to the light guide unit, wherein the light beam extension device includes a first reflecting mirror and a second reflecting mirror, the first reflecting mirror is located on the side opposite to the image generating device across the light guide unit (that is, located on the opposite side to the light incidence side of the light guide unit), the second reflecting mirror is located on the image generating device side on the basis of the light guide unit (that is, located on the light incidence side of the light guide unit), and some of the light emitted from the image generating device passes through the light guide plate and the first deflecting section, is reflected by the first reflecting mirror, passes through the light guide plate and the first deflecting section, and is reflected by the second reflecting mirror, and passage of some of the light through the light guide plate and the first deflection section is repeated the predetermined number of times.

According to the first embodiment or the second embodiment of the present disclosure, there is provided an optical device including:

a light guide unit which includes a light guide plate in which light incident from a light source is propagated by total reflection in the inside and then emitted therefrom, a first deflection section which is disposed at the light guide plate and deflects light incident on the light guide plate such that the light incident on the light guide plate is totally reflected in the inside of the light guide plate, and a second deflection section which is disposed at the light guide plate and deflects the light propagated by total reflection in the inside of the light guide plate over multiple times so as to make the light propagated by total reflection in the inside of the light guide plate be emitted from the light guide plate; and a light beam extension device which extends a light beam incident from the light source, along a Z direction when an incident direction of light which is incident on the light guide plate is set to be an X direction and a direction of propagation of light in the light guide plate is set to be a Y direction, and then emits the light beam to the light guide unit, and wherein the light beam extension device includes a first reflecting mirror on which light from the light source is incident, and a second reflecting mirror on which light from the first reflecting mirror is incident and which emits the light to the light guide unit.

According to the first embodiment or the second embodiment of the present disclosure, there is provided a light beam extension device including: a first reflecting mirror which is disposed between a light source and an irradiated surface and on which light from the light source is incident; and a second reflecting mirror on which light from the first reflecting mirror is incident and which emits the light to the irradiated surface.

Then, in the image display device according to the first embodiment or the third embodiment of the present disclosure, the optical device according to the first embodiment of the present disclosure, or the light beam extension device according to the first embodiment of the present disclosure, a light reflecting surface of the first reflecting mirror may have a first A slope and a first B slope which are continuously juxtaposed alternately, and a sawtooth-shaped cross-sectional shape, the top and the base of the first A slope may be parallel and extend in the Z direction (the image display device according to the first embodiment of the present disclosure, the optical device according to the first embodiment of the present disclosure, or the light beam extension device according to the first embodiment of the present disclosure) or the Y direction (the image display device according to the third embodiment of the present disclosure), in a pair of a first A slope and first B slope, an angle formed by the bottom of the first A slope and the bottom of the first B slope may be 90 degrees and the length of the first A slope may be shorter than the length of the first B slope, the height of the first A slope may be constant, when an incidence angle of light on the first reflecting mirror is set to be $\eta_1$ (degrees), an angle of inclination of the first A slope is set to be $\zeta_1$ (degrees), and a direction of an incidence angle of light toward the first A slope side on the basis of the top of the first A slope is set to be a positive direction, a relationship of $2\zeta_1-\eta_1=90\pm10$ (1-1) may be satisfied, a light reflecting surface of the second reflecting mirror may have a second A slope and a second B slope which are continuously juxtaposed alternately, and a sawtooth-shaped cross-sectional shape, the top and the base of the second A slope may be parallel and extend in the Y direction, in a pair of a second A slope and second B slope, an angle formed by the bottom of the second A slope and the bottom of the second B slope may be 90 degrees and the length of the second A slope may be shorter than the length of the second B slope, the height of the second A slope may be constant, and when an incidence angle of light on the second reflecting mirror is set to be $\eta_2$ (degrees), an angle of inclination of the second A slope is set to be $\zeta_2$ (degrees), and a direction of an incidence angle of light toward the second A slope side on the basis of the top of the second A slope is set to be a positive direction, a relationship of $2\eta_2-\eta_2=90\pm10$ (1-2) may be satisfied. In addition, the incidence angle of light on the first reflecting mirror $\eta_1$ and the angle of inclination of the first A slope $\zeta_1$ are angles in an imaginary plane orthogonal to the extending directions of the top and the base of the first A slope, and the incidence angle of light on the second reflecting mirror $\eta_2$ and the angle of inclination of the second A slope $\zeta_2$ are angles in an imaginary plane orthogonal to the extending directions of the top and the base of the second A slope. From the definition that the angle formed by the bottom of the first A slope and the bottom of the first B slope is 90 degrees and the length of the first A slope is shorter than the length of the first B slope, a relationship of $\zeta_1>45$ degrees is obvious, and from the expression (1-1), a relationship of $\eta_1>0$ degrees is also obvious. Similarly, from the definition that the angle formed by the bottom of the second A slope and the bottom of the second B slope is 90 degrees and the length of the second A slope is shorter than the length of the second B slope, a relationship of $\zeta_2>45$ degrees is obvious, and from the expression (1-2), a relationship of $\eta_2>0$ degrees is also obvious.

Further, in the image display device according to the second embodiment or the fourth embodiment of the present disclosure, the optical device according to the second embodiment of the present disclosure, or the light beam extension device according to the second embodiment of the present disclosure, a light reflecting surface of the first reflecting mirror may have a first A slope and a first B slope which are continuously juxtaposed alternately, and a sawtooth-shaped cross-sectional shape, the top and the base of the first A slope may be parallel and extend in the Z direction (the image display device according to the second embodiment of the present disclosure, the optical device according to the second embodiment of the present disclosure, or the light beam extension device according to the second embodiment of the present disclosure) or the Y direction (the image display device according to the fourth embodiment of the present disclosure), in a pair of a first A slope and first B slope, an angle formed by the bottom of the first A slope and the bottom of the first B slope may be 90 degrees and the length of the first A slope may be shorter than the length of the first B slope, the height of the first A slope may be constant, the value of a pitch between the apex of the first A slope and the apex of the first A slope at the center of the first reflecting mirror and the value of a pitch between the apex of the first A slope and the apex of the first A slope at an end portion of the first reflecting mirror may be different from each other, a light reflecting surface of the second reflecting mirror may have a second A slope and a second B slope which are continuously juxtaposed alternately, and a sawtooth-shaped cross-sectional shape, the top and the base of the second A slope may be parallel and extend in the Y direction, in a pair of a second A slope and second B slope, an angle formed by the bottom of the second A slope and the bottom of the second B slope may be 90 degrees and the length of the second A slope may be shorter than the length of the second B slope, the height of the second A slope may be constant, and the value of a pitch between the apex of the second A slope and the apex of the second A slope at the center of the second reflecting mirror and the value of a pitch between the apex of the second A slope and the apex of the second A slope at an end portion of the second reflecting mirror may be different from each other. In addition, as the pitch between the apex of the first A slope and the apex of the first A slope and the pitch between the apex of the second A slope and the apex of the second A slope, a pitch in a range of 0.1 mm to 2 mm may be exemplified.

According to the first embodiment of the present disclosure, there is provided a light reflecting member having a light reflecting surface in which a first slope and a second slope are continuously juxtaposed alternately and a cross-sectional shape is a sawtooth shape, wherein the top and the base of the first slope are parallel, in a pair of a first slope and second slope, an angle formed by the bottom of the first slope and the bottom of the second slope is 90 degrees and the length of the first slope is shorter than the length of the second slope, the height of the first slope is constant, when an incidence angle of light on the light reflecting member is set to be $\eta$ (degrees), an angle of inclination of the first slope is set to be $\zeta$ (degrees), and a direction of an incidence angle of light toward the first slope side on the basis of the top of the first slope is set to be a positive direction, a relationship of $2\lambda-\eta=90\pm10$ (2) is satisfied, and when performing projection on an imaginary plane orthogonal to the extending directions of the top and the base of the first slope, the locus of light which is incident on the first slope and the locus of light which is emitted from the second slope are parallel. In addition, the incidence angle of light on the light reflecting member $\eta$ and the angle of inclination of the first slope $\zeta$ are angles in an imaginary plane orthogonal to the extending directions of the top and the base of the first slope. From the definition that the angle formed by the bottom of the first slope and the bottom of the second slope is 90 degrees and the length of the first slope is shorter than the length of the second slope, a relationship of $\zeta>45$ degrees is obvious, and from the expression (2), a relationship of $\eta>0$ degrees is also obvious.

According to the second embodiment of the present disclosure, there is provided a light reflecting member having a light reflecting surface in which a first slope and a second slope are continuously juxtaposed alternately and a cross-sectional shape is a sawtooth shape, wherein the top and the base of the first slope are parallel, in a pair of a first slope and second slope, an angle formed by the bottom of the first slope and the bottom of the second slope is 90 degrees and the length of the first slope is shorter than the length of the second slope, the height of the first slope is constant, the value of a pitch between the apex of the first slope and the apex of the first slope at the center of the light reflecting member and the value of a pitch between the apex of the first slope and the apex of the first slope at an end portion of the light reflecting member are different from each other, and when performing projection on an imaginary plane orthogonal to the extending directions of the top and the base of the first slope, the locus of light which is incident on the first slope and the locus of light which is emitted from the second slope are parallel. In addition, as the pitch between the apex of the first slope and the apex of the first slope, a pitch in a range of 0.1 mm to 2 mm may be exemplified.

According to a fifth embodiment of the present disclosure, there is provided an image display device including:

an image generating device;

a light guide unit in which light from the image generating device is incident thereon, is guided therein, and then emitted therefrom; and a first reflecting mirror, wherein the first reflecting mirror is disposed in an optical path between the image generating device and the light guide unit, and a cross-section of the first reflecting mirror has at at least one portion thereof a sawtooth shape which is constituted by two sides having different lengths.

In the image display devices according to the first to fourth embodiments of the present disclosure, the optical devices according to the first and second embodiments of the present disclosure, or the light beam extension device according to the first and second embodiments of the present disclosure, the light beam extension device which extends a light beam (luminous flux) along the Z direction and makes the light beam be incident on the light guide unit is provided. Therefore, it is not necessary to set the diameter in the Z direction of an aperture stop in the image generating device to be large and it is not necessary to make the diameter of a lens to be provided in the image generating device large, and thus a reduction in the size and a reduction in the weight of the image display device can be attained and there is also no degradation in display contrast and deterioration in image quality. Further, in the image display devices according to the first to fourth embodiments of the present disclosure, the optical devices according to the first and second embodiments of the present disclosure, the light beam extension device according to the first and second embodiments of the present disclosure, or the light reflecting members according to the first and second embodiments of the present disclosure, since various parameters in the slope of the light reflecting surface or the light reflecting member are defined, light incident on the light beam extension device or the light reflecting member can be efficiently emitted.

BRIEF DESCRIPTION OF THE DRAWINGS

FIGS. 3A to 3C respectively are a schematic partial cross-sectional view of a first reflecting mirror, a schematic partial plan view of the first reflecting mirror, and a schematic partial side view (however, only the behavior of light is illustrated) of the first reflecting mirror.

FIGS. 4A to 4C respectively are a schematic partial cross-sectional view of a second reflecting mirror, a schematic partial plan view of the second reflecting mirror, and a schematic partial side view (however, only the behavior of light is illustrated) of the second reflecting mirror.

FIG. 21 is a conceptual diagram of the image display device of Example 1.

FIG. 22 is a conceptual diagram of an image display device of Example 2.

FIG. 23A is a conceptual diagram of an image display device of Example 3 and FIG. 23B is a schematic cross-sectional view illustrating a portion of as reflection type volume hologram diffraction grating in an enlarged manner.

FIG. 24 is a conceptual diagram of an image display device of Example 4.

DETAILED DESCRIPTION OF EMBODIMENTS

Figure 1A:
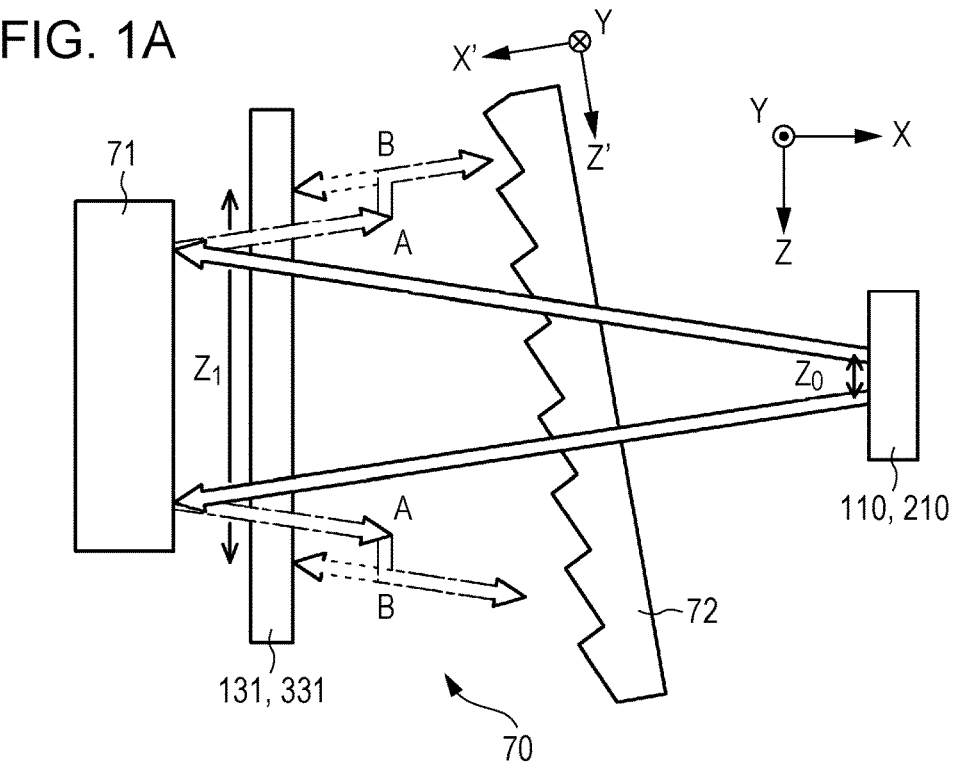
FIGS. 1A and 1B respectively are conceptual diagrams when a light beam extension device of Example 1 is viewed from a Y direction and a Z direction.

Hereinafter, the present disclosure will be described based on examples with reference to the drawings. However, the present disclosure is not limited to the examples and various numerical values or materials in the examples are for exemplification. In addition, description will be performed in the following order.

1. Description relating to the whole of the image display devices according to first to fourth embodiments of the present disclosure, optical devices according to the first and second embodiments of the present disclosure, light beam extension devices according to the first and second embodiments of the present disclosure, and light reflecting members according to the first and second embodiments of the present disclosure, 2. Example 1 (The image display device according to the first embodiment of the present disclosure, the light beam extension device according to the first embodiment of the present disclosure, the optical device according to the first embodiment of the present disclosure, and the light reflecting member according to the first embodiment of the present disclosure), 3. Example 2 (A modification of the image display device of Example 1), 4. Example 3 (Another modification of the image display device of Example 1), 5. Example 4 (A further modification of the image display device of Example 1), 6. Example 5 (The image display device according to the second embodiment of the present disclosure, the light beam extension device according to the second embodiment of the present disclosure, the optical device according to the second embodiment of the present disclosure, and the light reflecting member according to the second embodiment of the present disclosure), 7. Example 6 (The image display devices according to the third and fourth embodiments of the present disclosure), 8. Example 7 (Head mounted display), 9. Example 8 (Modification of the head mounted display), and the others.

Description relating to the whole of the image display devices according to the first to fourth embodiments of the present disclosure, optical devices according to the first and second embodiments of the present disclosure, light beam extension devices according to the first and second embodiments of the present disclosure, and light reflecting members according to the first and second embodiments of the present disclosure In the image display device according to the first embodiment or the second embodiment of the present disclosure, the light beam extension device according to the first embodiment or the second embodiment of the present disclosure, and the optical device according to the first embodiment or the second embodiment of the present disclosure, a form can be adopted in which at least one planar reflecting member is provided between an image generating device and a first reflecting mirror or between a light source and the first reflecting mirror, at least one planar reflecting member is provided between the first reflecting mirror and a second reflecting mirror, and one planar reflecting member provided between the image generating device and the first reflecting mirror or between the light source and the first reflecting mirror doubles as one planar reflecting member provided between the first reflecting mirror and the second reflecting mirror. Then, by adopting such a form, a type of optical path is folded, and thus compacting of the image display device according to the first embodiment or the second embodiment of the present disclosure, the light beam extension device according to the first embodiment or the second embodiment of the present disclosure, and the optical device according to the first embodiment or the second embodiment of the present disclosure can be attained. In addition, a form in which one planar reflecting member provided between the image generating device and the first reflecting mirror or between the light source and the first reflecting mirror and one planar reflecting member provided between the first reflecting mirror and the second reflecting mirror are located in the same plane is also included in a form in which one planar reflecting member provided between the image generating device and the first reflecting mirror or between the light source and the first reflecting mirror doubles as one planar reflecting member provided between the first reflecting mirror and the second reflecting mirror.

In the image display device according to the first embodiment or the second embodiment of the present disclosure, the light beam extension device according to the first embodiment or the second embodiment of the present disclosure, and the optical device according to the first embodiment or the second embodiment of the present disclosure, which include the preferred form described above, a configuration can be adopted in which when performing projection on a first A imaginary plane that is an imaginary plane orthogonal to a Z direction, the locus of light which is incident on the first reflecting mirror from the image generating device (or the light source) and the locus of light which is emitted from the first reflecting mirror are parallel, when performing projection on a first B imaginary plane that is an imaginary plane orthogonal to the normal to the first reflecting mirror, the locus of light which is incident on the first reflecting mirror from the image generating device (or the light source) and the locus of light which is emitted from the first reflecting mirror are symmetrical with respect to the first A imaginary plane, when performing projection on a second A imaginary plane that is an imaginary plane orthogonal to a Y direction, the locus of light which is incident on the second reflecting mirror from the first reflecting mirror and the locus of light which is emitted from the second reflecting mirror are parallel, and when performing projection on a second B imaginary plane that is an imaginary plane orthogonal to the normal to the second reflecting mirror, the locus of light which is incident on the second reflecting mirror from the first reflecting mirror and the locus of light which is emitted from the second reflecting mirror are symmetrical with respect to the second A imaginary plane. Then, in this case, it is preferable to adopt a configuration in which an optical path length of light which is emitted from the center of the image generating device (or the light source) and is incident on the first reflecting mirror and an optical path length of light which is light emitted from the center of the image generating device (or the light source) and is emitted from the first reflecting mirror, is incident on the second reflecting mirror, is emitted from the second reflecting mirror, and is incident on a light guide unit (or an irradiated surface) are equal to each other. In addition, it is preferable to adopt a configuration in which the size along the Y direction of a light beam which is emitted from the image generating device (or the light source) is equal to the size along the Y direction of a light beam which is incident on the light guide unit (or the irradiated surface). In addition, in the preferred configurations described above, a configuration can be adopted in which the size along the Z direction of a light beam which is incident on the light guide unit (or the irradiated surface) is larger than the size along the Z direction of a light beam which is emitted from the image generating device (or the light source), and in addition, a configuration can be adopted in which the size along the Z direction of a light beam which is emitted from the light guide unit is equal to the size along the Z direction of a light beam which is emitted from the image generating device (or the light source). In the image display device according to the third embodiment or the fourth embodiment of the present disclosure, a beam diameter along the Z direction of light which is emitted from the entire light beam extension device is larger than a beam diameter along the Z direction of light which is incident on the light beam extension device.

In the image display devices according to the first to fourth embodiments of the present disclosure, which include the preferred form and configurations described above, a configuration can be adopted in which the image generating device includes (A-1) an image forming device having a plurality of pixels arranged in the form of a two-dimensional matrix, and (A-2) a collimating optical system which turns light emitted from each pixel of the image forming device into collimated light, and light from the collimating optical system is incident on the first reflecting mirror. In addition, for convenience, such an image generating device is referred to as an "image generating device of a first form".

Alternatively, in the image display devices according to the first to fourth embodiments of the present disclosure, which include the preferred form and configurations described above, a configuration can be adopted in which the image generating device includes (A-1) a light source, (A-2) a collimating optical system which turns light emitted from the light source into collimated light, (A-3) a scanning unit which performs scanning with the collimated light emitted from the collimating optical system, and (A-4) a relay optical system which relays the collimated light irradiated from the scanning unit, and light from the relay optical system is incident on the first reflecting mirror. In addition, for convenience, such an image generating device is referred to as an "image generating device of a second form".

In addition, in the image display devices according to the first to fourth embodiments of the present disclosure or the optical devices according to the first and second embodiments of the present disclosure, which include the preferred form and configurations described above, each of a first deflection section and a second deflection section may be constituted by a diffraction grating element, and in addition, the diffraction grating element may be constituted by a reflection type diffraction grating element, and the diffraction grating element may also be constituted by a reflection type volume hologram diffraction grating or a transmission type diffraction grating element, alternatively, a configuration can also be possible in which the diffraction grating element on one side is constituted by a reflection type diffraction grating element and the diffraction grating element on the other side is constituted by a transmission type diffraction grating element. In addition, an arrangement direction of interference fringes in the diffraction grating, that is, a diffraction direction is the Y direction and the interference fringe extends in the Z direction.

Alternatively, in the image display devices according to the first to fourth embodiments of the present disclosure or the optical devices according to the first and second embodiments of the present disclosure, which include the preferred form and configurations described above, a configuration can be adopted in which the first deflection section reflects light incident on a light guide plate and the second deflection section transmits and reflects light propagated by total reflection in the inside of the light guide plate over multiple times. In addition, in this case, a configuration can be adopted in which the first deflection section functions as a reflecting mirror and the second deflection section functions as a semi-transmissive mirror.

In the image display devices according to the first to fourth embodiments of the present disclosure, the light beam extension device according to the first and second embodiments of the present disclosure, the optical devices according to the first and second embodiments of the present disclosure, or the light reflecting member according to the first and second embodiments of the present disclosure (hereinafter, there is a case where they are collectively simply referred to as a "the present disclosure"), which include the preferred form and configurations described above, there is a case where an axis parallel to the X direction is referred to as an "X axis" for convenience, an axis parallel to the Y direction is referred to as a "Y axis" for convenience, and an axis parallel to the Z direction is referred to as a "Z axis" for convenience. In the light beam extension device, the X direction (the X axis), the Y direction (the Y axis), and the Z direction (the Z axis) may be determined on the basis of the X direction, the Y direction, and the Z direction in the light guide plate. That is, in a case where an incident direction of light when light is incident on the light beam extension device from a certain direction, is emitted from the light beam extension device, and is incident on the light guide plate is set to be an "A direction", each of a direction in which light is incident on the light beam extension device, a direction of light in the inside of the light beam extension device, and a direction of light which is emitted from the light beam extension device is set to be the "A direction". Further, the normal direction of the first reflecting mirror is referred to as an "X' axis", and an axis orthogonal to the X' axis and the Z axis is referred to as a "Y' axis". In addition, the normal direction of the second reflecting mirror is referred to as the "X' axis", and an axis orthogonal to the X' axis and the Y axis is referred to as a "Z' axis".

In the present disclosure, the cross-sectional shape of a light reflecting surface of the first reflecting mirror is a shape when it is assumed that the light reflecting surface of the first reflecting mirror is cut in a first A imaginary plane, and the cross-sectional shape of a light reflecting surface of the second reflecting mirror is a shape when it is assumed that the light reflecting surface of the second reflecting mirror is cut in a second A imaginary plane. Each of the first reflecting mirror and the second reflecting mirror is also referred to as a reversal mirror.

An angle $\theta_1$ formed by the bottom of a first A slope and the bottom of a first B slope when it is assumed that the light reflecting surface of the first reflecting mirror is cut in the first A imaginary plane is 90 degrees, and an angle $\theta_1'$ formed by a top portion of the first A slope and a top portion of the first B slope is 90 degrees or an acute angle or an obtuse angle. Similarly, an angle $\theta_2$ formed by the bottom of a second A slope and the bottom of a second B slope when it is assumed that the light reflecting surface of the second reflecting mirror is cut in the second A imaginary plane is 90 degrees, and an angle $\theta_2'$ formed by a top portion of the second A slope and a top portion of the second B slope is 90 degrees or an acute angle or an obtuse angle.

The shape of an imaginary triangle (included in the first A imaginary plane) which is formed by the top of the first A slope (referred to as a "first A slope-A"), the top of the first A slope (referred to as a "first A slope-B") adjacent to the first A slope-A, and the base of the first A slope-A is basically a right-angled triangle (for convenience, referred to as a "first imaginary right-angled triangle") in which the lengths of adjacent sides are different from each other. Further, the shape of an imaginary triangle (included in the second A imaginary plane) which is formed by the top of the second A slope (referred to as a "second A slope-A"), the top of the second A slope (referred to as a "second A slope-B") adjacent to the second A slope-A, and the base of the second A slope-A is basically a right-angled triangle (for convenience, referred to as a "second imaginary right-angled triangle") in which the lengths of adjacent sides are different from each other.

That is, when viewing the cross-sectional shape of the first reflecting mirror, the first imaginary right-angled triangles having the same shape may also be arranged along the Y' axis. Or, the first imaginary right-angled triangles having different shapes may also be arranged along the Y' axis. Specifically, a configuration can be adopted in which when an incidence angle of light on a central area of the first reflecting mirror is set to be $\eta_{10\text{-}in}$, in a central area of a light reflecting surface, the first imaginary right-angled triangles (however, right-angled scalene triangles having an angle of inclination $\zeta_{10}$) are arranged, and in an area (for convenience, referred to as a "first area") of the light reflecting surface in which an incidence angle of light is $\eta_{11\text{-}in}$ ($>\eta_{10\text{-}in}$), the first imaginary right-angled triangles (however, right-angled scalene triangles having an angle of inclination of $\zeta_{11}>\zeta_{10}$) are arranged, and in an area (for convenience, referred to as a "second area") of the light reflecting surface in which an incidence angle of light is $\eta_{12\text{-}in}$ ($<\eta_{10\text{-}in}$), the first imaginary right-angled triangles (however, right-angled scalene triangles having an angle of inclination of $\zeta_{12}<\zeta_{10}$) are arranged. Alternatively, for example, a configuration can be adopted in which the first imaginary right-angled triangles (however, right-angled isosceles triangles) are arranged in the central area (an incidence angle of light is $\eta_{10\text{-}in}$) of the light reflecting surface, light having an incidence angle of $\eta_{11\text{-}in}$ ($>\eta_{10\text{-}in}$) (however, positive and negative signs of an angle are different) is incident on areas (for convenience, referred to as a "third area" and a "fourth area") on both sides of the central area of the light reflecting surface, and in the third area and the fourth area, the first imaginary right-angled triangles (however, right-angled scalene triangles) are arranged symmetrically on the basis of the central area. In addition, in a single first imaginary right-angled triangle, a longer adjacent side is located on the central area side of the light reflecting member. The values of angles of inclination $\zeta_{10}$, $\zeta_{11}$, and $\zeta_{12}$ may also be different for each first imaginary right-angled triangle, and a configuration in which the values of the angle of inclination are set to be the same value in the desired number of first imaginary right-angled triangles (that is, a configuration in which the light reflecting surface is divided into a plurality of areas, the values of the angle of inclination $\zeta$ in the first imaginary right-angled triangles which are included in each area are set to be the same, and the values of the angle of inclination $\zeta$ in the first imaginary right-angled triangles which are included in different areas are set to be different) can also be adopted. In the latter case, it is acceptable if the incidence angle of light which is incident on a central portion of each of a plurality of areas in the light reflecting surface is set to be $\eta_1$.

In addition, the expression "the first imaginary right-angled triangles having different shapes are arranged along the Y' axis" is equivalent to the expression "the value of a pitch between the apex of the first A slope and the apex of the first A slope at the center of the first reflecting mirror and the value of a pitch between the apex of the first A slope and the apex of the first A slope at an end portion of the first reflecting mirror are different from each other". That is, when an incidence angle of light on the central area of the first reflecting mirror is set to be $\eta_{10\text{-}in}$ and a pitch in the central area of the light reflecting surface is set to be $P_{10}$, a pitch $P_{11}$ in the area (the first area) of the light reflecting surface in which an incidence angle of light is $\eta_{11\text{-}in}$ ($>\eta_{10\text{-}in}$) is $P_{11}>P_{10}$ and a pitch $P_{12}$ in the area (the second area) of the light reflecting surface in which an incidence angle of light is $\eta_{12\text{-}in}$ ($>\eta_{10\text{-}n}$) is $P_{12}<P_{10}$. Alternatively, for example, a configuration can be adopted in which when a pitch in the central area (an incidence angle of light is $\eta_{10\text{-}in}$) of the light reflecting surface is set to be $P_{10}$, in the areas (the third area and the fourth area) on both sides of the central area of the light reflecting surface in which an incidence angle of light is $\eta_{11\text{-}in}$ ($>\eta_{10\text{-}in}$), the first imaginary right-angled triangles (however, right-angled scalene triangles) are arranged symmetrically on the basis of the central area at a pitch $P_{11}$ ($>P_{10}$). The value of a pitch P may also be different for each first imaginary right-angled triangle, and a configuration in which the values of the pitches are set to be the same value in the desired number of first imaginary right-angled triangles (that is, a configuration in which the light reflecting surface is divided into a plurality of areas, the values of the angle of inclination $\zeta$ in the first imaginary right-angled triangles which are included in each area are set to be the same, and the values of the angle of inclination $\zeta$ in the first imaginary right-angled triangles which are included in different areas are set to be different) can also be adopted.

Similarly, when viewing the cross-sectional shape of the second reflecting mirror, the second imaginary right-angled triangles having the same shape may also be arranged along the Z' axis. Or, the second imaginary right-angled triangles having different shapes may also be arranged along the Z' axis. Specifically, a configuration can be adopted in which when an incidence angle of light on a central area of the second reflecting mirror is set to be $\eta_{20\text{-}in}$, in a central area of a light reflecting surface, the second imaginary right-angled triangles (however, right-angled scalene triangles having an angle of inclination $\zeta_{20}$) are arranged, and in an area (a first area) of the light reflecting surface in which an incidence angle of light is $\eta_{21\text{-}in}$ ($>\eta_{20\text{-}in}$), the second imaginary right-angled triangles (however, right-angled scalene triangles having an angle of inclination of $\zeta_{21}>\zeta_{20}$) are arranged, and in an area (a second area) of the light reflecting surface in which an incidence angle of light is $\eta_{22\text{-}in}$ ($<\eta_{20\text{-}in}$), the second imaginary right-angled triangles (however, right-angled scalene triangles having an angle of inclination of $\zeta_{22}<\zeta_{20}$) are arranged. Alternatively, for example, a configuration can be adopted in which the second imaginary right-angled triangles (however, right-angled isosceles triangles) are arranged in the central area (an incidence angle of light is $\eta_{20\text{-}in}$) of the light reflecting surface, light having an incidence angle of $\eta_{21\text{-}in}$ ($>\eta_{20\text{-}in}$) (however, positive and negative signs of an angle are different) is incident on areas (a third area and a fourth area) on both sides of the central area of the light reflecting surface, and in the third area and the fourth area, the second imaginary right-angled triangles (however, right-angled scalene triangles) are arranged symmetrically on the basis of the central area. In addition, in a single second imaginary right-angled triangle, a longer adjacent side is located on the central area side of the light reflecting surface. The values of angles of inclination $\zeta_{20}$, $\zeta_{21}$, and $\zeta_{22}$ may also be different for each second imaginary right-angled triangle, and a configuration in which the values of the angle of inclination are set to be the same value in the desired number of second imaginary right-angled triangles (that is, a configuration in which the light reflecting surface is divided into a plurality of areas, the values of the angle of inclination $\zeta$ in the second imaginary right-angled triangles which are included in each area are set to be the same, and the values of the angle of inclination $\zeta$ in the second imaginary right-angled triangles which are included in different areas are set to be different) can also be adopted. In the latter case, it is acceptable if the incidence angle of light which is incident on a central portion of each of a plurality of areas in the light reflecting surface is set to be $\zeta_2$.

In addition, the expression "the second imaginary right-angled triangles having different shapes are arranged along the Z' axis" is equivalent to the expression "the value of a pitch between the apex of the second A slope and the apex of the second A slope at the center of the second reflecting mirror and the value of a pitch between the apex of the second A slope and the apex of the second A slope at an end portion of the second reflecting mirror are different from each other". That is, when an incidence angle of light on the central area of the second reflecting mirror is set to be $\eta_{20\text{-}in}$ and a pitch in the central area of the light reflecting surface is set to be $P_{20}$, a pitch $P_{21}$ in the area (the first area) of the light reflecting surface in which an incidence angle of light is $\eta_{21\text{-}in}$ ($>\eta_{20\text{-}in}$) is $P_{21}>P_{20}$, and a pitch $P_{22}$ in the area (the second area) of the light reflecting surface in which an incidence angle of light is $\eta_{22\text{-}in}$ ($<\eta_{20\text{-}in}$) is $P_{22}<P_{20}$. Alternatively, for example, a configuration can be adopted in which when a pitch in the central area (an incidence angle of light is $\eta_{20\text{-}in}$) of the light reflecting surface is set to be $P_{20}$, in the areas (the third area and the fourth area) on both sides of the central area of the light reflecting surface in which an incidence angle of light is $\eta_{21\text{-}in}$ ($>\eta_{20\text{-}in}$) the second imaginary right-angled triangles (however, right-angled scalene triangles) are arranged symmetrically on the basis of the central area at a pitch $P_{21}$ ($>P_{20}$). The value of a pitch P may also be different for each second imaginary right-angled triangle, and a configuration in which the values of the pitches are set to be the same value in the desired number of second imaginary right-angled triangles (that is, a configuration in which the light reflecting surface is divided into a plurality of areas, the values of the angle of inclination $\zeta$ in the second imaginary right-angled triangles which are included in each area are set to be the same, and the values of the angle of inclination $\zeta$ in the second imaginary right-angled triangles which are included in different areas are set to be different) can also be adopted.

Further, in the light reflecting members according to the first and second embodiment of the present disclosure, the cross-sectional shape of the light reflecting member refers to a shape when it is assumed that the light reflecting member is cut in an imaginary plane (for convenience, referred to as a "third imaginary plane") orthogonal to a direction in which the top and the base of the first slope extend. The light reflecting member is also referred to as a reversal mirror. An angle $\theta_0$ formed by the bottom of the first slope and the bottom of the second slope when it is assumed that the light reflecting member is cut in the third imaginary plane is 90 degrees, and an angle $\theta_0'$ formed by a top portion of the first slope and a top portion of the second slope is 90 degrees or an acute angle or an obtuse angle. The shape of an imaginary triangle (included in the third imaginary plane) which is formed by the top of the first slope (referred to as a "first slope-A"), the top of the first slope (referred to as a "first slope-B") adjacent to the first slope-A, and the base of the first slope-A is basically a right-angled triangle (for convenience, referred to as a "third imaginary right-angled triangle") in which the lengths of adjacent sides are different from each other. That is, the third imaginary right-angled triangles having the same shape may also be arranged along a direction orthogonal to a direction in which the top and the base of the first slope extend. Alternatively, the third imaginary right-angled triangles having different shapes may also be arranged. Specifically, a configuration can be adopted in which when an incidence angle of light on a central area of the light reflecting member is set to be $\eta_{00\text{-}in}$, in a central area of the light reflecting member, the third imaginary right-angled triangles (however, right-angled scalene triangles having an angle of inclination $\zeta_{00}$) are arranged, and in an area (a first area) of the light reflecting member in which an incidence angle of light is $\eta_{01\text{-}in}$ ($>\eta_{00\text{-}in}$), the third imaginary right-angled triangles (however, right-angled scalene triangles having an angle of inclination of $\zeta_{01}>\zeta_{00}$) are arranged, and in an area (a second area) of the light reflecting member in which an incidence angle of light is $\eta_{02\text{-}in}$ ($<\eta_{00\text{-}in}$), the third imaginary right-angled triangles (however, right-angled scalene triangles having an angle of inclination of $\zeta_{02}<\zeta_{00}$) are arranged. Alternatively, for example, a configuration can be adopted in which the third imaginary right-angled triangles (however, right-angled isosceles triangles) are arranged in the central area (an incidence angle of light is $\eta_{00\text{-}in}$) of the light reflecting member, light having an incidence angle of $\eta_{21\text{-}in}$ ($>\eta_{20\text{-}in}$) (however, positive and negative signs of an angle are different) is incident on areas (a third area and a fourth area) on both sides of the central area of the light reflecting member, and in the third area and the fourth area, the third imaginary right-angled triangles (however, right-angled scalene triangles) are arranged symmetrically on the basis of the central area. In addition, in a single third imaginary right-angled triangle, a longer adjacent side is located on the central area side of the light reflecting surface. The values of angles of inclination $\zeta_{00}$, $\zeta_{01}$, and $\zeta_{02}$ may also be different for each third imaginary right-angled triangle, and a configuration in which the values of the angle of inclination are set to be the same value in the desired number of third imaginary right-angled triangles (that is, a configuration in which the light reflecting member is divided into a plurality of areas, the values of the angle of inclination $\zeta$ in the third imaginary right-angled triangles which are included in each area are set to be the same, and the values of the angle of inclination $\zeta$ in the third imaginary right-angled triangles which are included in different areas are set to be different) can also be adopted. In the latter case, it is acceptable if the incidence angle of light which is incident on a central portion of each of a plurality of areas in the light reflecting member is set to be $\eta$.

In addition, the expression "the third imaginary right-angled triangles having different shapes are arranged" is equivalent to the expression "the value of a pitch between the apex of the first slope and the apex of the first slope at the center of the light reflecting member and the value of a pitch between the apex of the first slope and the apex of the first slope at an end portion of the light reflecting member are different from each other". That is, when an incidence angle of light on the central area of the light reflecting member is set to be $\eta_{00\text{-}in}$ and a pitch in the central area of the light reflecting member is set to be $P_{00}$, a pitch $P_{01}$ in the area (the first area) of the light reflecting member in which an incidence angle of light is $\eta_{01\text{-}in}$ ($>\eta_{00\text{-}in}$) is $P_{01}>P_{00}$ and a pitch $P_{02}$ in the area (the second area) of the light reflecting member in which an incidence angle of light is $\eta_{02\text{-}in}$ ($<\eta_{00\text{-}in}$) is $P_{02}<P_{00}$. Alternatively, for example, a configuration can be adopted in which when a pitch in the central area (an incidence angle of light is $\eta_{00\text{-}in}$) of the light reflecting member is set to be $P_{00}$, in the areas (the third area and the fourth area) on both sides of the central area of the light reflecting member in which an incidence angle of light is $\eta_{01\text{-}in}$ ($>\eta_{00\text{-}in}$), the third imaginary right-angled triangles (however, right-angled scalene triangles) are arranged symmetrically on the basis of the central area at a pitch $P_{01}$ ($>P_{00}$). The value of a pitch P may also be different for each third imaginary right-angled triangle, and a configuration in which the values of the pitches are set to be the same value in the desired number of third imaginary right-angled triangles (that is, a configuration in which the light reflecting member is divided into a plurality of areas, the values of the angle of inclination $\zeta$ in the third imaginary right-angled triangles which are included in each area are set to be the same, and the values of the angle of inclination $\zeta$ in the third imaginary right-angled triangles which are included in different areas are set to be different) can also be adopted.

Light incident on the first reflecting mirror collides with the first A slope, is reflected by the first A slope, collides with the first B slope facing the first A slope, is reflected by the first B slope, and then emitted from the first reflecting mirror. Alternatively, light incident on the first reflecting mirror collides with the first B slope, is reflected by the first B slope, collides with the first A slope facing the first B slope, is reflected by the first A slope, and then emitted from the first reflecting mirror. Similarly, light incident on the second reflecting mirror collides with the second A slope, is reflected by the second A slope, collides with the second B slope facing the second A slope, is reflected by the second B slope, and then emitted from the second reflecting mirror. Alternatively, light incident on the second reflecting mirror collides with the second B slope, is reflected by the second B slope, collides with the second A slope facing the second B slope, is reflected by the second A slope, and then emitted from the second reflecting mirror. Further, light incident on the light reflecting member collides with the first slope, is reflected by the first slope, collides with the second slope facing the first slope, is reflected by the second slope, and then emitted from the light reflecting member. Alternatively, light incident on the light reflecting member collides with the second slope, is reflected by the second slope, collides with the first slope facing the second slope, is reflected by the first slope, and then emitted from the light reflecting member.

As an image forming device in the image generating device of the first form, for example, an image forming device which includes a reflection type spatial light modulation device and a light source; an image forming device which includes a transmission type spatial light modulation device and a light source; or an image forming device which includes a light-emitting element such as an organic EL (Electro Luminescence), an inorganic El, or a light-emitting diode (LED) can be given. However, among them, the image forming device which includes a reflection type spatial light modulation device and a light source is preferable. As the spatial light modulation device, a light valve, for example, a transmission type or reflection type liquid crystal display device such as an LCOS (Liquid Crystal On Silicon), or a digital micromirror device (DMD) can be given, and as the light source, a light-emitting element can be given. In addition, the reflection type spatial light modulation device can be constituted to include a liquid crystal display device and a polarization beam splitter which reflects some of the light from a light source, guides the light to the liquid crystal display device, passes some of the light reflected by the liquid crystal display device therethrough, and then guides the light to a collimating optical system. As a light-emitting element constituting the light source, a red light-emitting element, a green light-emitting element, a blue light-emitting element, or a white light-emitting element can be given. As the light-emitting element, for example, a semiconductor laser element, a solid-state laser, or an LED can be exemplified. The number of pixels may also be determined based on the specifications desired for an image forming device, and as the specific value of the number of pixels, 320×240, 432×240, 640×480, 854×480, 1024×768, or 1920×1080 can be exemplified. The collimating optical system has a function to convert position information of a pixel into angular information in an optical system of a light guide unit. As the collimating optical system, an optical system can be exemplified in which a convex lens, a concave lens, a free-form surface prism, or a hologram lens is used solely or these elements are used in combination so as to have positive optical power as a whole.

On the other hand, as the light source in the image generating device of the second form, a light-emitting element can be given, and specifically, a red light-emitting element, a green light-emitting element, a blue light-emitting element, or a white light-emitting element can be given. As the light-emitting element, for example, a semiconductor laser element, a solid-state laser, or an LED can be exemplified. The number of pixels (virtual pixels) in the image display device of the second form may also be determined based on the specifications desired for an image display device, and as the specific value of the number of pixels (virtual pixels), 320×240, 432×240, 640×480, 854×480, 1024×768, or 1920×1080 can be exemplified. Further, in a case where the light source is constituted by a red light-emitting element, a green light-emitting element, and a blue light-emitting element, it is preferable to perform color composition by using, for example, a cross prism. As the scanning unit, for example, MEMS (Micro Electro Mechanical Systems) having a micromirror rotatable in a two-dimensional direction or a galvanometer mirror which performs horizontal scanning and vertical scanning with light emitted from a light source can be given. The relay optical system may also be constituted by an existing relay optical system.

As the image forming device or the light source constituted by, for example, the light-emitting element and the light valve, the following configurations can be exemplified in addition to the combination of a backlight which emits white light as a whole with a liquid crystal display device having a red light-emitting pixel, a green light-emitting pixel, and a blue light-emitting pixel.

Image Forming Apparatus-A

An image forming device-A includes (α) a first image forming device which includes a first light-emitting panel in which first light-emitting elements emitting blue are arranged in the form of a two-dimensional matrix, (β) a second image forming device which includes a second light-emitting panel in which second light-emitting elements emitting green are arranged in the form of a two-dimensional matrix, (γ) a third image forming device which includes a third light-emitting panel in which third light-emitting elements emitting red are arranged in the form of a two-dimensional matrix, and (δ) a unit (for example, a dichroic prism, the same also applies to the following description) collecting lights emitted from the first image forming device, the second image forming device, and the third image forming device into a single optical path, and controls the luminescent/non-luminescent states of each of the first light-emitting element, the second light-emitting element, and the third light-emitting element.

Image Forming Apparatus-B

An image forming device-B includes (α) a first image forming device which includes a first light-emitting element emitting blue and a first light passage control device (a type of light valve, constituted by, for example, a liquid crystal display device, a digital micromirror device (DMD), or an LCOS, the same also applies to the following description) for controlling passage/non-passage of emitted light emitted from the first light-emitting element emitting blue, (β) a second image forming device which includes a second light-emitting element emitting green and a second light passage control device (a light valve) for controlling passage/non-passage of emitted light emitted from the second light-emitting element emitting green, (γ) a third image forming device which includes a third light-emitting element emitting red and a third light passage control device (a light valve) for controlling passage/non-passage of emitted light emitted from the third light-emitting element emitting red, and (δ) a unit collecting lights passed through the first light passage control device, the second light passage control device, and the third light passage control device into a single optical path, and displays an image by controlling passage/non-passage of emitted lights emitted from the light-emitting elements by the light passage control devices. As a unit (a light guide member) guiding the emitted light emitted from each of the first light-emitting element, the second light-emitting element, and the third light-emitting element to the light passage control device, a light guide member, a microlens array, a mirror, a reflective plate, a condensing lens can be exemplified.

Image Forming Apparatus-C

An image forming device-C includes (α) a first image forming device which includes a first light-emitting panel in which first light-emitting elements emitting blue are arranged in the form of a two-dimensional matrix, and a blue light passage control device (a light valve) for controlling passage/non-passage of emitted light emitted from the first light-emitting element, (β) a second image forming device which includes a second light-emitting panel in which second light-emitting elements emitting green are arranged in the form of a two-dimensional matrix, and a green light passage control device (a light valve) for controlling passage/non-passage of emitted light emitted from the second light-emitting element, (γ) a third image forming device which includes a third light-emitting panel in which third light-emitting elements emitting red are arranged in the form of a two-dimensional matrix, and a red light passage control device (a light valve) for controlling passage/non-passage of emitted light emitted from the third light-emitting element, and (δ) a unit collecting lights passed through the blue light passage control device, the green light passage control device, and the red light passage control device into a single optical path, and displays an image by controlling passage/non-passage of emitted lights emitted from the first light-emitting panel, the second light-emitting panel, and the third light-emitting panel by the light passage control devices (light valves).

Image Forming Apparatus-D

An image forming device-D is a field sequential type color display image forming device and includes (α) a first image forming device which includes a first light-emitting element emitting blue, (β) a second image forming device which includes a second light-emitting element emitting green, (γ) a third image forming device which includes a third light-emitting element emitting red, (δ) a unit collecting lights emitted from the first image forming device, the second image forming device, and the third image forming device into a single optical path, and (∈) a light passage control device (a light valve) for controlling passage/non-passage of light emitted from the unit collecting lights into a single optical path, and displays an image by controlling passage/non-passage of emitted lights emitted from the light-emitting elements by the light passage control device.

Image Forming Apparatus-E

An image forming device-E is also a field sequential type color display image forming device and includes (α) a first image forming device which includes a first light-emitting panel in which first light-emitting elements emitting blue are arranged in the form of a two-dimensional matrix, (β) a second image forming device which includes a second light-emitting panel in which second light-emitting elements emitting green are arranged in the form of a two-dimensional matrix, (γ) a third image forming device which includes a third light-emitting panel in which third light-emitting elements emitting red are arranged in the form of a two-dimensional matrix, (δ) a unit collecting light emitted from each of the first image forming device, the second image forming device, and the third image forming device into a single optical path, and (∈) a light passage control device (a light valve) for controlling passage/non-passage of light emitted from the unit collecting lights into a single optical path, and displays an image by controlling passage/non-passage of emitted lights emitted from the light-emitting panel by the light passage control device.

Image Forming Apparatus-F

An image forming device-F is a passive matrix type or active matrix type color display image forming device which displays an image by controlling the luminescence/non-luminescence states of each of a first light-emitting element, a second light-emitting element, and a third light-emitting element.

Image Forming Apparatus-G

An image forming device-G is a field sequential type color display image forming device which includes a light passage control device (a light valve) for controlling passage/non-passage of emitted light from light-emitting element units arranged in the form of a two-dimensional matrix, controls the luminescence/non-luminescence states of each of a first light-emitting element, a second light-emitting element, and a third light-emitting element in the light-emitting element units in a time-sharing manner, and displays an image by controlling passage/non-passage of emitted lights emitted from the first light-emitting element, the second light-emitting element, and the third light-emitting element by a light passage control device.

In the preferred configuration in the image generating device of the first form or the second form, as described above, the first deflection section functions as a reflecting mirror and the second deflection section functions as a semi-transmissive mirror. In such a form, the first deflection section is made of, for example, metal including alloy and can be constituted by a light reflecting film (a type of mirror) which reflects light incident on the light guide plate, or a diffraction grating (for example, a hologram diffraction grating film) which diffracts light incident on the light guide plate. Further, the second deflection section can be constituted by, for example, a dielectric multilayer film, a half mirror, polarization beam splitter, or a hologram diffraction grating film. Then, the first deflection section or the second deflection section is disposed in the inside of the light guide plate (incorporated in the inside of the light guide plate). However, in the first deflection section, collimated light incident on the light guide plate is reflected or diffracted such that the collimated light incident on the light guide plate is totally reflected in the inside of the light guide plate. On the other hand, in the second deflection section, the collimated light propagated by total reflection in the inside of the light guide plate is reflected or diffracted over multiple times and then emitted from the light guide plate in a state of being collimated light. On the light reflecting surface of a reflecting mirror constituting the light beam extension device, a light reflecting layer made of, for example, metal including alloy is formed.

Alternatively, in the preferred configuration in the image generating device of the first form or the second form, as described above, each of the first deflection section and the second deflection section is constituted by, for example, a reflection type diffraction grating element, specifically, for example, a reflection type volume hologram diffraction grating. In addition, there is a case where the first deflection section constituted by a reflection type volume hologram diffraction grating is referred to as a "first diffraction grating member" for convenience and the second deflection section constituted by a reflection type volume hologram diffraction grating is referred to as a "second diffraction grating member" for convenience.

Here, in order to make the first diffraction grating member or the second diffraction grating member correspond to diffraction and reflection of P kinds (for example, P=3, three kinds of colors, red, green, and blue) of light having different P kinds of wavelength bands (or wavelengths), the first diffraction grating member or the second diffraction grating member can have a configuration in which P layers of diffraction grating layers each constituted by a reflection type volume hologram diffraction grating are laminated. Interference fringes corresponding to one kind of wavelength band (or wavelength) are formed in each diffraction grating layer. Alternatively, a configuration is also acceptable in which in order to correspond to diffraction and reflection of P kinds of lights having different P kinds of wavelength bands (or wavelengths), P kinds of interference fringes are formed in the first or second diffraction grating member constituted by a single diffraction grating layer. Alternatively, a configuration is also acceptable in which an angle of view is trisected, for example, and the first diffraction grating member or the second diffraction grating member is constituted by laminating diffraction grating layers each corresponding to each angle of view. Then, by adopting such a configuration, an increase in diffraction efficiency, an increase in diffraction acceptance angle, and optimization of a diffraction angle when light having each wavelength band (wavelength) is diffracted and reflected in the first diffraction grating member or the second diffraction grating member can be attained.

As a material constituting each of the first diffraction grating member or the second diffraction grating member, a photopolymer material can be given. The constituent materials or the basic structures of the first diffraction grating member and the second diffraction grating member each constituted by a reflection type volume hologram diffraction grating may also be the same as the constituent material or structure of a reflection type volume hologram diffraction grating in the related art. The reflection type volume hologram diffraction grating means a hologram diffraction grating which diffracts and reflects only +1st order diffraction light. In the diffraction grating member, interference fringes are formed over the surface from the inside thereof. However, a method of forming the interference fringe itself may also be the same as a forming method in the related art. Specifically, for example, it is acceptable if a member (for example, a photopolymer material) constituting a diffraction grating member is irradiated with object light from a first predetermined direction on one side and at the same time, the member constituting a diffraction grating member is irradiated with reference light from a second predetermined direction on the other side, and an interference fringe which is formed by the object light and the reference light is recorded in the inside of the member constituting a diffraction grating member. By appropriately selecting the first predetermined direction, the second predetermined direction, and the wavelengths of the object light and the reference light, it is possible to obtain a desired pitch of the interference fringe and a desired angle of inclination (slant angle) of the interference fringe in the surface of the diffraction grating member. The angle of inclination (the slant angle) of the interference fringe means an angle formed by the surface of the diffraction grating member (or a diffraction grating layer) and the interference fringe. In a case where each of the first diffraction grating member and the second diffraction grating member is constituted by a laminated structure of P layers of diffraction grating layers each constituted by a reflection type volume hologram diffraction grating, the lamination of such diffraction grating layers may also be made by separately fabricating each of the P layers of diffraction grating layers and then laminating (bonding) the P layers of diffraction grating layers by using, for example, an ultraviolet cure adhesive. Further, the P layers of diffraction grating layers may also be fabricated by fabricating a single diffraction grating layer by using a photopolymer material having adherence, and then sequentially pasting photopolymer materials having adherence onto the diffraction grating layer, thereby fabricating diffraction grating layers.

In the image generating device of the first form or the second form, light turned into a plurality of collimated lights by a collimating optical system or a relay optical system is incident on the light guide plate. However, a request to use such collimated lights is based on it being necessary to retain light wavefront information when these lights are incident on the light guide plate, even after emission from the light guide plate through the first deflection section and the second deflection section. In addition, in order to generate a plurality of collimated lights, specifically, it is acceptable if a light emitting section of an image forming device is located, for example, at a place (a position) of a focal length in the collimating optical system or the relay optical system. The collimating optical system has a function to convert position information of a pixel into angular information in an optical system of the optical device.

In the image display device, the light guide plate has two parallel surfaces (a first surface and a second surface) extending parallel to a direction of propagation of light (a Y direction) by total internal reflection in the light guide plate. When a surface of the light guide plate on which light is incident is set to be an incidence plane of the light guide plate and a surface of the light guide plate from which light is emitted is set to be an emission plane of the light guide plate, the incidence plane of the light guide plate and the emission plane of the light guide plate may also be constituted by the first surface and a configuration is also acceptable in which the incidence plane of the light guide plate is constituted by the first surface and the emission plane of the light guide plate is constituted by the second surface.

As a material constituting the light guide plate, glass including optical glass such as quartz glass or BK7, a plastic material (for example, PMMA, polycarbonate resin, acrylic resin, amorphous polypropylene-based resin, or styrene-based resin including AS resin) can be given. The shape of the light guide plate is not limited to a flat plate and may also have a curved shape.

For example, a head mounted display (HMD) can be constituted by using the image display device according to any of the embodiments of the present disclosure, and thus it becomes possible to attain reductions in the weight and the size of the device and to significantly reduce a feeling of discomfort at the time of mounting of the device and it also becomes possible to attain a reduction in manufacturing cost.

The head mounted display includes (A) a glasses-type frame which is mounted on the head of an observer, and (B) the image display device according to any of the embodiments of the present disclosure. The head mounted display may be provided with a single image display device according to any of the embodiments of the present disclosure (a monocular type) or may also be provided with two image display device according to any of the embodiments of the present disclosure (a binocular type).

The frame includes a front section which is disposed in front of the observer, two temple sections mounted on both ends of the front section through hinges so as to be able to be turned, and an end cover section mounted on a tip end portion of each of the temple sections and is provided with a nose pad. When viewing the entirety of the head mounted display, an assembly of the frame and the nose pad has approximately the same structure as normal glasses except that there is no rim. A material constituting the frame can be the same material as a material constituting normal glasses, such as metal, alloy, plastic, or a combination of these. The nose pad can also have an existing configuration and structure.

Then, from the standpoint of design of the head mounted display or ease of mounting of the head mounted display, it is preferable to adopt a form in which wiring (a signal line, a power line, or the like) from one or two image generating devices passes through the insides of the temple section and the end cover section, extends from a tip end portion of the end cover section to the outside, and is connected to an external circuit (a control circuit). In addition, it is more preferable to adopt a form in which each image generating device is provided with a headphone section and a wiring for a headphone section from each image generating device passes through the insides of the temple section and the end cover section and extends from a tip end portion of the end cover section to the headphone section. As the headphone section, for example, an inner ear type headphone section or a canal type headphone section can be given. It is preferable to adopt a form in which the wiring for a headphone section more specifically extends from the tip end portion of the end cover section to the headphone section so as to wrap around the back side of the auricle (the external ear).

In the head mounted display, a form can be adopted in which an imaging device is mounted on a central portion of the front section. The imaging device is specifically constituted by a solid-state image sensing device which includes, for example, a CCD or a CMOS sensor, and a lens. A wiring from the imaging device may pass, for example, the back side of the front section and be connected to the image display device on one side, and may also be included in a wiring extending from the image generating device.

In a case where the head mounted display is of a binocular type, it is preferable to adopt a configuration in which the light guide unit is disposed further to the center side of the face of the observer than the image generating device as a whole, a coupling member coupling the two image display devices together is further provided, the coupling member is mounted on the side facing the observer of a central portion of the frame, which is located between the two pupils of the observer, and a projected image of the coupling member is included in a projected image of the frame.

In this manner, by adopting a structure in which the coupling member is mounted on the central portion of the frame, which is located between the two pupils of the observer, a structure in which the image display device is directly mounted on the frame is not made. Therefore, a state is created where when the observer mounts the frame on the head, the temple sections extend toward the outside, and as a result, even if the frame is deformed, displacement (position change) of the image generating device or the light guide unit due to such deformation of the frame does not occur, and even if the displacement occurs, it is a very small degree. Therefore, a change in an angle of convergence of left and right images can be reliably prevented. In addition, since it is not necessary to increase the rigidity of the front section of the frame, an increase in weight of the frame, a decrease in designability, and an increase in cost are not caused. Further, since the image display device is not directly mounted on the glasses-type frame, it is possible to freely choose the design, the color, and the like of the frame according to observer's preference, a restriction against the design of the frame is also small, and the degree of freedom in the design is high. In addition, the coupling member is disposed between the observer and the frame and the projected image of the coupling member is included in the projected image of the frame. In other words, when the head mounted display is viewed from the front of the observer, the coupling member is hidden by the frame. Therefore, high designability and design property can be provided to the head mounted display.

In addition, it is preferable to adopt a configuration in which the coupling member is mounted on the side facing the observer of the central portion (equivalent to a bridge portion in normal glasses) of the front section, which is located between the two pupils of the observer.

Two image display devices are coupled together by the coupling member. However, specifically, a form can be adopted in which the image generating device is mounted on each end portion of the coupling member in a manner of being able to adjust a mounting state. Then, in this case, it is preferable to adopt a configuration in which each image generating device is located further to the outside than the pupil of the observer. In addition, in such a configuration, when the distance between a mounting portion center of the image generating device on one side and one end portion (an end-piece on one side) of the frame is set to be $\alpha$, the distance from the center of the coupling member to the one end portion (the end-piece on one side) of the frame is set to be $\beta$, the distance between a mounting portion center of the image generating device on the other side and the one end portion (the end-piece on one side) of the frame is set to be $\gamma$, and the length of the frame is set to be L, it is preferable to satisfy relationships of $0.01 \times L \leq \alpha \leq 0.30 \times L$, preferably, $0.05 \times L \leq \alpha \leq 0.25 \times L$, $0.35 \times L \leq \beta \leq 00.65 \times L$, preferably, $0.45 \times L \leq \beta \leq 0.55 \times L$, and $0.70 \times L \leq \gamma \leq 0.99 \times L$, preferably, $0.75 \times L \leq \gamma \leq 0.95 \times L$. The mounting of the image generating device on each end portion of the coupling member is specifically performed, for example, by providing through-holes in three places in each end portion of the coupling member, providing screwing portions corresponding to the through-holes in the image generating device, and screwing a screw in the screwing portion provided in the image generating device through each through-hole. A spring is inserted between the screw and the screwing portion. In this way, a mounting state of the image generating device (inclination of the image generating device with respect to the coupling member) can be adjusted according to a tightening state of the screw.

Here, the mounting portion center of the image generating device refers to a bisection point along the direction of an axis of the frame of a portion where a projected image of the image generating device which is obtained when projecting the image generating device and the frame on an imaginary plane overlaps a projected image of the frame in a state where the image generating device is mounted on the coupling member. Further, the center of the coupling member refers to a bisection point along the direction of an axis of the frame of a portion where the coupling member is in contact with the frame in a state where the coupling member is mounted on the frame. The length of the frame is the length of the projected image of the frame in a case where the frame is curved. In addition, a projection direction is a direction perpendicular to the face of the observer.

Alternatively, although two image display device are coupled together by the coupling member, specifically, a form is also acceptable in which the coupling member couples two light guide units together. In addition, there is a case where two light guide units are integrally fabricated, and in such a case, the coupling member is mounted on the integrally fabricated light guide unit. However, such a form is also included in a form in which the coupling member couples two light guide units together. When the distance between the center of the image generating device on one side and one end portion of the frame is set to be $\alpha'$ and the distance between the center of the image generating device on the other side and the one end portion of the frame is set to be $\gamma'$, it is preferable that the values of $\alpha'$ and $\gamma'$ are also the same as the values of $\alpha$ and $\gamma$ described above. In addition, the center of the image generating device refers to a bisection point along the direction of an axis of the frame of a portion where a projected image of the image generating device which is obtained when projecting the image generating device and the frame on an imaginary plane overlaps a projected image of the frame in a state where the image generating device is mounted on the light guide unit.

The shape of the coupling member is substantially arbitrary as long as a projected image of the coupling member is included in a projected image of the frame, and for example, a rod shape or an elongated plate shape can be exemplified. As a material constituting the coupling member, metal, alloy, plastic, or a combination of these can be given.

EXAMPLE 1

Example 1 relates to the light reflecting member according to the first embodiment of the present disclosure, the optical device according to the first embodiment of the present disclosure, the light beam extension device according to the first embodiment of the present disclosure, and the image display device according to the first embodiment of the present disclosure.

Figure 1B:
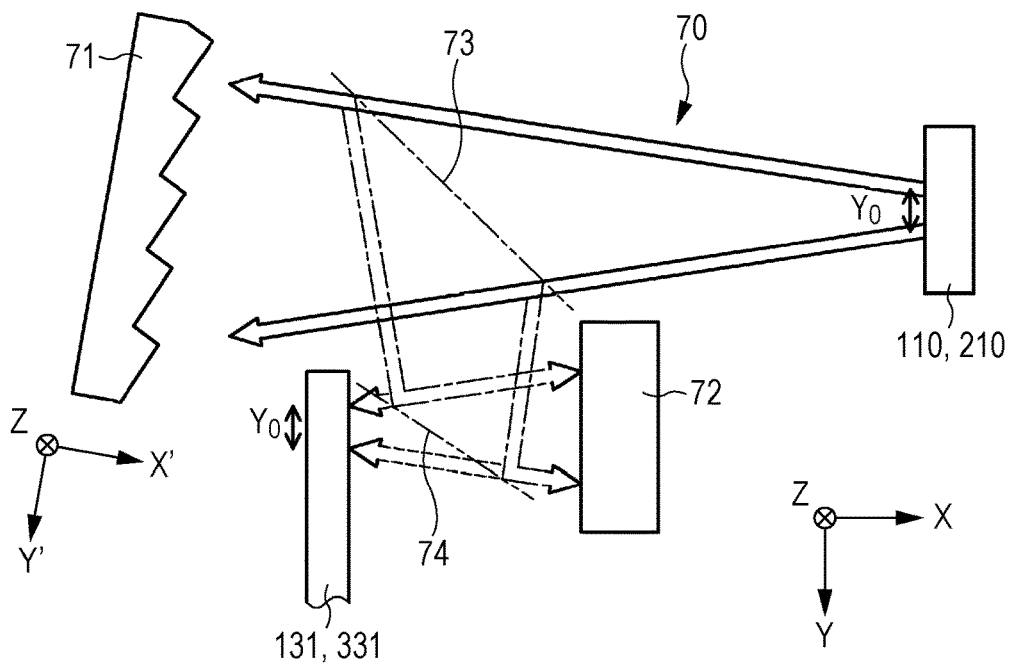
Figure 2A:
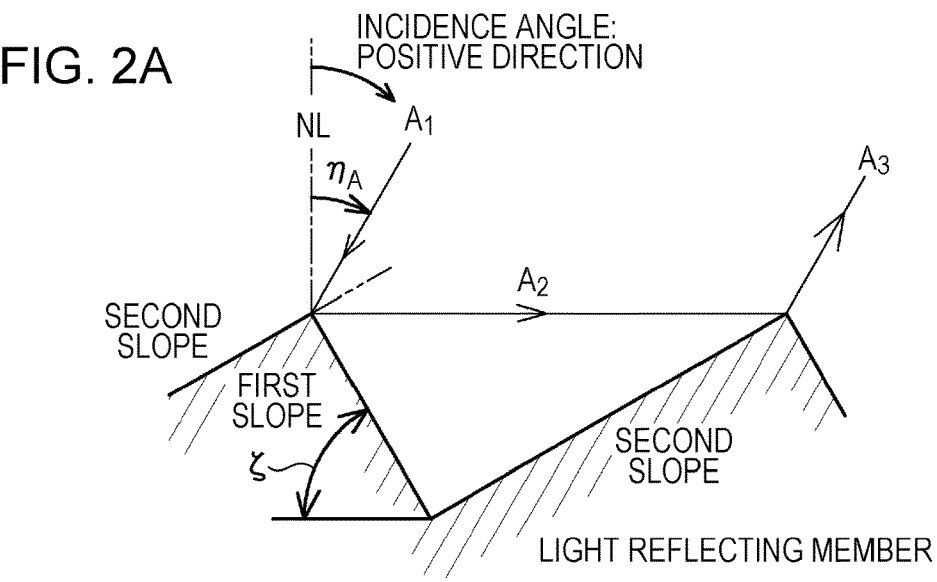
FIGS. 2A to 2C are diagrams illustrating the behavior of incident light and emitted light in a light reflecting member according to an embodiment of the present disclosure.
Figure 2B:
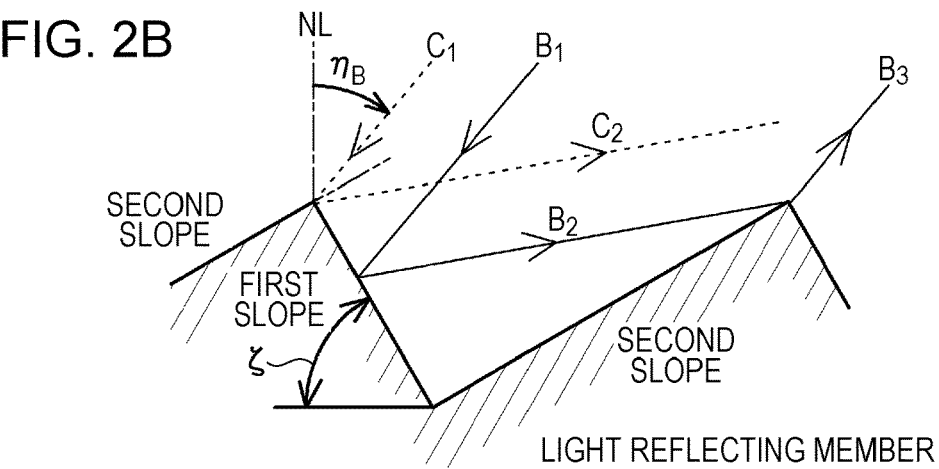
Figure 2C:
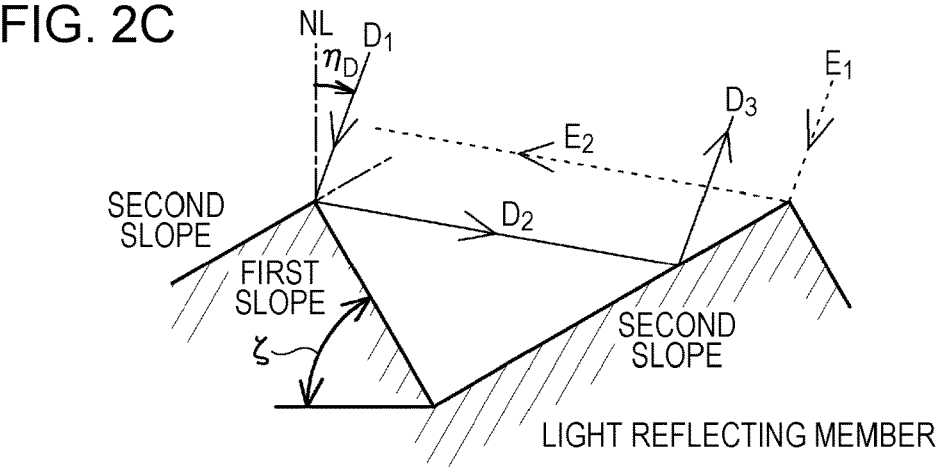
Figure 5A:
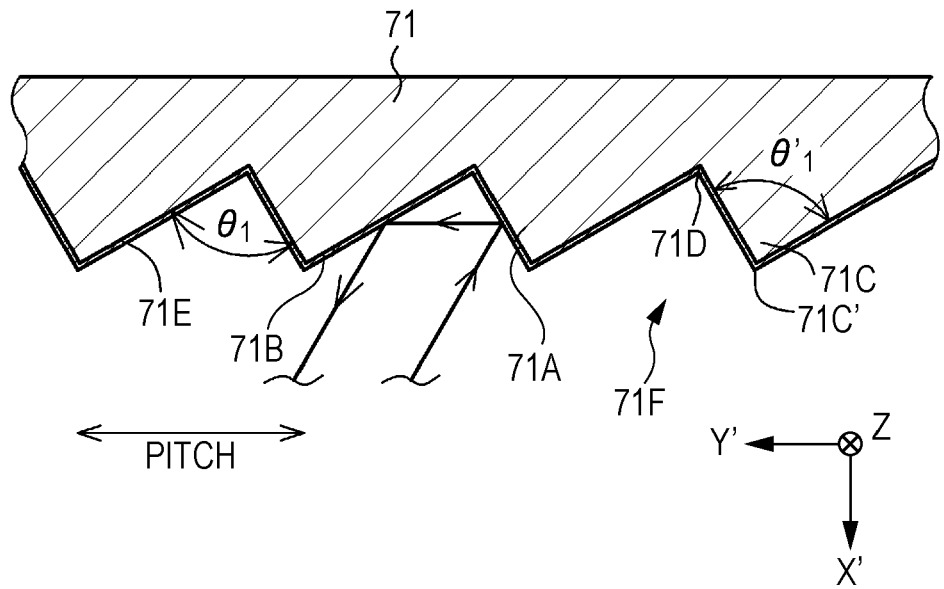
FIGS. 5A and 5B respectively are schematic partial cross-sectional views of the first and second reflecting mirrors.
Figure 5B:
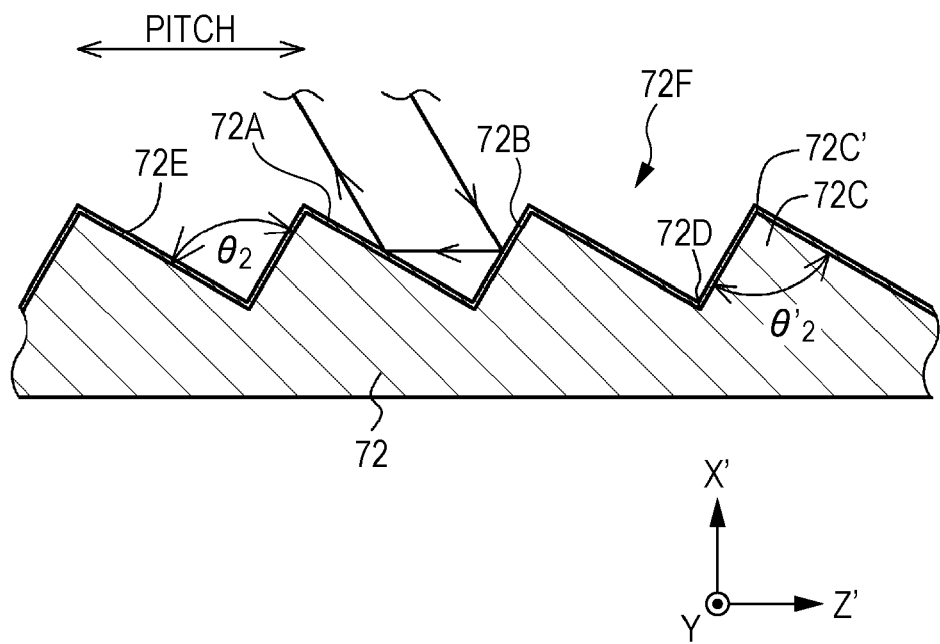
Figure 6:
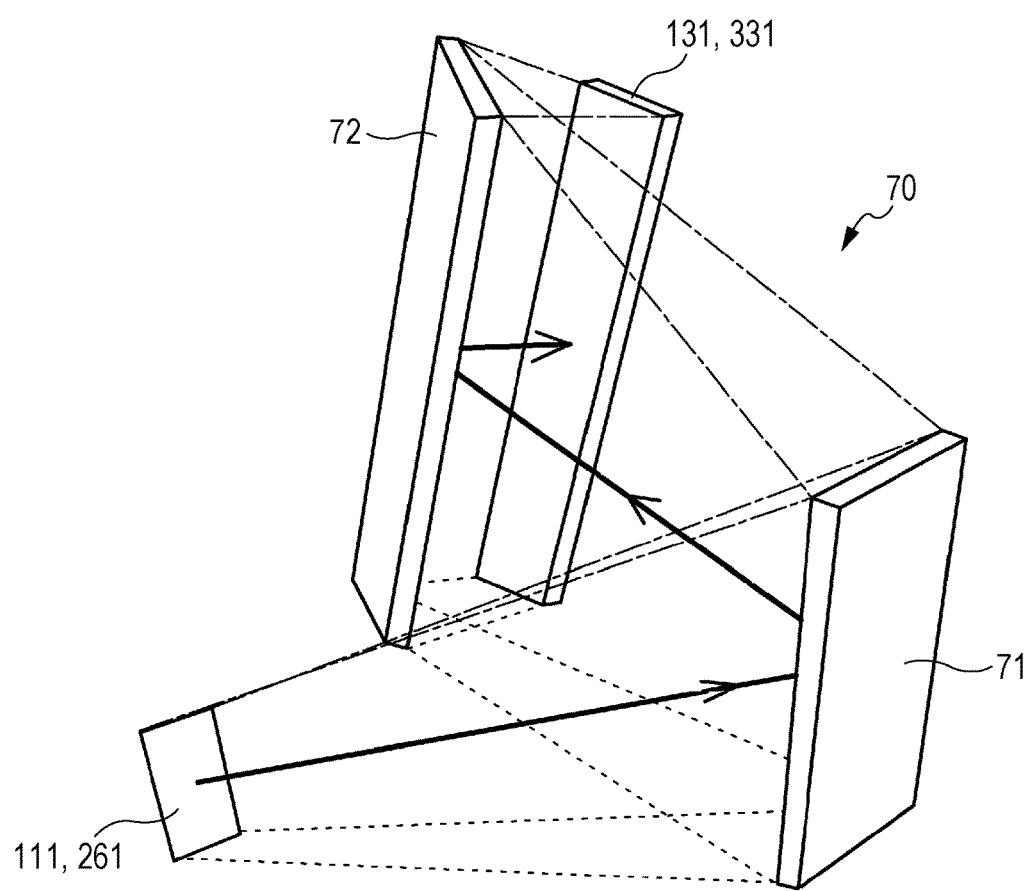
FIG. 6 is a schematic diagram when the light beam extension device of Example 1 is viewed from a certain direction.
Figure 7:
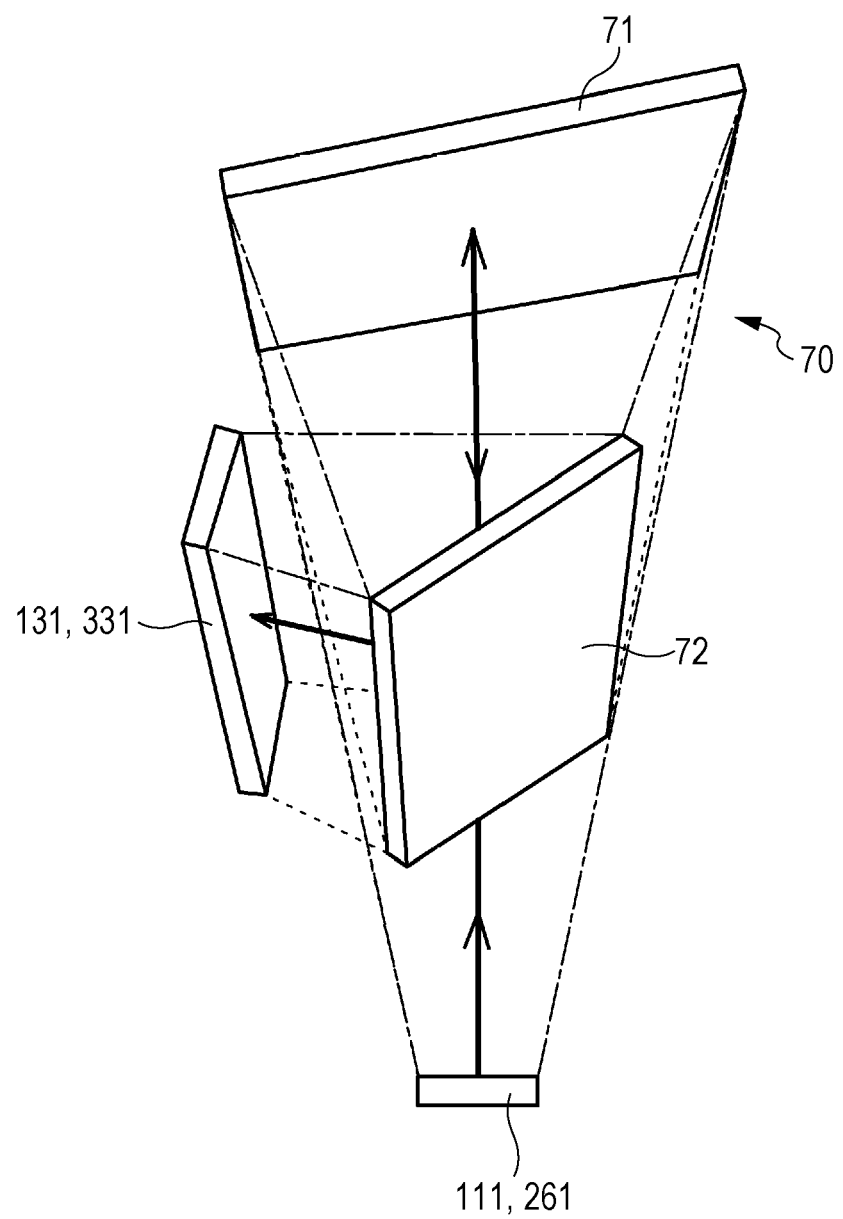
FIG. 7 is a schematic diagram when the light beam extension device of Example 1 is viewed from another direction.
Figure 8:
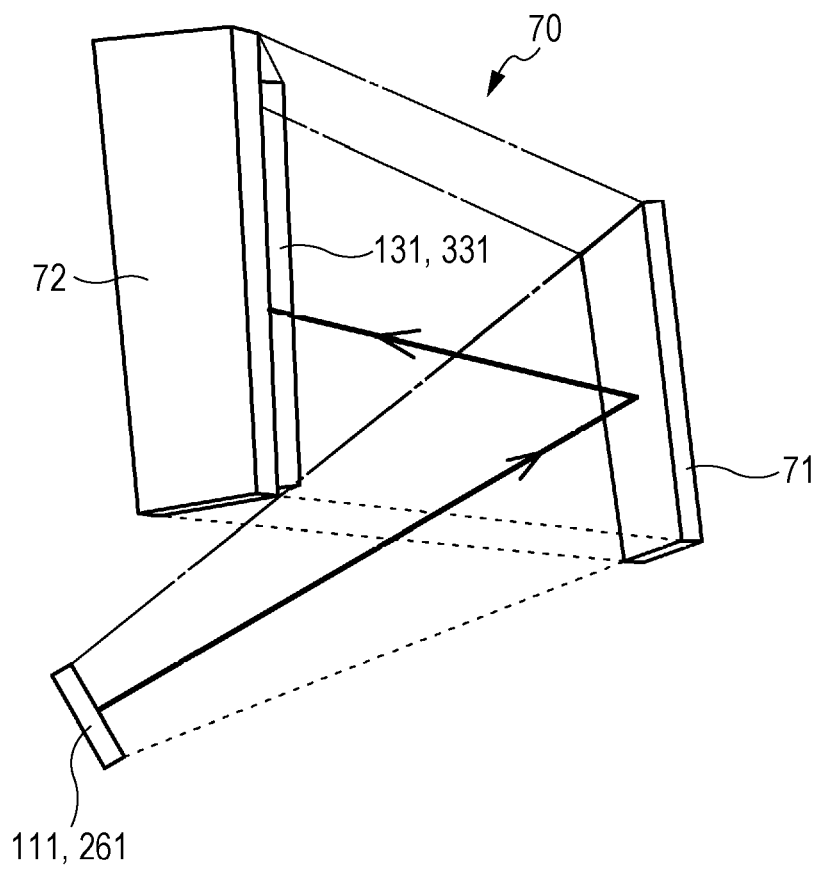
FIG. 8 is a schematic diagram when the light beam extension device of Example 1 is viewed from a further direction.
Figure 9:
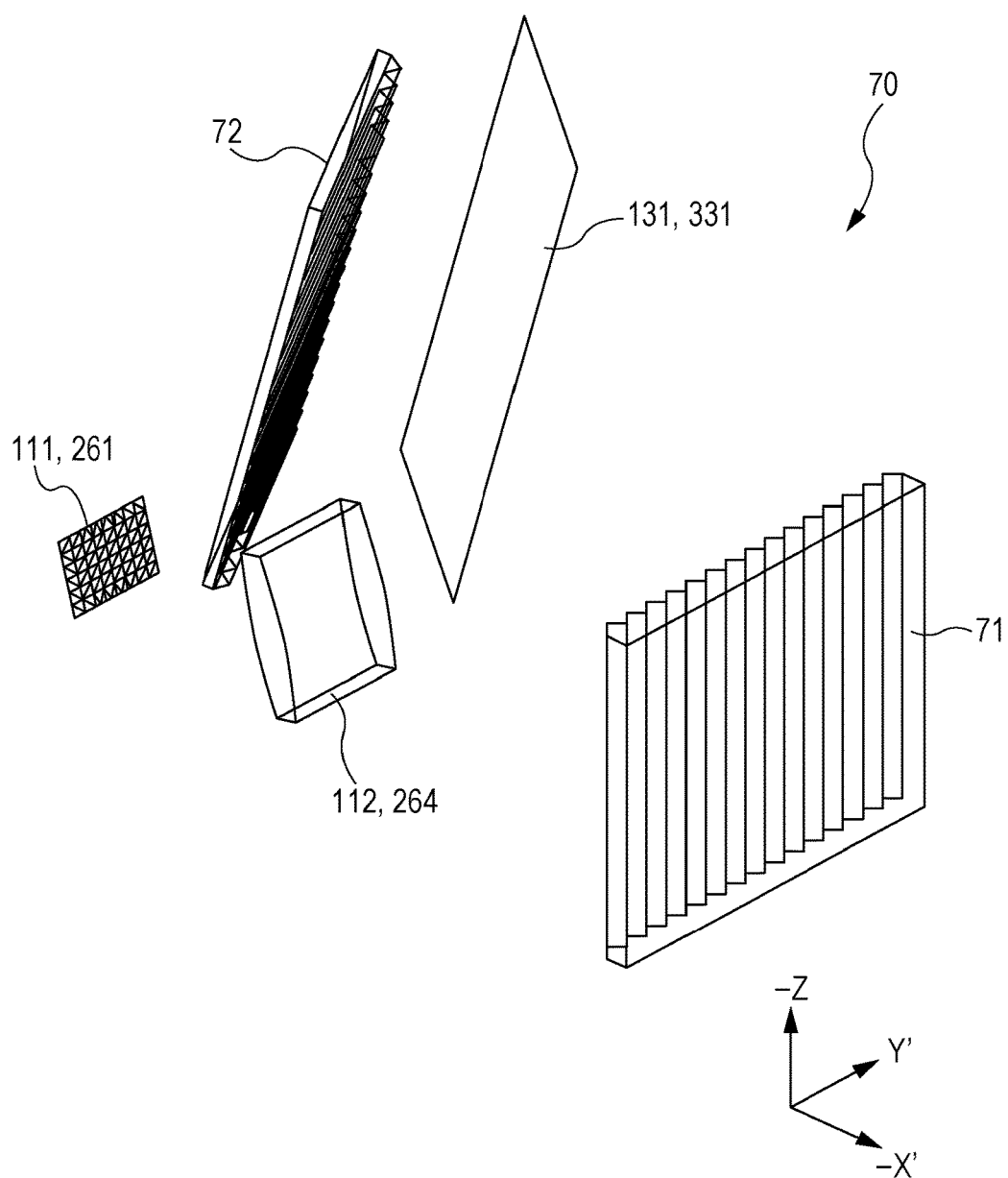
FIG. 9 is a diagram stereoscopically illustrating the positional relationship between an image forming device, the first reflecting mirror, the second reflecting mirror, and a light guide plate in an image display device of Example 1.
Figure 10:
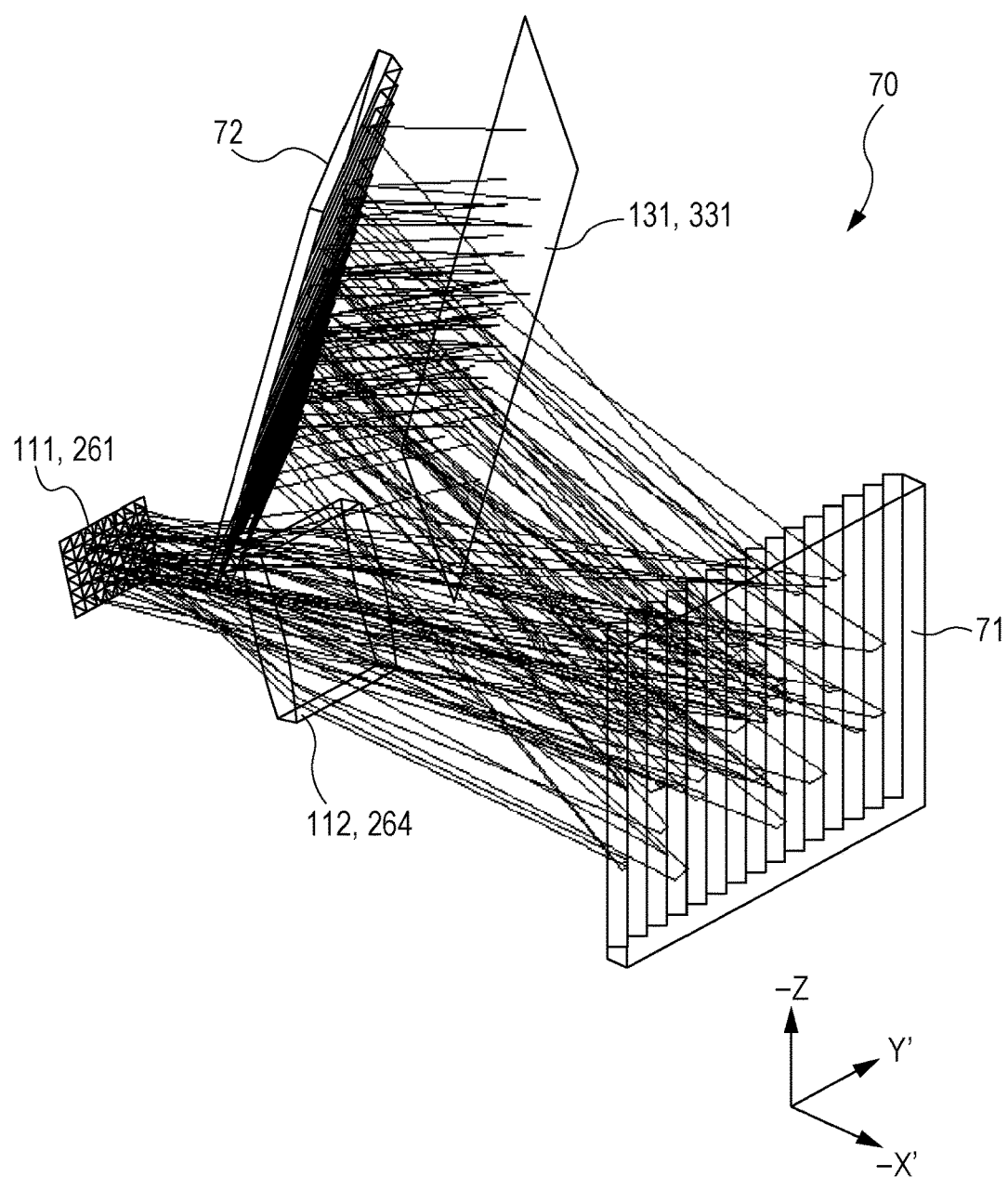
FIG. 10 is a diagram illustrating the behavior of light in the light beam extension device of Example 1.
Figure 11:
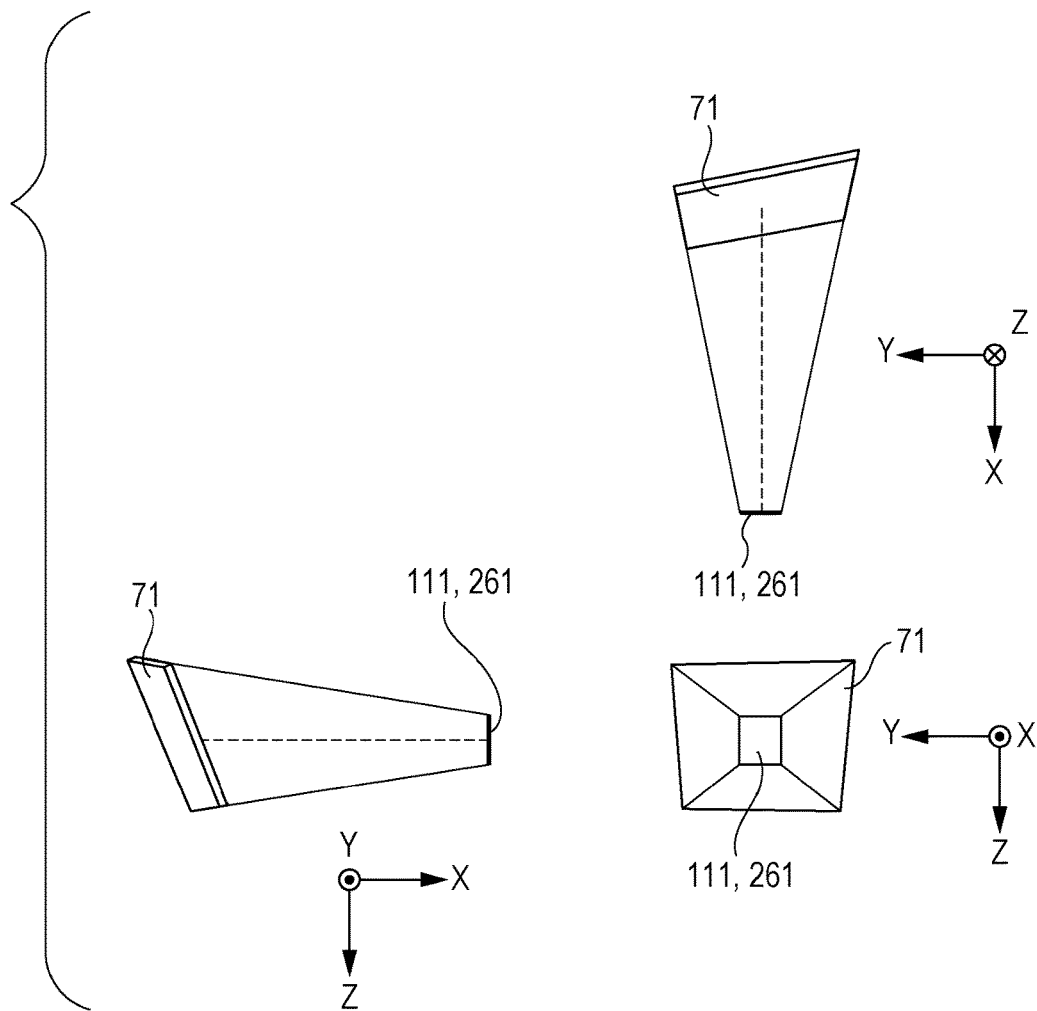
FIG. 11 is a diagram schematically illustrating the positional relationship between the image forming device or a light source and the first reflecting mirror in the image display device of Example 1.
Figure 12:
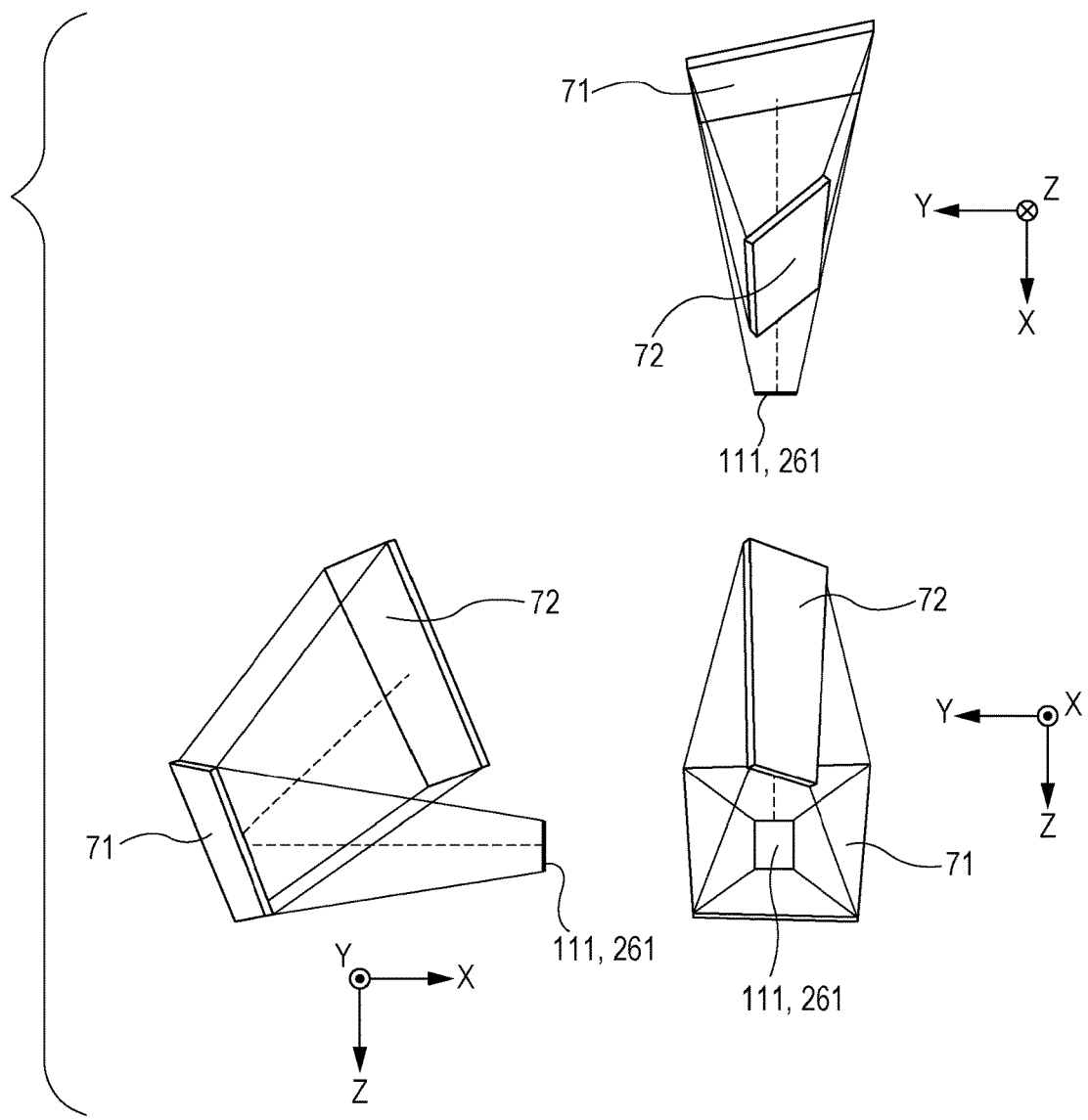
FIG. 12 is a diagram schematically illustrating the positional relationship between the image forming device or the light source, the first reflecting mirror, and the second reflecting mirror in the image display device of Example 1.
Figure 13:
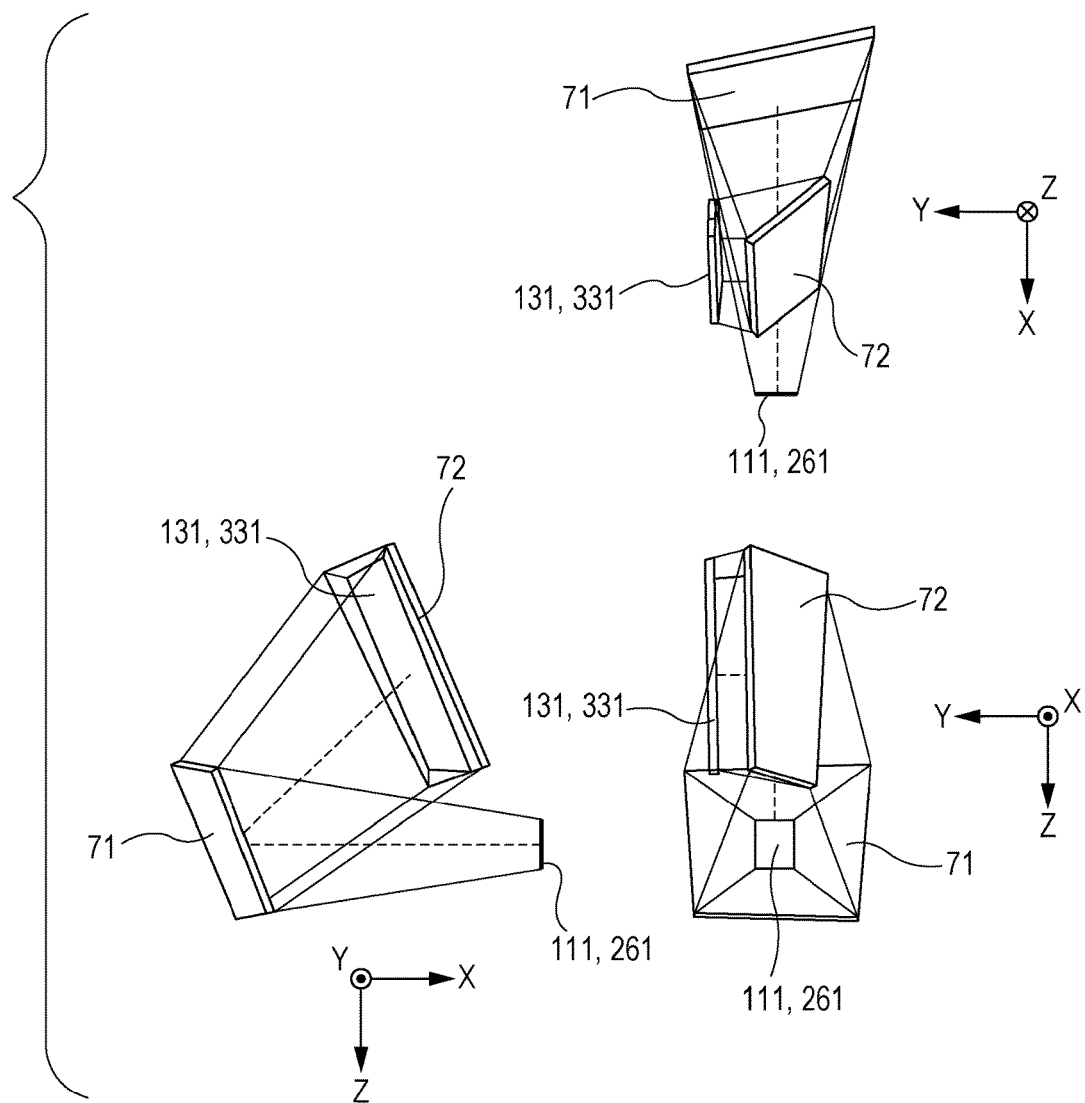
FIG. 13 is a diagram schematically illustrating the positional relationship between the image forming device or the light source, the first reflecting mirror, the second reflecting mirror, and the light guide plate in the image display device of Example 1.

Conceptual diagrams when the light beam extension device of Example 1 is viewed from the Y direction and the Z direction are illustrated in FIGS. 1A and 1B, and the behavior of incident light and emitted light in the light reflecting member is illustrated in FIGS. 2A to 2C. Further, a schematic partial cross-sectional view of a first reflecting mirror when the first reflecting mirror is cut in a first A imaginary plane that is an imaginary plane orthogonal to the Z direction, a schematic partial plan view of the first reflecting mirror, and a schematic partial side view (however, only the behavior of light is illustrated) of the first reflecting mirror are respectively illustrated in FIGS. 3A, 3B, and 3C, and a schematic partial cross-sectional view of a second reflecting mirror when the second reflecting mirror is cut in a second A imaginary plane that is an imaginary plane orthogonal to the Y direction, a schematic partial plan view of the second reflecting mirror, and a schematic partial side view (however, only the behavior of light is illustrated) of the second reflecting mirror are respectively illustrated in FIGS. 4A, 4B, and 4C. In addition, schematic partial cross-sectional views of the first and second reflecting mirrors are illustrated in FIGS. 5A and 5B. Further, schematic diagrams when the light beam extension device of Example 1 is viewed from various directions are illustrated in FIGS. 6, 7, and 8, the positional relationship between an image forming device or a light source, the first reflecting mirror, the second reflecting mirror, and a light guide plate in the image display device of Example 1 is stereoscopically illustrated in FIG. 9, and the behavior of light in the light beam extension device of Example 1 is illustrated in FIG. 10. In addition, the positional relationship between the image forming device or the light source and the first reflecting mirror in the image display device of Example 1 is schematically illustrated in FIG. 11, the positional relationship between the image forming device or the light source, the first reflecting mirror, and the second reflecting mirror in the image display device of Example 1 is schematically illustrated in FIG. 12, and the positional relationship between the image forming device or the light source, the first reflecting mirror, the second reflecting mirror, and the light guide plate in the image display device of Example 1 is schematically illustrated in FIG. 13. Further, the positional relationship between an image generating device, the first reflecting mirror, the second reflecting mirror, and the light guide plate in a modified example of the image display device of Example 1 is conceptually illustrated in FIG. 14. In addition, the positional relationship between the image generating device, the first reflecting mirror, and the second reflecting mirror in the modified example of the image display device of Example 1 is specifically illustrated in FIGS. 15 to 17, and the positional relationship between the image generating device, the first reflecting mirror, and the second reflecting mirror in the image display device of Example 1 is specifically illustrated in FIGS. 18 to 20.

In addition, a conceptual diagram of the image display device in Example 1 or each of Examples 2 to 4 which will be described later is illustrated in FIG. 21, 22, 23A, or 24.

An image display device 100, 200, 300, or 400 in Example 1 or each of Examples 2 to 6 which will be described later is an image display device which includes (A) an image generating device 110 or 210, and (B) a light guide unit 130 or 330 in which light from the image generating device 110 or 210 is incident thereon, is guided therein, and then emitted toward the pupil of an observer. Then, the light guide unit 130 or 330 includes (B-1) a light guide plate 131 or 331 in which incident light is propagated by total reflection in the inside and then emitted therefrom, (B-2) a first deflection section 140 or 340 which is disposed at the light guide plate 131 or 331 and deflects light incident on the light guide plate 131 or 331 such that the light incident on the light guide plate 131 or 331 is totally reflected in the inside of the light guide plate 131 or 331, and (B-3) a second deflection section 150 or 350 which is disposed at the light guide plate 131 or 331 and deflects the light propagated by total reflection in the inside of the light guide plate 131 or 331 over multiple times so as to make the light propagated by total reflection in the inside of the light guide plate 131 or 331 be emitted from the light guide plate 131 or 331. In addition, the light guide unit 130 or 330 is a see-through type (a semi-transparent type). Then, the image display device 100, 200, 300, or 400 in Example 1 or each of Examples 2 to 5 which will be described later further includes (C) a light beam extension device 70 or 80 which extends a light beam incident from the image generating device 110 or 210, along the Z direction when an incident direction of light which is incident on the light guide plate 131 or 331 is set to be the X direction and a direction of propagation of light in the light guide plate 131 or 331 is set to be the Y direction, and then emits the light beam to the light guide unit 130 or 330, and the light beam extension device 70 or 80 includes a first reflecting mirror 71 or 81 on which light from the image generating device 110 or 210 is incident, and a second reflecting mirror 72 or 82 on which light from the first reflecting mirror 71 or 81 is incident and which emits the light to the light guide unit 130 or 330.

Further, an optical device in Example 1 or each of Examples 2 to 6 which will be described later includes the light guide unit 130 or 330. The light guide unit 130 or 330 includes (b-1) the light guide plate 131 or 331 in which light incident from a light source (in the example, specifically, the image generating device 110 or 210) is propagated by total reflection in the inside and then emitted therefrom, (b-2) the first deflection section 140 or 340 which is disposed at the light guide plate 131 or 331 and deflects light incident on the light guide plate 131 or 331 such that the light incident on the light guide plate 131 or 331 is totally reflected in the inside of the light guide plate 131 or 331, and (b-3) the second deflection section 150 or 350 which is disposed at the light guide plate 131 or 331 and deflects the light propagated by total reflection in the inside of the light guide plate 131 or 331 over multiple times so as to make the light propagated by total reflection in the inside of the light guide plate 131 or 331 be emitted from the light guide plate 131 or 331. Then, in Example 1 or each of Examples 2 to 5 which will be described later, the optical device further includes:

the light beam extension device 70 or 80 which extends a light beam incident from the light source, along the Z direction when the incident direction of light which is incident on the light guide plate 131 or 331 is set to be the X direction and the direction of propagation of light in the light guide plate 131 or 331 is set to be the Y direction, and then emits the light beam to the light guide unit 130 or 330; and the light beam extension device 70 or 80 includes the first reflecting mirror 71 or 81 on which light from the light source is incident, and a second reflecting mirror 72 or 82 on which light from the first reflecting mirror 71 or 81 is incident and which emits the light to the light guide unit 130 or 330.

In addition, the light beam extension device 70 or 80 in Example 1 or each of Examples 2 to 5 which will be described later includes the first reflecting mirror 71 or 81 which is disposed between the light source (in the example, specifically, the image generating device 110 or 210) and an irradiated surface (in the example, specifically, the light guide unit 130 or 330) and on which light from the light source is incident, and the second reflecting mirror 72 or 82 on which light from the first reflecting mirror 71 or 81 is incident and which emits the light to the irradiated surface.

Here, in the image display device 100 or 300 of Example 1 or Example 3 (described later), the image generating device 110 is the image generating device of the first form and includes (A-1) an image forming device 111 having a plurality of pixels arranged in the form of a two-dimensional matrix, and (A-2) a collimating optical system 112 which turns light emitted from each pixel of the image forming device 111 into collimated light, and light from the collimating optical system 112 is incident on the first reflecting mirror 71 or 81.

The first deflection section 140 and the second deflection section 150 are disposed in the inside of the light guide plate 131. Then, the first deflection section 140 reflects light incident on the light guide plate 131 and the second deflection section 150 transmits and reflects light propagated by total reflection in the inside of the light guide plate 131 over multiple times. That is, the first deflection section 140 functions as a reflecting mirror and the second deflection section 150 functions as a semi-transmissive mirror. More specifically, the first deflection section 140 provided in the inside of the light guide plate 131 is made of aluminum and constituted by a light reflecting film (a type of mirror) reflecting light incident on the light guide plate 131. On the other hand, the second deflection section 150 provided in the inside of the light guide plate 131 is constituted by a multilayer laminated structure in which a plurality of dielectric laminated films is laminated. The dielectric laminated film is constituted by, for example, a $TiO_2$ film as a high-dielectric constant material, and a $SiO_2$ film as a low-dielectric constant material. The multilayer laminated structure in which a plurality of dielectric laminated films is laminated is disclosed in Japanese Unexamined Patent Application Publication (Translation of PCT Application) No. 2005-521099. In the drawings, a six-layer dielectric laminated film is illustrated. However, it is not limited thereto. A thin leaf made of the same material as a material constituting the light guide plate 131 is sandwiched between the dielectric laminated films. In addition, in the first deflection section 140, collimated light incident on the light guide plate 131 is reflected (or diffracted) such that the collimated light incident on the light guide plate 131 is totally reflected in the inside of the light guide plate 131. On the other hand, in the second deflection section 150, the collimated light propagated by total reflection in the inside of the light guide plate 131 is reflected (or diffracted) over multiple times and emitted from the light guide plate 131 in the state of being collimated light.

The first deflection section 140 may also be provided by providing a slope to form the first deflection section 140 in the light guide plate 131, by cutting out a portion 134 at which the first deflection section 140 is provided, of the light guide plate 131, and vacuum-depositing a light reflecting film on the slope, and then bonding the cut-out portion 134 of the light guide plate 131 to the first deflection section 140. Further, the second deflection section 150 may also be provided by fabricating a multilayer laminated structure in which a plurality of materials (for example, glass) each equal to a material constituting the light guide plate 131 and a plurality of dielectric laminated films (capable of being formed by, for example, a vacuum deposition method) are laminated, forming a slope by cutting out a portion 135 at which the second deflection section 150 is provided, of the light guide plate 131, bonding the multilayer laminated structure to the slope, and performing polishing or the like to arrange an outer shape. In this way, the light guide unit 130 can be obtained in which the first deflection section 140 and the second deflection section 150 are provided in the inside of the light guide plate 131.

In Example 1 or Example 3 (described later), the image forming device 111 includes a reflection type spatial light modulation device 160 and a light source 163 constituted by a light-emitting diode emitting white light. More specifically, the reflection type spatial light modulation device 160 includes a liquid crystal display device (LCD) 161 constituted by an LCOS as a light valve, and a polarization beam splitter 162 which reflects some of the light from the light source 163, thereby guiding it to the to the liquid crystal display device 161, and passes some of the light reflected by the liquid crystal display device 161 therethrough, thereby guiding it to the collimating optical system 112. The liquid crystal display device 161 has a plurality of (for example, 320×240) pixels (liquid crystal cells) arranged in the form of a two-dimensional matrix. The polarization beam splitter 162 has an existing configuration and structure. Non-polarized light emitted from the light source 163 collides with the polarization beam splitter 162. In the polarization beam splitter 162, a P polarization component passes therethrough and is emitted to the outside of the system. On the other hand, an S polarization component is reflected in the polarization beam splitter 162, is incident on the liquid crystal display device 161, is reflected in the inside of the liquid crystal display device 161, and then emitted from the liquid crystal display device 161. Here, of the light emitted from the liquid crystal display device 161, in light emitted from the pixel displaying "white", a large amount of P polarization component is contained, and in light emitted from the pixel displaying "black", a large amount of S polarization component is contained. Therefore, the P polarization components in light which is emitted from the liquid crystal display device 161 and collides with the polarization beam splitter 162 pass through the polarization beam splitter 162 and are guided to the collimating optical system 112. On the other hand, the S polarization components are reflected in the polarization beam splitter 162 and returned to the light source 163. The liquid crystal display device 161 has a plurality of (for example, 320×240) pixels (the number of liquid crystal cells is three times the number of pixels) arranged, for example, in the form of a two-dimensional matrix. The collimating optical system 112 is constituted by, for example, a convex lens, and in order to generate collimated light, the image forming device 111 (more specifically, the liquid crystal display device 161) is disposed at a place (a position) of a focal length in the collimating optical system 112. Further, a single pixel is constituted by a red light-emitting sub-pixel emitting red, a green light-emitting sub-pixel emitting green, and a blue light-emitting sub-pixel emitting blue.

Here, in Example 1 or each of Examples 2 to 6 (described later), the light guide plate 131 or 331 made of optical glass or a plastic material has two parallel planes (a first surface 132 or 332 and a second surface 133 or 333) extending parallel to a direction (the Y direction) of propagation of light by total internal reflection in the light guide plate 131 or 331. The first surface 132 or 332 and the second surface 133 or 333 face each other. Then, collimated light is incident on the light guide plate 131 or 331 from the first surface 132 or 332 which is equivalent to a light incidence plane, is propagated by total reflection in the inside of the light guide plate 131 or 331, and then emitted from the first surface 132 or 332 which is equivalent to a light emitting plane. However, it is not limited thereto and a configuration is also acceptable in which a light incidence plane is constituted by the second surface 133 or 333 and a light emitting plane is constituted by the first surface 132 or 332.

Then, in the light beam extension device 70 of Example 1, a light reflecting surface of the first reflecting mirror 71 has a first A slope 71A and a first B slope 71B which are continuously juxtaposed alternately, and a sawtooth-shaped cross-sectional shape, the top and the base of the first A slope 71A are parallel and extend in the Z direction, in a pair of a first A slope 71A and first B slope 71B, an angle $\theta_1$ formed by the bottom of the first A slope 71A and the bottom of the first B slope 71B is 90 degrees and the length of the first A slope 71A is shorter than the length of the first B slope 71B, the height of the first A slope 71A is constant, and when the incidence angle of light on the first reflecting mirror 71 is set to be $\eta_1$ (degrees), the angle of inclination of the first A slope 71A is set to be $\zeta_1$ (degrees), and the direction of the incidence angle of light toward the first A slope side on the basis of the top of the first A slope 71A is set to be a positive direction, a relationship of $2\zeta_1-\eta_1=90\pm10$ is satisfied.

Further, a light reflecting surface of the second reflecting mirror 72 has a second A slope 72A and a second B slope 72B which are continuously juxtaposed alternately, and a sawtooth-shaped cross-sectional shape, the top and the base of the second A slope 72A are parallel and extend in the Y direction, in a pair of a second A slope 72A and second B slope 72B, an angle $\theta_2$ formed by the bottom of the second A slope 72A and the bottom of the second B slope 72B is 90 degrees and the length of the second A slope 72A is shorter than the length of the second B slope 72B, the height of the second A slope 72A is constant, and when the incidence angle of light on the second reflecting mirror 72 is set to be $\eta_2$ (degrees), the angle of inclination of the second A slope 72A is set to be $\zeta_2$ (degrees), and the direction of the incidence angle of light toward the second A slope side on the basis of the top of the second A slope 72A is set to be a positive direction, a relationship of $2\zeta_2-\eta_2=90\pm10$ is satisfied.

Here, in a pair of a first A slope 71A and first B slope 71B, the top of the first A slope 71A and the top of the first B slope 71B occupy the same top and the base of the first A slope 71A and the base of the first B slope 71B occupy the same base. Similarly, in a pair of a second A slope 72A and second B slope 72B, the top of the second A slope 72A and the top of the second B slope 72B occupy the same top and the base of the second A slope 72A and the base of the second B slope 72B occupy the same base.

In addition, in a case where the light reflecting member is constituted by the first reflecting mirror 71, a first slope and a second slope in the light reflecting member may also be read as the first A slope 71A and the first B slope 71B in the first reflecting mirror 71. Further, in a case where the light reflecting member is constituted by the second reflecting mirror 72, the first slope and the second slope in the light reflecting member may be read as the second A slope 72A and the second B slope 72B in the second reflecting mirror 72. In addition, in the light reflecting member, when performing projection on an imaginary plane orthogonal to the extending directions of the top and the base of the first slope, the locus of light which is incident on the first slope and the locus of light which is emitted from the second slope are parallel and the locus of light which is incident on the second slope and the locus of light which is emitted from the first slope are parallel.

Schematic partial cross-sectional views of the first reflecting mirror 71 and the second reflecting mirror 72 are respectively illustrated in FIGS. 5A and 5B. Here, the schematic partial cross-sectional view of the first reflecting mirror 71 illustrated in FIG. 5A is a schematic partial cross-sectional view when the first reflecting mirror 71 is cut in a first A imaginary plane that is an imaginary plane orthogonal to the Z direction. On the other hand, the schematic partial cross-sectional view of the second reflecting mirror 72 illustrated in FIG. 5B is a schematic partial cross-sectional view when the second reflecting mirror 72 is cut in a second A imaginary plane that is an imaginary plane orthogonal to the Y direction. On the light reflecting surfaces of the first reflecting mirror 71 and the second reflecting mirror 72, light reflection layers 71E and 72E made of a light reflective material such as aluminum, for example, are provided.

In addition, in Example 1, the normal direction (the X' axis) of the first reflecting mirror 71 makes an angle $\eta_1$ (>0 degree) with the X direction (the X axis) and the normal direction (the X' axis) of the second reflecting mirror 72 makes an angle $\eta_2$ (>0 degree) with the X direction (the X axis).

In Example 1, an angle ($\theta_1'$) formed by a top portion 71C of the first A slope 71A and a top portion 71C of the first B slope 71B is set to be 90 degrees. Further, an angle ($\theta_2'$) formed by a top portion 72C of the second A slope 72A and a top portion 72C of the second B slope 72B is also set to be 90 degrees. The shape of an imaginary triangle 71F which is formed by the top of a first A slope-A described above, the top of a first A slope-B adjacent to the first A slope-A, and a base 71D of the first A slope-A is a right-angled scalene triangle (a first imaginary right-angled triangle). Further, the shape of an imaginary triangle 72F which is formed by the top of a second A slope-A, the top of a second A slope-B adjacent to the second A slope-A, and a base 72D of the second A slope-A is a right-angled scalene triangle (a second imaginary right-angled triangle).

In Example 1, in the first reflecting mirror 71, the first imaginary right-angled triangles having the same shape are arranged along the Y' axis, and similarly, in the second reflecting mirror 72, the second imaginary right-angled triangles having the same shape are arranged along the Z' axis.

Light incident on the first reflecting mirror 71 collides with the first A slope 71A, is reflected by the first A slope 71A, collides with the first B slope 71B facing the first A slope 71A, is reflected by the first B slope 71B, and then emitted from the first reflecting mirror 71. Alternatively, light incident on the first reflecting mirror 71 collides with the first B slope 71B, is reflected by the first B slope 71B, collides with the first A slope 71A facing the first B slope 71B, is reflected by the first A slope 71A, and then emitted from the first reflecting mirror 71. Similarly, light incident on the second reflecting mirror 72 collides with the second A slope 72A, is reflected by the second A slope 72A, collides with the second B slope 72B facing the second A slope 72A, is reflected by the second B slope 72B, and then emitted from the second reflecting mirror 72. Alternatively, light incident on the second reflecting mirror 72 collides with the second B slope 72B, is reflected by the second B slope 72B, collides with the second A slope 72A facing the second B slope 72B, is reflected by the second A slope 72A, and then emitted from the second reflecting mirror 72.

Hereinafter, the behavior of light reaching the light guide plate through the first reflecting mirror and the second reflecting mirror from the image forming device will be described with reference to FIGS. 1A, 1B, 3A to 3C, 4A to 4C, and 6 to 13.

In addition, in the configuration and structure illustrated in FIGS. 1A and 1B, some of the light emitted from the image forming device 111 or a light source 261 (described later) passes through a half mirror 73 (refer to FIG. 1B) shown by a dashed-dotted line, is incident on the first reflecting mirror 71, and emitted from the first reflecting mirror 71, and some of the emitted light is reflected by the half mirror 73, is incident on a half mirror 74 (refer to FIG. 1B) shown by a dashed-dotted line, is partially reflected by the half mirror 74, thereby being incident on the second reflecting mirror 72, emitted from the second reflecting mirror 72, and then partially passes through the half mirror 74, thereby being incident on the light guide plate 131 or 331. In addition, in FIG. 1A, the half mirror 73 is disposed at a place shown by "A" and the half mirror 74 is disposed at a place shown by "B".

On the other hand, in the configuration and structure illustrated in FIGS. 6 to 20, by appropriately disposing the image forming device 111 or the light source 261, the first reflecting mirror 71, the second reflecting mirror 72, and the light guide plate 131 or 331 in a space without using the half mirror, light incident on the light guide plate 131 or 331 through the first reflecting mirror 71 and the second reflecting mirror 72 from the image forming device 111 or the light source 261 is prevented from being blocked by the image forming device 111 or the light source 261, or the second reflecting mirror 72.

Then, in the first reflecting mirror 71 of the light beam extension device 70 of Example 1, when performing projection on the first A imaginary plane (in FIG. 3A, a plane parallel to the plane of paper of the drawing), the locus (shown by A and B in FIG. 3A) of light which is incident on the first reflecting mirror 71 from the image generating device 110 or 210 (or the light source) and the locus of light (shown by C and D in FIG. 3A) which is emitted from the first reflecting mirror 71 are parallel (refer to FIGS. 1B and 3A). On the other hand, when performing projection on the first B imaginary plane (in FIG. 3B, a plane parallel to the plane of paper of the drawing), the locus of light (shown by A and B in FIG. 3B) which is incident on the first reflecting mirror 71 from the image generating device 110 or 210 (or the light source) and the locus of light (shown by C and D in FIG. 3B) which is emitted from the first reflecting mirror 71 are symmetrical with respect to the first A imaginary plane. In addition, in FIG. 3C, a schematic partial side view of the first reflecting mirror 71 is illustrated. However, in this drawing, an apex (the top) 71C' and the base 71D of the first reflecting mirror 71 are shown, a slope of the first reflecting mirror 71 is shown as being transparent, and only the behavior of light is shown. Further, a locus BC of light is parallel to the straight line connecting the apexes 71C' of the first reflecting mirror 71.

Further, in the second reflecting mirror 72, when performing projection on the second A imaginary plane (in FIG. 4A, a plane parallel to the plane of paper of the drawing), the locus of light (shown by E and F in FIG. 4A) which is incident on the second reflecting mirror 72 from the first reflecting mirror 71 and the locus of light (shown by G and H in FIG. 4A) which is emitted from the second reflecting mirror 72 are parallel (refer to FIGS. 1A and 4A). On the other hand, when performing projection on the second B imaginary plane (in FIG. 4B, a plane parallel to the plane of paper of the drawing), the locus of light (shown by E and F in FIG. 4B) which is incident on the second reflecting mirror 72 from the first reflecting mirror 71 and the locus of light (shown by G and H in FIG. 4B) which is emitted from the second reflecting mirror 72 are symmetrical with respect to the second A imaginary plane. In addition, in FIG. 4C, a schematic partial side view of the second reflecting mirror 72 is illustrated. However, in this drawing, an apex (the top) 72C' and the base 72D of the second reflecting mirror 72 are shown, a slope of the second reflecting mirror 72 is shown as being transparent, and only the behavior of light is shown. Further, a locus FG of light is parallel to the straight line connecting the apexes 72C' of the second reflecting mirror 72.

Then, the optical path length of light which is emitted from the center of the image generating device 110 or 210 (or the light source) and is incident on the first reflecting mirror 71 and the optical path length of light which is light emitted from the center of the image generating device 110 or 210 (or the light source) and is emitted from the first reflecting mirror 71, is incident on the second reflecting mirror 72, is emitted from the second reflecting mirror 72, and is incident on the light guide unit (or the irradiated surface) are equal to each other. In addition, a size $Y_0$ along the Y direction of a light beam which is emitted from the image generating device 110 or 210 (or the light source) is equal to the size along the Y direction of a light beam which is incident on the light guide unit 130 or 330 (or the irradiated surface) (refer to FIG. 1B). On the other hand, a size $Z_1$ along the Z direction of a light beam which is incident on the light guide unit 130 or 330 (or the irradiated surface) is larger than a size $Z_0$ along the Z direction of a light beam which is emitted from the image generating device 110 or 210 (or the light source) (refer to FIG. 1A). In addition, the size along the Z direction of a light beam which is emitted from the light guide unit 130 or 330 is equal to the size $Z_0$ along the Z direction of a light beam which is emitted from the image generating device 110 or 210 (or the light source).

In addition, in order to achieve such a configuration, it is acceptable if the image forming device 111 or the light source 261, the first reflecting mirror 71, the second reflecting mirror 72, and the light guide plate 131 or 331 are appropriately disposed in a space and optimization of the configurations and structures of these is performed. However, in a case where the optimization is performed, a state is often created where the normal direction (the X' axis) of the first reflecting mirror 71 or the second reflecting mirror 72 is not parallel to the X direction. Further, in a case where the normal direction (the X' axis) of the first reflecting mirror 71 or the second reflecting mirror 72 is set to be parallel to the X direction, there is a case where non-negligible distortion occurs in an image reflected by the first reflecting mirror 71 or the second reflecting mirror 72, and even in such a case, it is preferable to create a state where the normal direction (the X' axis) of the first reflecting mirror 71 or the second reflecting mirror 72 is not parallel to the X direction.

In Example 1, the light beam extension device 70 is provided which makes a light beam (luminous flux) be incident on the light guide unit 130 or 330 in a state where the light beam (luminous flux) is extended along the Z direction and is not extended in the Y direction. The light beam extension device 70 serves as a type of beam expander. Therefore, it is not necessary to set the diameter of an aperture stop in the Z direction in the image generating device 110 or 210 to be large, and thus it is not necessary to make the diameter of a lens to be provided in the image generating device 110 or 210 large. That is, it is not necessary to make the diameter of a lens provided in the collimating optical system 112 provided in the image forming device 111 large, and thus a reduction in the size and a reduction in the weight of the image display device can be attained, and there is also no occurrence of a problem in that display contrast is reduced and image quality deteriorates.

In FIGS. 2A to 2C, schematic partial cross-sectional views of the light reflecting member are illustrated and in addition, the loci of light which is incident on the light reflecting member and then emitted from the light reflecting member are depicted. In addition, the incidence angle of light on the first slope is set to be $\eta$ (>0 degree), the angle of inclination of the first slope is set to be $\zeta$ (>45 degrees), and the direction of the incidence angle of light toward the first slope side on the basis of the top of the first slope is set to be a positive direction. In addition, a dashed-dotted line "NL" shows a normal. Further, the normal to the first slope is shown by a two-dot chain line.

As illustrated in FIG. 2A, light "$A_1$" incident on the first slope of the light reflecting member at, for example, an incidence angle $\eta_A$ is reflected (shown by light "$A_2$") by the first slope, is incident on the second slope facing the first slope, is reflected by the second slope, and then emitted (shown by light "$A_3$") from the second slope. Here, a relationship of $2\zeta-\eta_A=90\pm10$ (degrees) is satisfied. The locus of the light "$A_1$" and the locus of the light "$A_3$" are parallel when projecting these loci on the plane of paper of FIG. 2A, as described above. The locus of "$A_2$" is parallel to the straight line connecting the apexes of the first slopes.

On the other hand, as illustrated in FIG. 2B, light "$B_1$" incident on the first slope of the light reflecting member at an incidence angle $\eta_B$ ($\eta_B > \eta_A$) is reflected (shown by light "$B_2$") by the first slope, is incident on the second slope facing the first slope, is reflected by the second slope, and then emitted (shown by light "$B_3$") from the second slope. However, some, light "$C_1$", of light incident on the first slope is reflected by the first slope and emitted (shown by light "$C_2$") from the light reflecting member without being incident on the second slope facing the first slope. That is, the parallelism and the symmetrical property of the direction of light which is incident on the light reflecting member (or the first reflecting mirror and the second reflecting mirror) and the direction of light emitted are partially lost.

Further, as illustrated in FIG. 2C, light "$D_1$" incident on the light reflecting member at an incidence angle $\eta_D$ ($\eta_D < \eta_A$) is reflected (shown by light "$D_2$") by the first slope, is incident on the second slope facing the first slope, is reflected by the second slope, and then emitted (shown by light "$D_3$") from the second slope. On the other hand, light "$D_3$" incident on the second slope is reflected (shown by light "$D_2$") by the second slope, is incident on the first slope facing the second slope, is reflected by the first slope, and then emitted (shown by light "$D_1$") from the first slope. However, some (shown by light "$E_1$") of light incident on the second slope is reflected by the second slope and emitted (shown by light "$E_2$") from the light reflecting member without being incident on the first slope facing the second slope. That is, the parallelism and the symmetrical property of the direction of light which is incident on the light reflecting member (or the first reflecting mirror and the second reflecting mirror) and the direction of light emitted are partially lost.

As described above, in the light reflecting member, the first reflecting mirror, and the second reflecting mirror, when the angles of incidence $\eta$, $\eta_1$, and $\eta_2$ of light and the angles of inclination $\zeta$, $\zeta_1$, and $\zeta_2$ satisfy relationships of $2\zeta-\eta=90$, $2\zeta_1-\eta_1=90$, and $2\zeta_2-\eta_2=90$, the parallelism and the symmetrical property of the direction of light which is incident on the light reflecting member or the first reflecting mirror and the second reflecting mirror and the direction of light emitted are not lost and light can be reflected most efficiently. In addition, for example, if there are relationships of $2\zeta-\eta=90\pm10$ (degrees), $2\zeta_1-\eta_1=90\pm10$ (degrees), and $2\zeta_2-\eta_2=90\pm10$ (degrees), in practical use, the parallelism and the symmetrical property of the direction of light which is incident on the light reflecting member or the first reflecting mirror and the second reflecting mirror and the direction of light emitted are partially maintained. That is, by defining various parameters ($\eta$, $\zeta$, and the like) in the slope of the light reflecting surface or the light reflecting member, light incident on the light beam extension device or the light reflecting member can be efficiently emitted.

Figure 14:
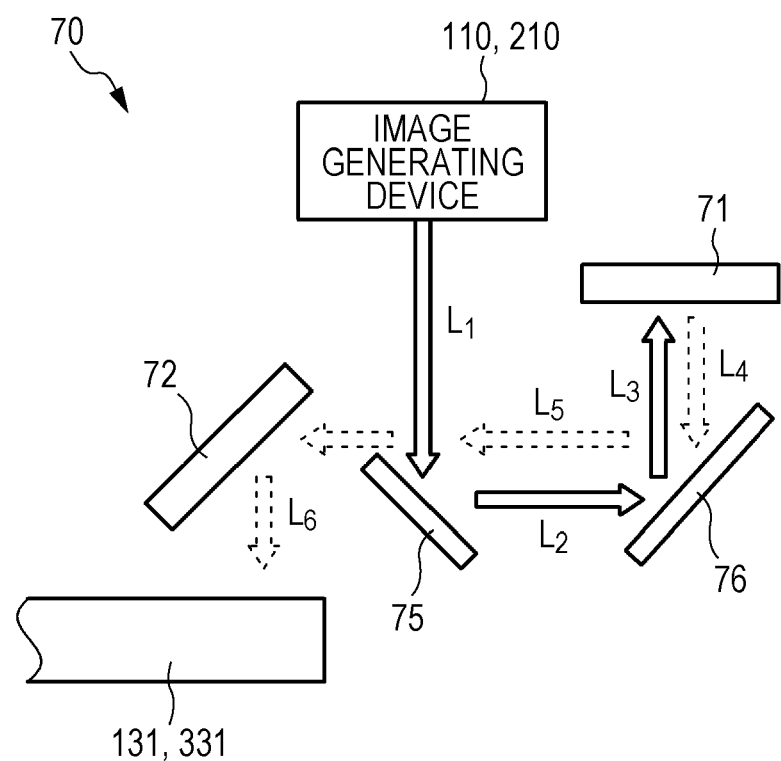
FIG. 14 is a diagram conceptually illustrating the positional relationship between the image forming device, the first reflecting mirror, the second reflecting mirror, and the light guide plate in the image display device of Example 1.
Figure 15:
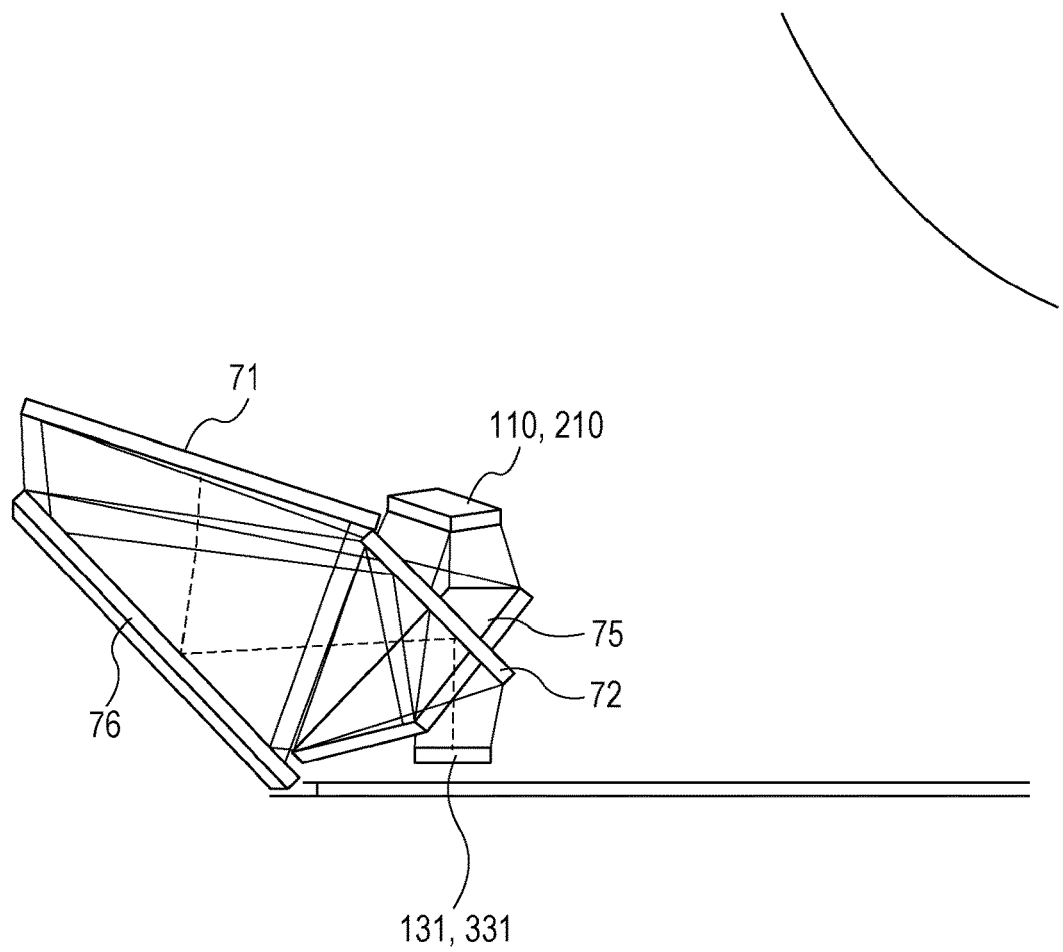
FIG. 15 is a diagram specifically illustrating the positional relationship between an image generating device, the first reflecting mirror, and the second reflecting mirror in a modified example of the image display device of Example 1.
Figure 16:
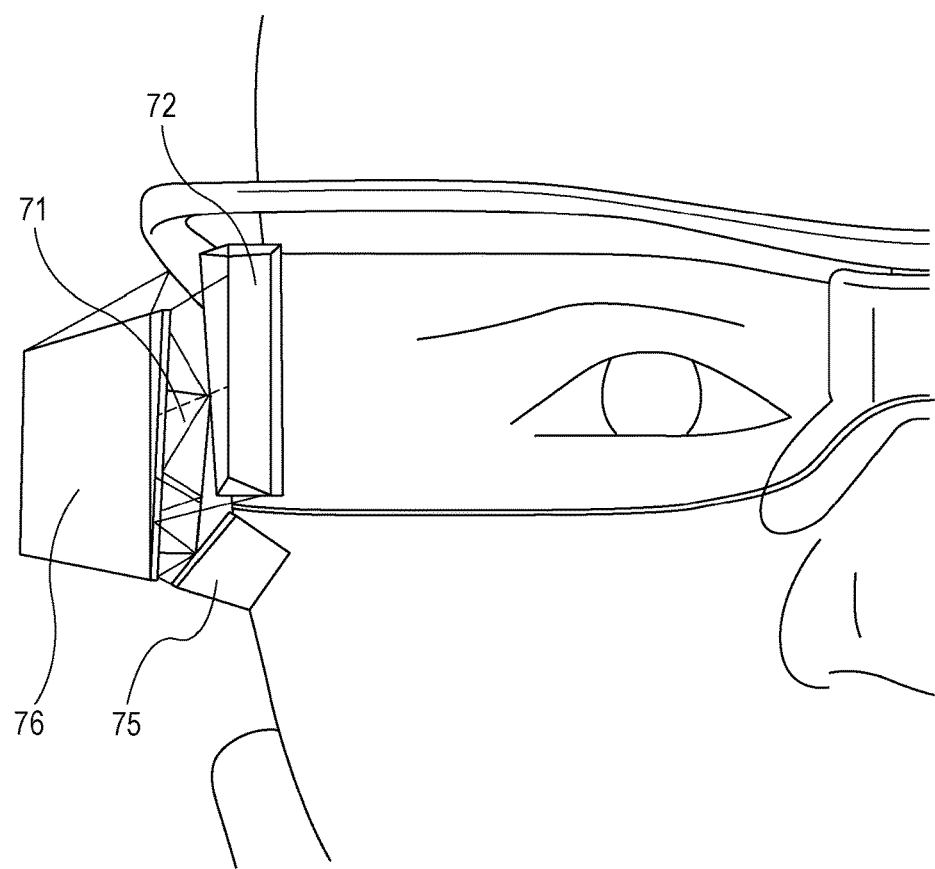
FIG. 16 is a diagram specifically illustrating the positional relationship between the image generating device, the first reflecting mirror, and the second reflecting mirror in the modified example of the image display device of Example 1, as viewed from a different angle from that in FIG. 15.
Figure 17:
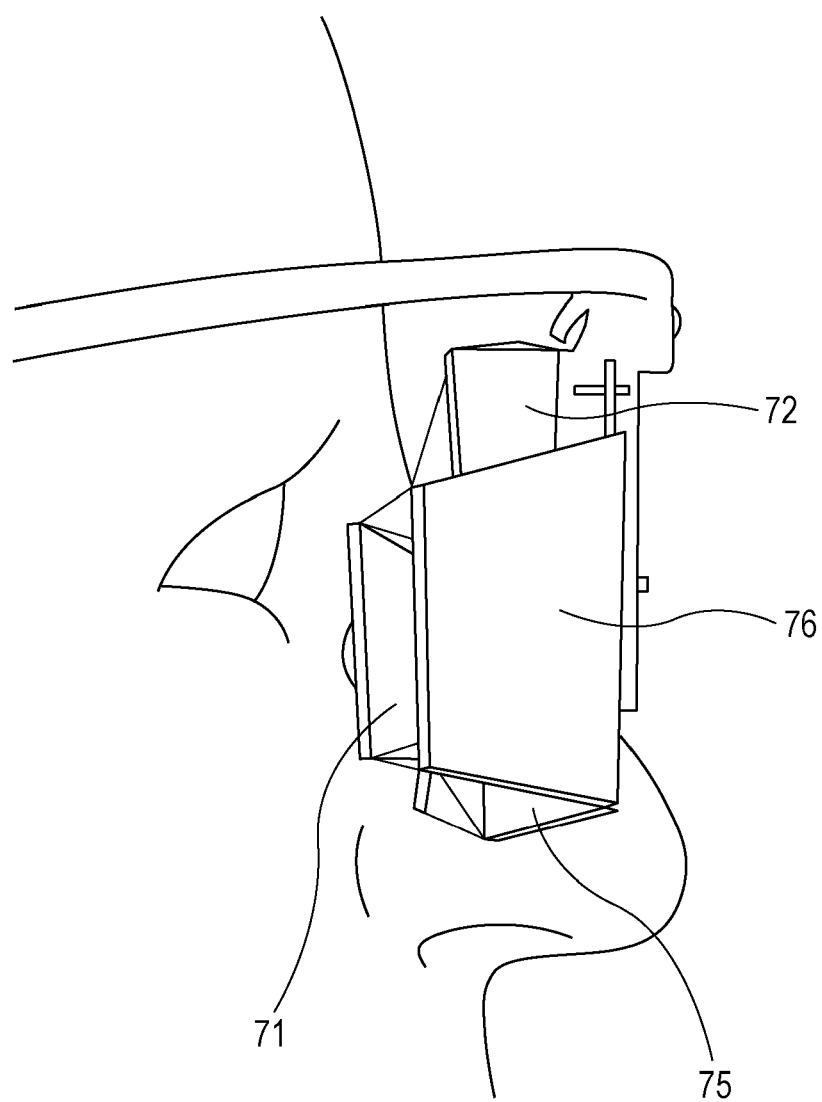
FIG. 17 is a diagram specifically illustrating the positional relationship between the image generating device, the first reflecting mirror, and the second reflecting mirror in the modified example of the image display device of Example 1, as viewed from a different angle from that in FIG. 15.
Figure 18:
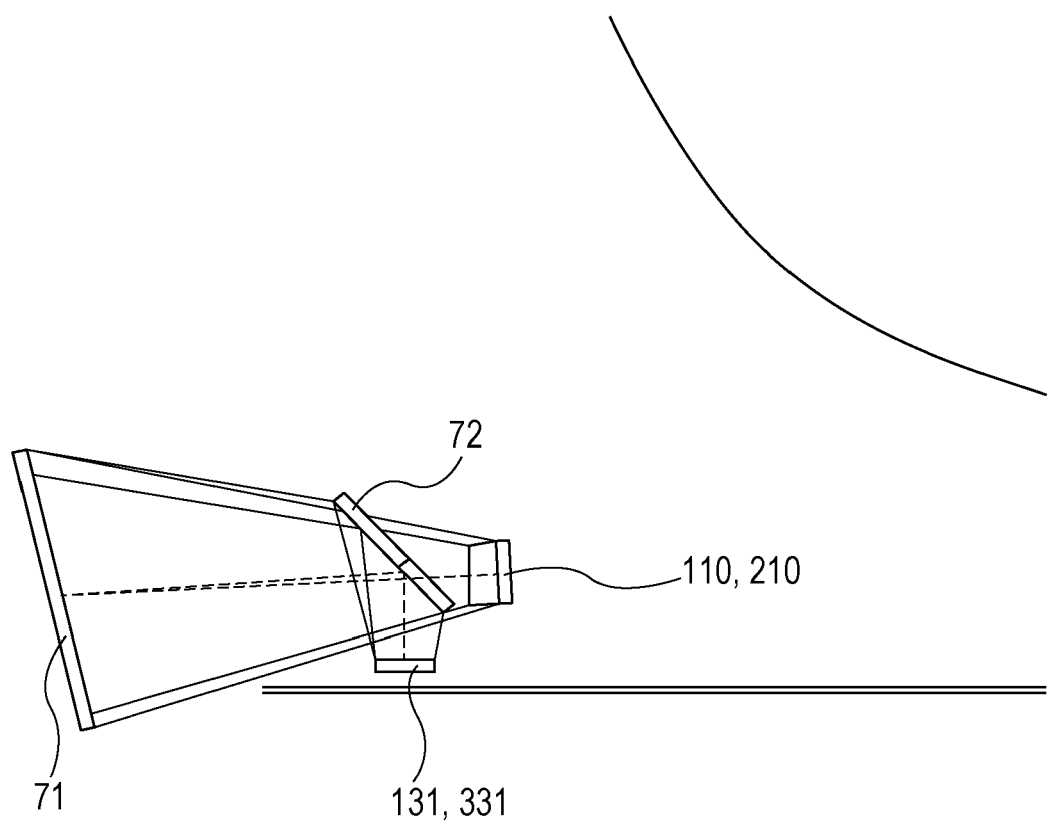
FIG. 18 is a diagram specifically illustrating the positional relationship between the image generating device, the first reflecting mirror, and the second reflecting mirror in the image display device of Example 1.
Figure 19:
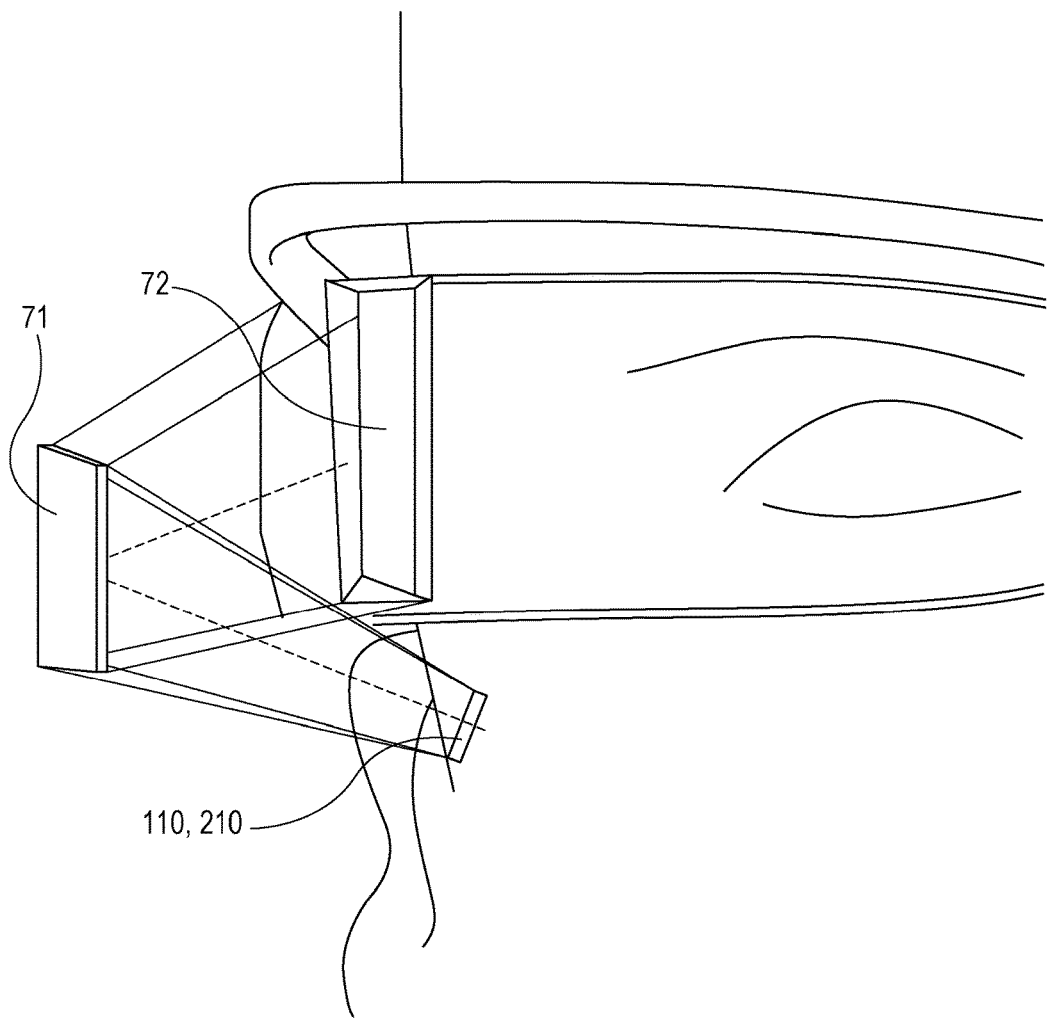
FIG. 19 is a diagram specifically illustrating the positional relationship between the image generating device, the first reflecting mirror, and the second reflecting mirror in the image display device of Example 1, as viewed from a different angle from that in FIG. 18.
Figure 20:
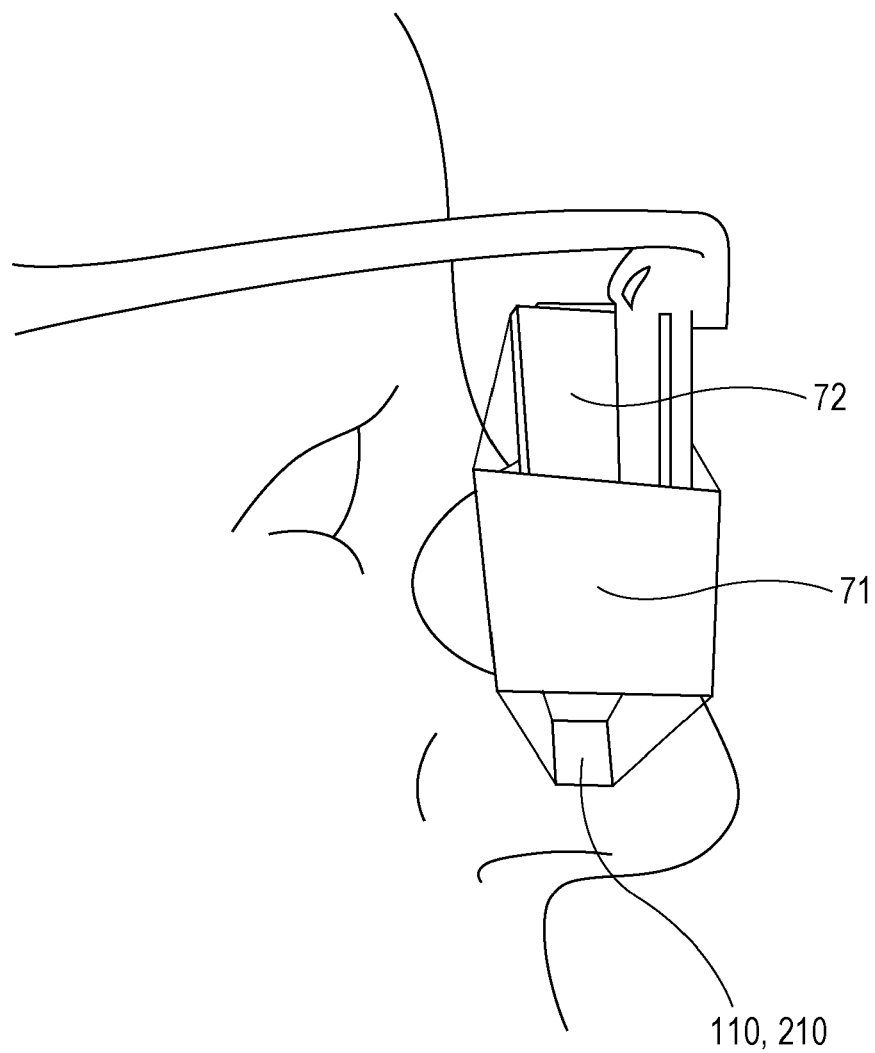
FIG. 20 is a diagram specifically illustrating the positional relationship between the image generating device, the first reflecting mirror, and the second reflecting mirror in the image display device of Example 1, as viewed from a different angle from that in FIG. 18.

The positional relationship between the image generating device 110 or 210, the first reflecting mirror 71, the second reflecting mirror 72, and the light guide plate 131 or 331 in a modified example of the image display device of Example 1 is conceptually illustrated in FIG. 14, and the positional relationship between the image generating device 110 or 210, the first reflecting mirror 71, and the second reflecting mirror 72 in the modified example of the image display device of Example 1 is specifically illustrated in FIGS. 15 to 17. Further, the positional relationship between the image generating device 110 or 210, the first reflecting mirror 71, and the second reflecting mirror 72 in the image display device of Example 1 is specifically illustrated in FIGS. 18 to 20. In addition, FIGS. 15 and 18 illustrate the positional relationship between the image generating device 110 or 210, the first reflecting mirror 71, and the second reflecting mirror 72 in a perspective view, FIGS. 16 and 19 are diagrams when the image display device is viewed from the front, and FIGS. 17 and 20 are diagrams when the image display device is viewed from the side.

In the modified example illustrated in FIGS. 14, and 15 to 17, at least one planar reflecting member (in Example 1, two planar reflecting members 75 and 76) is provided between the image generating device 110 or 210 and the first reflecting mirror 71 or between the light source and the first reflecting mirror 71, and at least one planar reflecting member (in Example 1, one planar reflecting member 76) is provided between the first reflecting mirror 71 and the second reflecting mirror 72. Then, one planar reflecting member 76 provided between the image generating device 110 or 210 and the first reflecting mirror 71 or between the light source and the first reflecting mirror 71 doubles as one planar reflecting member 76 provided between the first reflecting mirror 71 and the second reflecting mirror 72. By adopting such a form, a type of optical path from the image generating device 110 or 210 to the first reflecting mirror 71 or an optical path from the light source to the first reflecting mirror 71 is folded. As a result, it becomes possible to make the optical path length ($L_1+L_2+L_3$ in FIG. 14) of light which is emitted from the center of the image generating device 110 or 210 (or the light source) and is incident on the first reflecting mirror 71 and the optical path length ($L_4+L_5+L_6$ in FIG. 14) of light which is light emitted from the center of the image generating device 110 or 210 (or the light source) and is emitted from the first reflecting mirror 71, is incident on the second reflecting mirror 72, is emitted from the second reflecting mirror 72, and is then incident on the light guide plate (or the irradiated surface) be equal to each other with compact configuration and structure. That is, compacting of the light beam extension device, the optical device, or the image display device can be achieved.

EXAMPLE 2

Example 2 is a modification of Example 1 and relates to the image generating device 210 of the second form. The image display device 200 or 400 of Example 2 or Example 4 (described later) includes, as illustrated as a conceptual diagram in FIG. 22 or 24, (A-1) the light source 261, (A-2) a collimating optical system 262 which turns light emitted from the light source 261 into collimated light, (A-3) a scanning unit 263 which performs scanning with the collimated light emitted from the collimating optical system 262, and (A-4) a relay optical system 264 which relays the collimated light irradiated from the scanning unit 263, and light from the relay optical system 264 is incident on the first reflecting mirror 71.

Here, since the light guide unit 130 has the same configuration and structure as those of the light guide unit 130 described in Example 1, detailed description is omitted.

The light source 261 includes a red light-emitting element 261R emitting red, a green light-emitting element 261G emitting green, and a blue light-emitting element 261B emitting blue, and each light-emitting element is constituted by a semiconductor laser element. Light of the three primary colors emitted from the light source 261 is subjected to color composition by passing through a cross prism 265, is incident on the collimating optical system 262 with an optical path unified and with positive optical power as a whole, and then emitted as collimated light from the collimating optical system 262. Then, the collimated light is reflected by a total reflection mirror 266, horizontal scanning and vertical scanning are performed by the scanning unit 263 constituted by MEMS, which makes a micromirror be rotatable in a two-dimensional direction and can perform two-dimensional scanning with the incident collimated light, and thus a type of two-dimensional image is created and virtual pixels are generated. Then, light from the virtual pixels passes through the relay optical system 264 constituted by an existing relay optical system, and luminous flux that is the collimated light is incident on the light guide unit 130 through the light beam extension device 70.

EXAMPLE 3

Example 3 is also a modification of Example 1. As illustrated as a conceptual diagram in FIG. 23A, the image forming device 111, the collimating optical system 112, and the light beam extension device 70 in the image display device 300 of Example 3 have the same configurations and structures as those of the image forming device 111, the collimating optical system 112, and the light beam extension device 70 described in Example 1. Further, the light guide unit 330 is also equal in the following basic configuration and structure to the light guide unit 130 of Example 1 except that the configurations and structures of the first deflection section and the second deflection section are different from those in Example. That is, the light guide unit 330 is equal to the light guide unit 130 of Example 1 in that the light guide unit 330 includes (C-1) the light guide plate 331 in which incident light is propagated by total reflection in the inside and then emitted therefrom, (C-2) the first deflection section which is disposed at the light guide plate 331 and deflects light incident on the light guide plate 331 such that the light incident on the light guide plate 331 is totally reflected in the inside of the light guide plate 331, and (C-3) the second deflection section which is disposed at the light guide plate 331 and deflects light propagated by total reflection in the inside of the light guide plate 331 over multiple times so as to make the light propagated by total reflection in the inside of the light guide plate 331 be emitted from the light guide plate 331.

In Example 3, the first deflection section and the second deflection section are disposed on the surface of the light guide plate 331 (specifically, the second surface 333 of the light guide plate 331). Then, the first deflection section diffracts light incident on the light guide plate 331 and the second deflection section diffracts light propagated by total reflection in the inside of the light guide plate 331 over multiple times. Here, each of the first deflection section and the second deflection section is constituted by a diffraction grating element, specifically, a reflection type diffraction grating element, more specifically, a reflection type volume hologram diffraction grating. In the following description, the first deflection section constituted by a reflection type volume hologram diffraction grating is referred to as a "first diffraction grating member 340" for convenience and the second deflection section constituted by a reflection type volume hologram diffraction grating is referred to as a "second diffraction grating member 350" for convenience.

Then, in Example 3 or Example 4 (described later), in order to make the first diffraction grating member 340 and the second diffraction grating member 350 correspond to diffraction and reflection of P kinds (specifically, P=3, three kinds of colors, red, green, and blue) of light having different P kinds of wavelength bands (or wavelengths), each of the first diffraction grating member 340 and the second diffraction grating member 350 has a configuration in which P layers of diffraction grating layers each constituted by a reflection type volume hologram diffraction grating are laminated. In addition, in each diffraction grating layer made of a photopolymer material, interference fringes corresponding to one kind of wavelength band (or wavelength) are formed, and the diffraction grating layer is fabricated by a method in the related art. More specifically, each of the first diffraction grating member 340 and the second diffraction grating member 350 has a structure in which a diffraction grating layer diffracting and reflecting red light, a diffraction grating layer diffracting and reflecting green light, and a diffraction grating layer diffracting and reflecting blue light are laminated. A pitch of the interference fringes formed in the diffraction grating layer (the diffraction grating element) is constant and the interference fringe is a straight line shape and is parallel to the Z direction. In addition, in FIGS. 23A and 24, each of the first diffraction grating member 340 and the second diffraction grating member 350 is illustrated being a single layer. By adopting such a configuration, an increase in diffraction efficiency, an increase in diffraction reception angle, and optimization of a diffraction angle when light having each wavelength band (or wavelength) is diffracted and reflected in the first diffraction grating member 340 and the second diffraction grating member 350 can be attained.

In FIG. 23B, an enlarged schematic partial cross-sectional view of the reflection type volume hologram diffraction grating is illustrated. Interference fringes each having an angle of inclination (a slant angle) φ are formed in the reflection type volume hologram diffraction grating. Here, the angle of inclination (the slant angle) φ refers to an angle formed by the surface of the reflection type volume hologram diffraction grating and the interference fringe. The interference fringe is formed over the surface from the inside of the reflection type volume hologram diffraction grating. The interference fringe satisfies the Bragg condition. Here, the Bragg condition refers to a condition satisfying the following expression (A). In the expression (A), m means a positive integer, λ means a wavelength, d means a pitch of lattice planes (interval in a normal direction between imaginary planes which include interference fringes), and θ means a complementary angle of an angle incident on the interference fringe. Further, the relationship between θ, the angle of inclination (the slant angle) φ, and an incidence angle ψ in a case where light infiltrates into a diffraction grating member at the incidence angle ψ is the same as the following expression (B).

$$m \cdot \lambda = 2 \cdot d \cdot \sin(\theta) \quad (A)$$

$$\theta = 90° - (\phi + \psi) \quad (B)$$

The first diffraction grating member 340 is disposed on (bonded to) the second surface 333 of the light guide plate 331, as described above, and diffracts and reflects the collimated light incident on the light guide plate 331 such that this collimated light incident on the light guide plate 331 from the first surface 332 is totally reflected in the inside of the light guide plate 331. Further, the second diffraction grating member 350 is disposed on (bonded to) the second surface 333 of the light guide plate 331, as described above, and diffracts and reflects multiple times the collimated light propagated by total reflection in the inside of the light guide plate 331 and then emits the collimated light from the first surface 332 of the light guide plate 331 in a state of being collimated light. However, it is not limited thereto and a configuration is also acceptable in which an incidence plane of the light guide plate is constituted by the second surface 333 and an emitting plane of the light guide plate is constituted by the first surface 332.

Then, also in the light guide plate 331, collimated lights of three colors, red, green, and blue, are propagated by total reflection in the inside and then emitted. At this time, since the light guide plate 331 is thin and an optical path advancing in the inside of the light guide plate 331 is long, the number of total reflections up to the second diffraction grating member 350 becomes different according to each angle of view (horizontal angle of view). Describing in more detail, the number of reflections of the collimated light which is incident at an angle (a horizontal angle of view) in a direction approaching the second diffraction grating member 350, among the collimated lights which are incident on the light guide plate 331, is smaller than the number of reflections of the collimated light which is incident on the light guide plate 331 at a horizontal angle of view in a direction away from the second diffraction grating member 350. This is because an angle that light which is propagated in the inside of the light guide plate 331 makes with the normal to the light guide plate 331 when the light collides with the inner surface of the light guide plate 331 is larger in the collimated light which is collimated light that is diffracted and reflected in the first diffraction grating member 340 and which is incident on the light guide plate 331 at a horizontal angle of view in a direction approaching the second diffraction grating member 350 than in the collimated light which is incident on the light guide plate 331 at a horizontal angle of view in the opposite direction to that. Further, the shape of the interference fringe formed in the inside of the second diffraction grating member 350 and the shape of the interference fringe formed in the inside of the first diffraction grating member 340 are in a symmetrical relationship with respect to the X-Z plane of the light guide plate 331.

The light guide plate 331 in Example 4 which will be described next also has basically the same configuration and structure as the configuration and structure of the light guide plate 331 described above.

In Example 3, when a direction of propagation of light by total internal reflection in the light guide plate 331 is set to be the Y direction and the thickness direction of the light guide plate 331 is set to be the X direction, an arrangement direction of the interference fringes in the first diffraction grating member 340 and the second diffraction grating member 350, that is, a diffraction direction is the Y direction.

If the surface of the reflection type volume hologram diffraction grating is not sufficiently smooth and flat, light is scattered or a reduction in contrast or deterioration in resolution can occur. From the standpoint of preventing the occurrence of such a problem and moreover, protecting the reflection type volume hologram diffraction grating, the light guide unit 330 can also be made in a structure in which the light guide plate 331, the reflection type volume hologram diffraction gratings 340 and 350, and transparent parallel plate are laminated from the light incidence side.

In Example 3, the center-to-center distance of the first deflection section (the first diffraction grating member 340) and the second deflection section (the second diffraction grating member 350) is set to be 30 mm, the wavelength of incident light is set to be 522 nm, and the diffraction angle of 0-degree incident light on the light guide plate 331 (an angle of total reflection in the light guide plate 331) is set to be 59 degrees. Further, the thickness of the light guide plate 331 is set to be 1.5 mm, the refractive index is set to be 1.52, and the eye relief is set to be 15 mm. At this time, a distance from an incident point on the light guide plate 331 of light colliding with the center of the first diffraction grating member 340 (hereinafter simply referred to as an "light incident point") to the pupil of the observer is 40 mm as an air conversion length. Then, when a horizontal angle of view is negative, the distance from the light incident point to the pupil 41 of the observer becomes the longest. Here, if a horizontal angle of view is set to be ±11 degrees and a vertical angle of view is set to be ±8.3, an air conversion length of a distance from a light incident point of a light ray having a horizontal angle of view of −11 degrees to the pupil 41 of the observer is 48 mm. It is necessary to secure an aperture stop (a clear aperture) having a vertical angle of view of ±8.3 degrees at the distance of 48 mm. Therefore, a necessary aperture of a projection optical system in the vertical direction is 17 mm when the diameter of the pupil of the observer is 3 mm. This aperture is equivalent to the length of a light emitting area along the Z direction in the light guide plate 331. Then, in this case, the length of a light reflection area along the Z direction in the second reflecting mirror 72 becomes [17+2×$L_6$×tan(8.3°)] mm.

EXAMPLE 4

Example 4 is a modification of Example 3. A conceptual diagram of the image display device of Example 4 is illustrated in FIG. 24. However, the light source 261, the collimating optical system 262, the scanning unit 263, the relay optical 264, and so on in the image display device of Example 4 have the same configurations and structures as those in Example 2. Further, the light guide unit 330 in Example 4 has the same configuration and structure as the light guide unit 330 in Example 3.

EXAMPLE 5

Example 5 relates to the light reflecting member according to the second embodiment of the present disclosure, the optical device according to the second embodiment of the present disclosure, the light beam extension device according to the second embodiment of the present disclosure, and the image display device according to the second embodiment of the present disclosure.

Figure 25A:
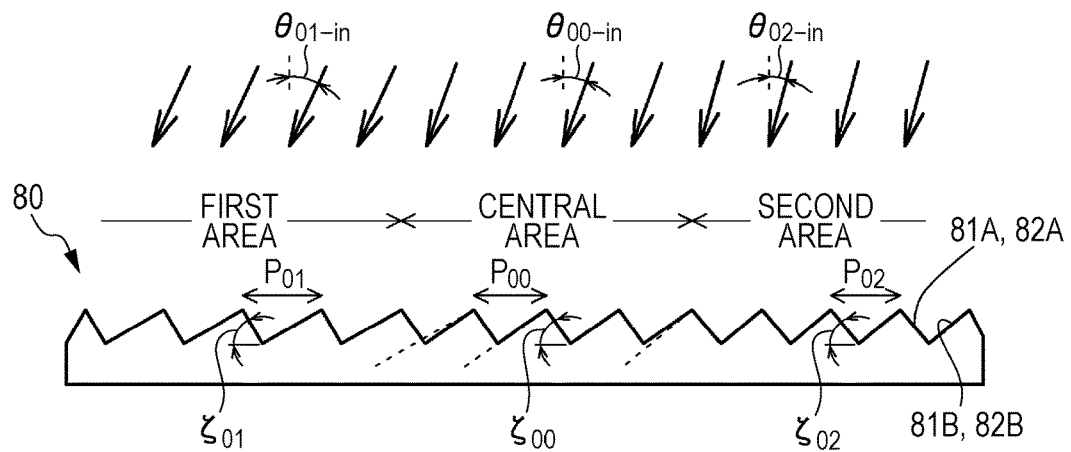
FIGS. 25A and 25B are schematic side views of a light reflecting member, a first reflecting mirror, or a second reflecting mirror in Example 5.
Figure 25B:
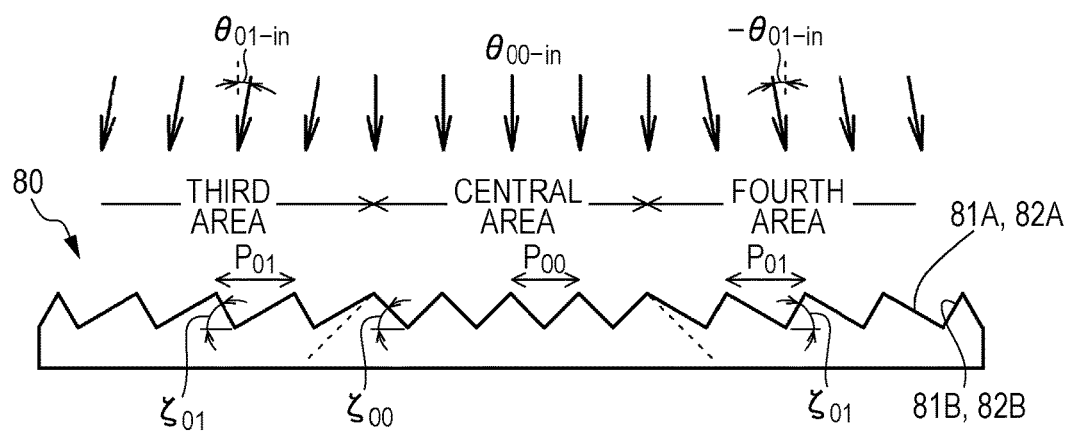

In the first reflecting mirror 71 of Example 1, the first imaginary right-angled triangles having the same shape are arranged along the Y' axis and similarly, in the second reflecting mirror 72, the second imaginary right-angled triangles having the same shape are arranged along the Z' axis. On the other hand, in Example 5, in the first reflecting mirror 81, first imaginary right-angled triangles having different shapes are arranged along the Y' axis and similarly, in the second reflecting mirror 82, second imaginary right-angled triangles having different shapes are arranged along the Z' axis. Schematic side views of the light reflecting member, the first reflecting mirror 81, or the second reflecting mirror 82 in Example 5 are illustrated in FIGS. 25A and 25B.

In the light beam extension device 80 of Example 5, a light reflecting surface of the first reflecting mirror 81 has a first A slope 81A and a first B slope 81B which are continuously juxtaposed alternately, and a sawtooth-shaped cross-sectional shape, the top and the base of the first A slope 81A are parallel and extend in the Z direction, in a pair of a first A slope 81A and first B slope 81B, an angle formed by the bottom of the first A slope 81A and the bottom of the first B slope 81B is 90 degrees and the length of the first A slope 81A is shorter than the length of the first B slope 81B, the height of the first A slope 81A is constant, the value of a pitch between the apex of the first A slope 81A and the apex of the first A slope 81A at the center of the first reflecting mirror 81 and the value of a pitch between the apex of the first A slope 81A and the apex of the first A slope 81A at an end portion of the first reflecting mirror 81 are different from each other, a light reflecting surface of the second reflecting mirror 82 has a second A slope 82A and a second B slope 82B which are continuously juxtaposed alternately, and a sawtooth-shaped cross-sectional shape, the top and the base of the second A slope 82A are parallel and extend in the Y direction, in a pair of a second A slope 82A and second B slope 82B, an angle formed by the bottom of the Second A slope 82A and the bottom of the second B slope 82B is 90 degrees and the length of the second A slope 82A is shorter than the length of the second B slope 82B, the height of the second A slope 82A is constant, and the value of a pitch between the apex of the second A slope 82A and the apex of the second A slope 82A at the center of the second reflecting mirror 82 and the value of a pitch between the apex of the second A slope 82A and the apex of the second A slope 82A at an end portion of the second reflecting mirror 82 are different from each other.

In addition, in a case where the light reflecting member is constituted by the first reflecting mirror 81, a first slope and a second slope in the light reflecting member may also be read as the first A slope 81A and the first B slope 81B in the first reflecting mirror 81. Further, in a case where the light reflecting member is constituted by the second reflecting mirror 82, the first slope and the second slope in the light reflecting member may also be read as the second A slope 82A and the second B slope 82B in the second reflecting mirror 82. In addition, in the light reflecting member, when performing projection on an imaginary plane orthogonal to the extending directions of the top and the base of the first slope, the locus of light which is incident on the first slope and the locus of light which is emitted from the second slope are parallel.

Here, the expression "the value of a pitch between the apex of the first A slope 81A and the apex of the first A slope 81A at the center of the first reflecting mirror 81 and the value of a pitch between the apex of the first A slope 81A and the apex of the first A slope 81A at an end portion of the first reflecting mirror 81 are different from each other" is equivalent to the expression "an angle of inclination $\zeta$ at the center of the first reflecting mirror 81 and an angle of inclination $\zeta$ at an end portion of the first reflecting mirror 81 are different from each other". Similarly, the expression "the value of a pitch between the apex of the second A slope 82A and the apex of the second A slope 82A at the center of the second reflecting mirror 82 and the value of a pitch between the apex of the second A slope 82A and the apex of the second A slope 82A at an end portion of the second reflecting mirror 82 are different from each other" is equivalent to the expression "an angle of inclination $\zeta$ at the center of the second reflecting mirror 82 and an angle of inclination $\zeta$ at an end portion of the second reflecting mirror 82 are different from each other". That is, if the above value is replaced with an angle of inclination $\zeta$, the light reflecting member according to the second embodiment of the present disclosure, the optical device according to the second embodiment of the present disclosure, the light beam extension device according to the second embodiment of the present disclosure, and the image display device according to the second embodiment of the present disclosure are partially equivalent to the light reflecting member according to the first embodiment of the present disclosure, the optical device according to the first embodiment of the present disclosure, the light beam extension device according to the first embodiment of the present disclosure, and the image display device according to the first embodiment of the present disclosure. That is, the light reflecting member according to the first embodiment of the present disclosure, the optical device according to the first embodiment of the present disclosure, the light beam extension device according to the first embodiment of the present disclosure, and the image display device according to the first embodiment of the present disclosure, which are provided with slopes having different angles of inclination $\zeta$, are equivalent to the light reflecting member according to the second embodiment of the present disclosure, the optical device according to the second embodiment of the present disclosure, the light beam extension device according to the second embodiment of the present disclosure, and the image display device according to the second embodiment of the present disclosure.

In Example 5, as illustrated in FIG. 25A, when the incidence angle of light on a central area of the light reflecting member is set to be $\eta_{00\text{-}in}$, in the central area of the light reflecting member, the third imaginary right-angled triangles (however, right-angled scalene triangles in which an angle of inclination is $\eta_{00}$) are arranged, and in an area (in FIG. 25A, stated as a "first area") of the light reflecting member in which the incidence angle of light is $\eta_{01\text{-}in}$ (>$\eta_{00\text{-}in}$), the third imaginary right-angled triangles (however, right-angled scalene triangles in which an angle of inclination is $\zeta_{01}$>$\zeta_{00}$) are arranged, and in an area (in FIG. 25A, stated as a "second area") of the light reflecting member in which the incidence angle of light is $\eta_{02\text{-}in}$ (<$\eta_{00\text{-}in}$), the third imaginary right-angled triangles (however, right-angled scalene triangles in which an angle of inclination is $\zeta_{02}$<$\zeta_{00}$) are arranged.

Alternatively, when the incidence angle of light on the central area of the light reflecting member is set to be $\eta_{00\text{-}in}$ and a pitch in the central area of the light reflecting member is set to be $P_{00}$, a pitch $P_{01}$ in the area (the first area) of the light reflecting member, in which the incidence angle of light is $\eta_{01\text{-}in}$ (>$\eta_{00\text{-}in}$), is $P_{01}$>$P_{00}$, and a pitch $P_{02}$ in the area (the second area) of the light reflecting member, in which the incidence angle of light is $\eta_{02\text{-}in}$ (<$\eta_{00\text{-}in}$), is $P_{02}$<$P_{00}$.

Alternatively, as illustrated in FIG. 25B, the third imaginary right-angled triangles (however, right-angled isosceles triangles) are arranged in the central area (the incidence angle of light is $\eta_{00\text{-}in}$) of the light reflecting member, lights having the incidence angle of $\eta_{01\text{-}in}$ (>$\eta_{00\text{-}in}$) (however, positive and negative signs of an angle are different) are incident on the areas (in FIG. 25B, stated as a "third area" and a "fourth area") on both sides of the central area of the light reflecting member, and in the third area and the fourth area, the third imaginary right-angled triangles (however, right-angled scalene triangles) are arranged symmetrically on the basis of the central area. In addition, in a single third imaginary right-angled triangle, a longer adjacent side is located on the central area side of the light reflecting member. The value of an angle of inclination $\zeta$ may also be different for each third imaginary right-angled triangle, and a configuration in which the value of the angle of inclination is set to be the same value in the desired number of third imaginary right-angled triangles (that is, a configuration in which the light reflecting member is divided into a plurality of areas, the values of the angle of inclination $\zeta$ in the third imaginary right-angled triangles which are included in each area are set to be the same, and the values of the angle of inclination $\zeta$ in the third imaginary right-angled triangles which are included in different areas are set to be different) can also be adopted. In the latter case, it is acceptable if the incidence angle of light which is incident on a central portion of each of a plurality of areas in the light reflecting member is set to be $\eta$. Further, the value of $\theta'$ at the boundary of each of a plurality of areas in the light reflecting member is a value other than 90 degrees.

Alternatively, for example, when a pitch in the central area (the incidence angle of light is $\eta_{00\text{-}in}$) of the light reflecting member is set to be $P_{00}$, in the areas (the third area and the fourth area) on both sides of the central area of the light reflecting member, in which the incidence angle of light is $\eta_{01\text{-}in}$ (>$\eta_{00\text{-}in}$), the third imaginary right-angled triangles (however, the right-angled scalene triangles) are arranged symmetrically on the basis of the central area at a pitch $P_{01}$ (>$P_{00}$). The value of a pitch P may also be different for each third imaginary right-angled triangle, and a configuration in which the values of the pitches are set to be the same value in the desired number of third imaginary right-angled triangles (that is, a configuration in which the light reflecting member is divided into a plurality of areas, the values of the angle of inclination $\zeta$ in the third imaginary right-angled triangles which are included in each area are set to be the same, and the values of the angle of inclination $\zeta$ in the third imaginary right-angled triangles which are included in different areas are set to be different) can also be adopted.

In addition, also in the first reflecting mirror and the second reflecting mirror, the same configuration and structure as those of the light reflecting member described above can be adopted. That is, in the first reflecting mirror 81, the first imaginary right-angled triangles having different shapes are arranged along the Y' axis. Further, in the second reflecting mirror 82, the second imaginary right-angled triangles having different shapes are arranged along the Z' axis.

EXAMPLE 6

Example 6 relates to the image display devices according to the third and fourth embodiments of the present disclosure. The image display devices in example 6 are constituted by the same image display device as the image display device described in Example 3 or 4 except for the configuration and structure of the light beam extension device.

Figure 26A:
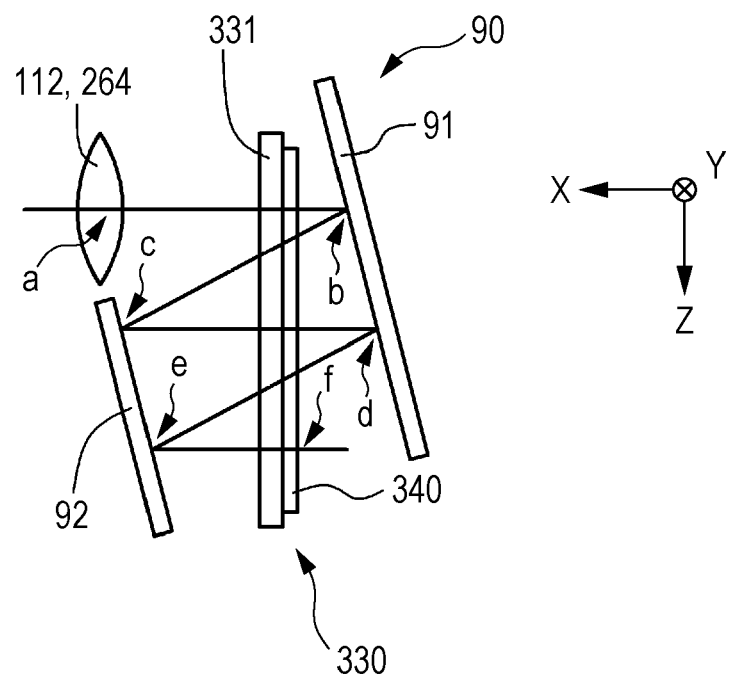
FIGS. 26A and 26B are schematic diagrams when the disposition states of an image generating device, a light beam extension device, and a light guide unit in Example 6 are viewed from the Y direction and the Z direction.
Figure 26B:
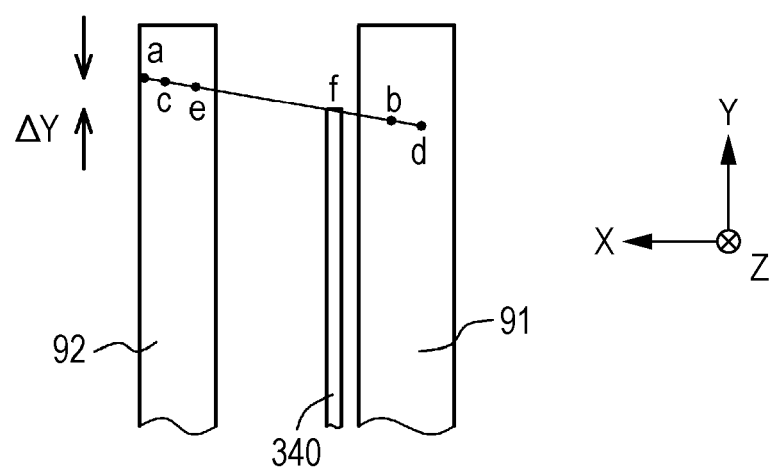

Schematic diagrams when the disposition states of the image generating device, the light beam extension device, and the light guide unit in Example 6 are viewed from the Y direction and the Z direction are respectively illustrated in FIGS. 26A and 26B. In addition, in FIG. 26B, illustration of the light guide plate 331 is omitted.

The image display device of Example 6 includes an image generating device, a light guide unit in which light from the image generating device is incident thereon, guided therein, and then emitted toward the pupil of the observer and which includes a light guide plate, a first deflection section, and a second deflection section, and a light beam extension device, in the same way as being described in Example 1 (the image display device according to the first embodiment of the present disclosure, the light beam extension device according to the first embodiment of the present disclosure, the optical device according to the first embodiment of the present disclosure, and the light reflecting member according to the first embodiment of the present disclosure) or Example 5 (the image display device according to the second embodiment of the present disclosure, the light beam extension device according to the second embodiment of the present disclosure, the optical device according to the second embodiment of the present disclosure, and the light reflecting member according to the second embodiment of the present disclosure).

Here, in Example 6, a light beam extension device 90 includes a first reflecting mirror 91 and a second reflecting mirror 92, the first reflecting mirror 91 is located on the side opposite to the image generating device 110 or 210 across the light guide unit 330 (that is, located on the opposite side to the light incidence side of the light guide unit 330), the second reflecting mirror 92 is located on the image generating device 110 or 210 side on the basis of the light guide unit 330 (that is, located on the light incidence side of the light guide unit 330), and some of the light emitted from the image generating device 110 or 210 passes through the light guide plate 331 and the first deflection section 340, is reflected by the first reflecting mirror 91, passes through the light guide plate 331 and the first deflection section 340, and is reflected by the second reflecting mirror 92, and passage of some of the light through the light guide plate 331 and the first deflection section 340 is repeated the predetermined number of times.

In addition, the specific configurations and structures of the first reflecting mirror 91 and the second reflecting mirror 92 are substantially the same as the configuration and structure of the second reflecting mirror 72 described in Example 1 or the modified example thereof. Then, the beam diameter along the Z direction of light which is emitted from the entire light beam extension device is larger than the beam diameter along the Z direction of light which is incident on the light beam extension device.

A light ray in which a horizontal angle of view takes the negative largest value in the collimating optical system 112 or the relay optical system 264 is assumed. Then, the behavior in the light beam extension device 90 when such a light ray is incident on the light beam extension device 90 is schematically illustrated in FIGS. 26A and 26B.

As illustrated in FIGS. 26A and 26B, reflection of light is repeated between the first reflecting mirror 91 and the second reflecting mirror 92. However, as for a collision point of the light ray with the first reflecting mirror 91 and a collision point of the light ray with the second reflecting mirror 92, in principle, light does not move in the Y direction and moves only in the X direction and the Z direction. For example, in the example illustrated in FIGS. 26A and 26B, a light ray (indicated by "a") in which a horizontal angle of view takes the negative largest value collides with and is reflected by the first reflecting mirror 91 at a point "b", collides with and is reflected by the second reflecting mirror 92 at a point "c", collides with and is reflected by the first reflecting mirror 91 at a point "d", collides with and is reflected by the second reflecting mirror 92 at a point "e", is incident on an end portion "f" in the Y direction of the light guide unit 330, and is diffracted and reflected therein. In this case, the light ray which is incident on the end portion "f" in the Y direction of the light guide unit 330 is shifted by ΔY in a −Y direction when being based on an emitting position "a" from the collimating optical system 112 or the relay optical system 264. Similarly, when a light ray in which a horizontal angle of view takes the positive largest value is assumed, the light ray is shifted by ΔY in a +Y direction when being based on the emitting position from the collimating optical system 112 or the relay optical system 264. However, the value of ΔY is negligibly small.

Here, as described above, the position of the first deflection section 340 which diffracts and reflects parallel pencil groups emitted from the collimating optical system 112 or the relay optical system 264 and incident on the light guide plate 331 becomes an aperture stop position in the Y direction. Specifically, in the example illustrated in FIGS. 26A and 26B, the diameter in the Y direction of the collimating optical system 112 or the relay optical system 264 has to be set to be the value of 2×ΔY plus the length in the Y direction of the first deflection section 340. However, the value of ΔY is negligibly small. Therefore, by making each of the first reflecting mirror 91 and the second reflecting mirror 92 be a so-called reversal mirror, it is not necessary to set the diameter in the Y direction of the collimating optical system 112 or the relay optical system 264 to be large, alternatively, even if the diameter is set to be large, it is not necessary to make the diameter in the Y direction very large.

EXAMPLE 7

Figure 27:
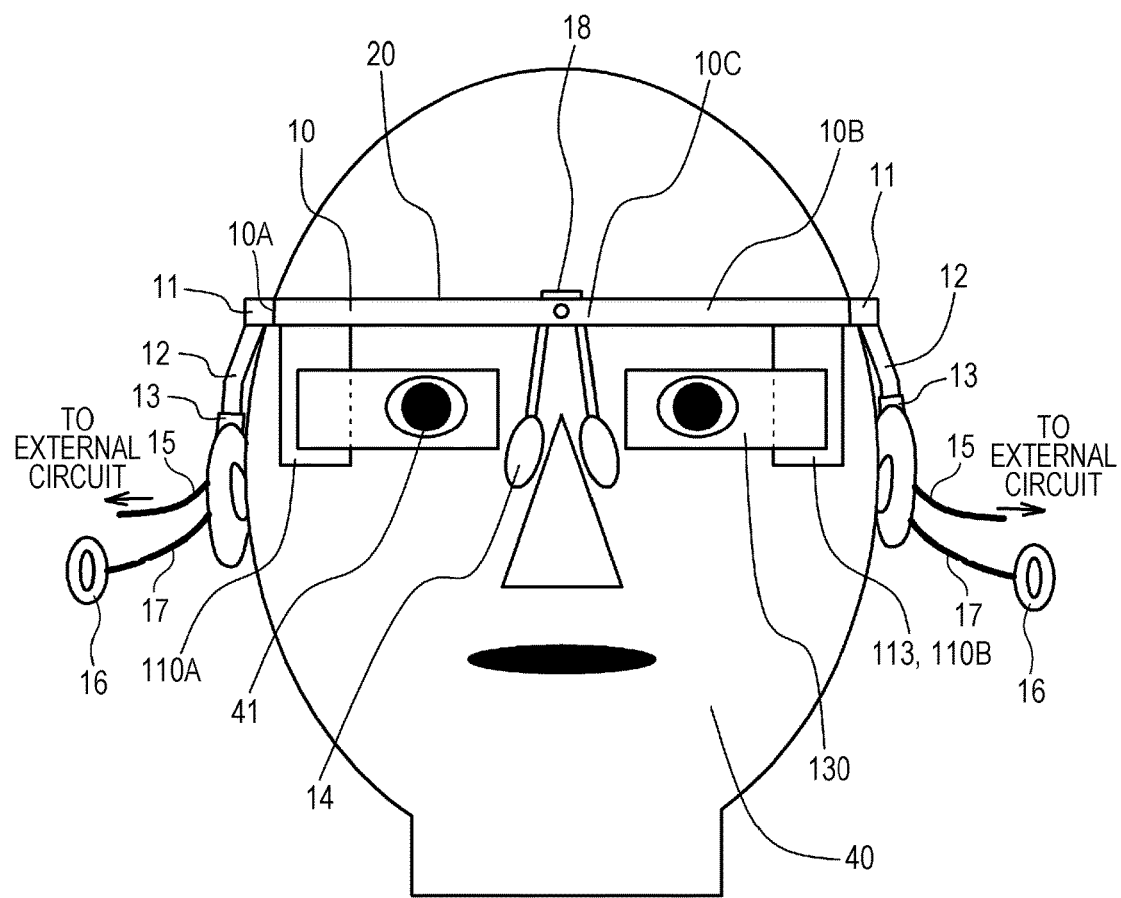
FIG. 27 is a schematic diagram when a head mounted display of Example 7 is viewed from the front.
Figure 28:
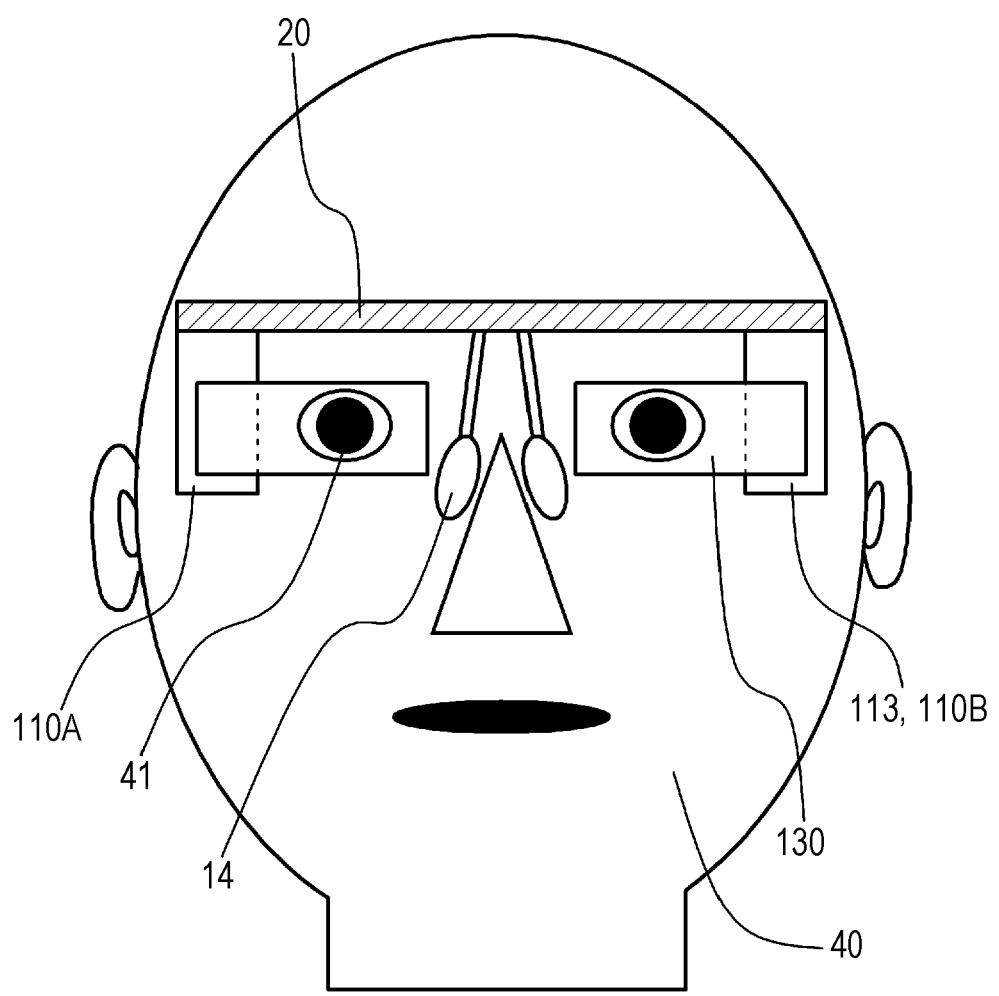
FIG. 28 is a schematic diagram when the head mounted display (however, in a state when it is assumed that a frame is removed) of Example 7 is viewed from the front.
Figure 29:
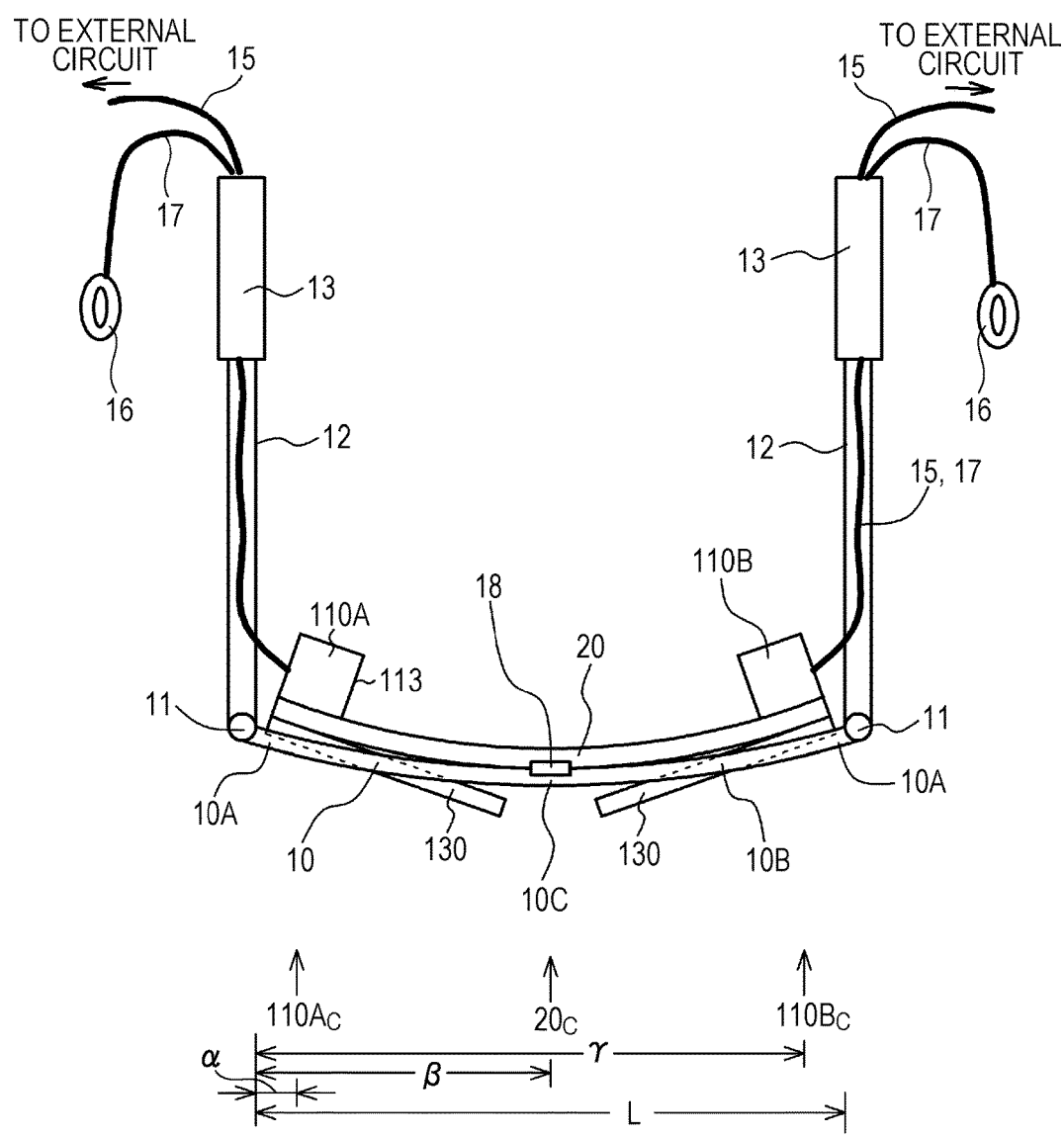
FIG. 29 is a schematic diagram when the head mounted display of Example 7 is viewed from above.
Figure 30:
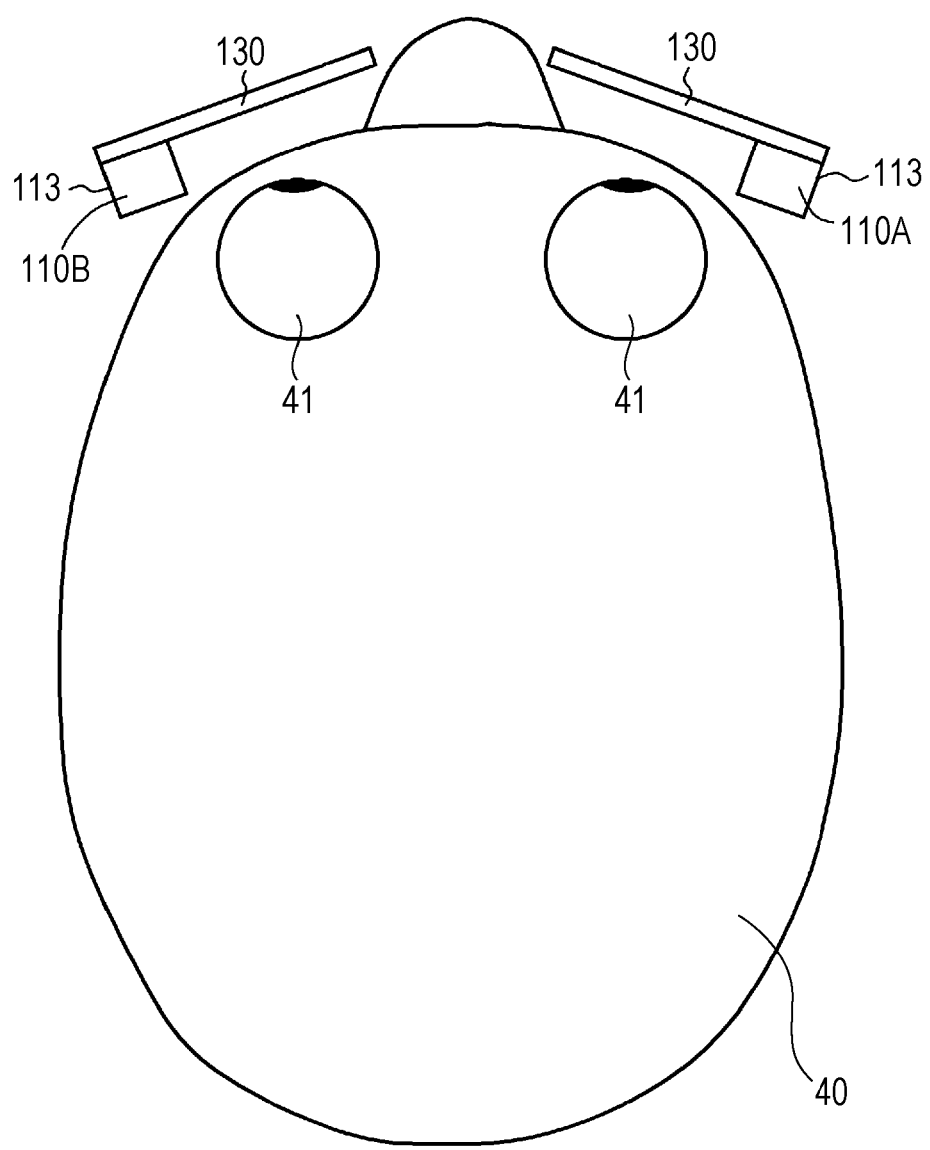
FIG. 30 is a schematic diagram when a state where the head mounted display of Example 7 is mounted on the head of an observer is viewed from above (however, only an image display device is illustrated and illustration of the frame is omitted).

Example 7 relates to a head mounted display with the image display device according to any of the embodiments of the present disclosure, specifically, the image display device 100, 200, 300, or 400 described in each of Examples 1 to 6 incorporated therein. A schematic diagram when the head mounted display of Example 7 is viewed from the front is illustrated in FIG. 27, and a schematic diagram when the head mounted display (however, in a state when it is assumed that a frame is removed) of Example 7 is viewed from the front is illustrated in FIG. 28. Further, a schematic diagram when the head mounted display of Example 7 is viewed from above is illustrated in FIG. 29, and a diagram when a state where the head mounted display of Example 7 is mounted on the head of an observer 40 is viewed from above is illustrated in FIG. 30. In addition, in FIG. 30, for convenience, only the image display device is illustrated and illustration of the frame is omitted. Further, in the following description, the image display device is described represented by the image display device 100. However, it goes without saying that the image display device 200, 300, or 400 can be adopted.

The head mounted display of Example 7 includes (A) a glasses-type frame 10 which is mounted on the head of the observer 40, and (B) two image display devices 100. In addition, the head mounted display in Example 7 or Example 8 (described later) is set to be a binocular type provided with two image display devices 100.

Then, the head mounted display of Example 7 further includes a coupling member 20 which couples the two image display devices 100 together. The coupling member 20 is mounted on the side facing the observer of a central portion 10C of the frame 10 which is located between the two pupils 41 of the observer 40 (that is, between the observer 40 and the frame 10) by using, for example, a screw (not illustrated). Further, a projected image of the coupling member 20 is included in a projected image of the frame 10. That is, when viewing the head mounted display from the front of the observer 40, the coupling member 20 is hidden by the frame 10 and is not visible. Further, the two image display devices 100 are coupled together by the coupling member 20. However, specifically, image generating devices 110A and 110B are respectively stored in casings 113 and each of the casings 113 is mounted on each end portion of the coupling member 20 in a manner of being able to adjust a mounting state. Then, each of the image generating devices 110A and 110B is located further to the outside than each of the pupils 41 of the observer 40. Specifically, when the distance between a mounting portion center 110A$_c$ of the image generating device 110A on one side and one end portion (an end-piece on one side) 10A of the frame 10 is set to be α, the distance from a center 20$_c$ of the coupling member 20 to the one end portion (the end-piece on one side) 10A of the frame is set to be β, the distance between a mounting portion center 110B$_c$ of the image generating device 110B on the other side and the one end portion (the end-piece on one side) 10A of the frame is set to be γ, and the length of the frame is set to be L, α=0.1×L, β=0.5×L, and γ=0.9×L.

The mounting of the image generating device (specifically, each of the image generating devices 110A and 110B) on each end portion of the coupling member 20 is specifically performed, for example, by providing through-holes (not illustrated) in three places in each end portion of the coupling member, providing tapped hole portions (screwing portions, not illustrated) corresponding to the through-holes in each of the image generating devices 110A and 110B, and screwing a screw (not illustrated) in each of the hole portions provided in each of the image generating devices 110A and 110B through each of the through-holes. A spring is inserted between the screw and the hole portion. In this way, a mounting state of the image generating device (inclination of the image generating device with respect to the coupling member) can be adjusted according to a tightening state of the screw. After the mounting, the screw is hidden by a lid (not illustrated). In addition, in FIGS. 28 and 32, in order to clarify the coupling member 20 and a coupling member 30, hatched lines are applied to the coupling members 20 and 30.

Figure 33:
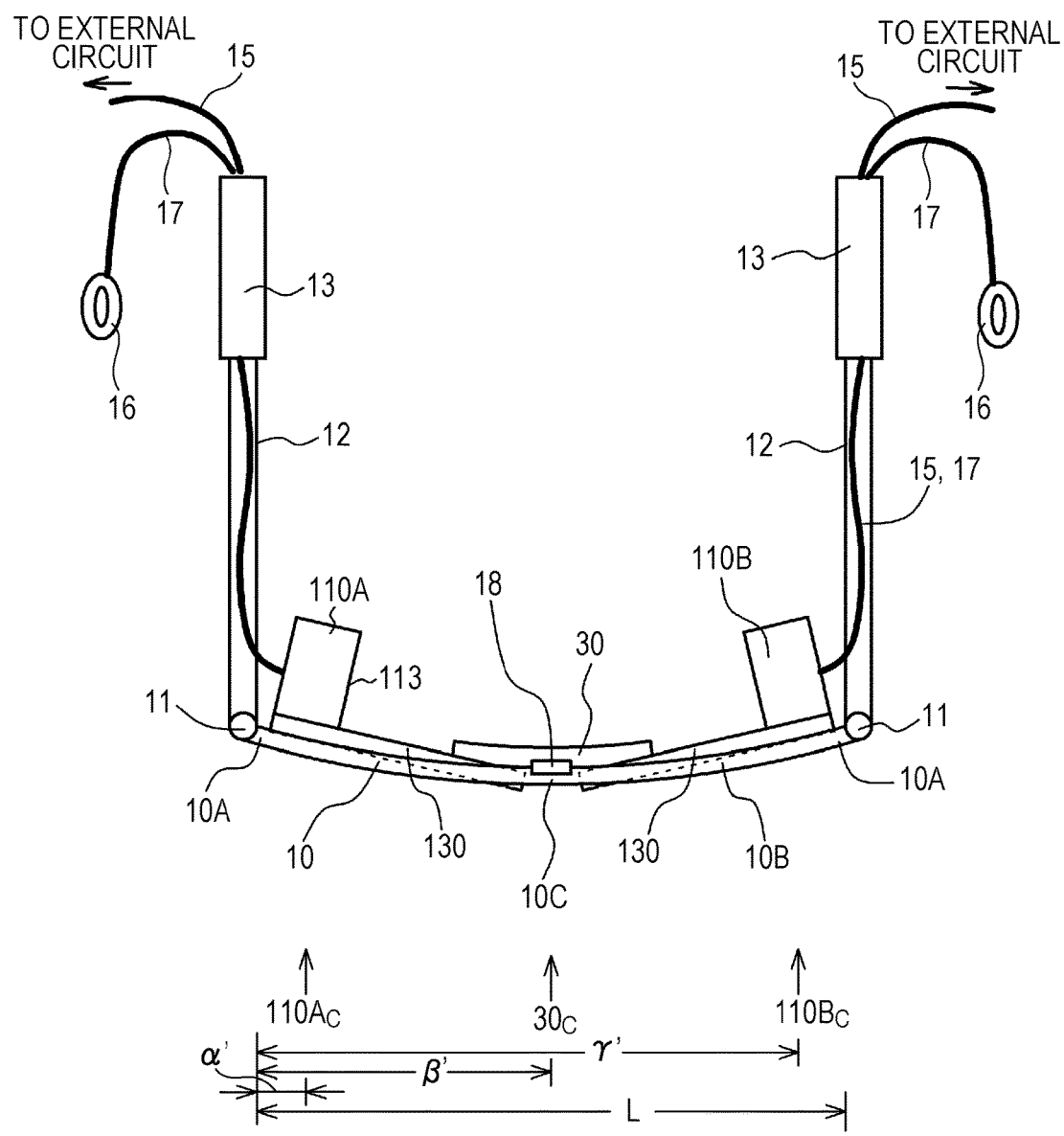
FIG. 33 is a schematic diagram when the head mounted display of Example 8 is viewed from above.

The frame 10 includes a front section 10B which is disposed in front of the observer 40, two temple sections 12 mounted on both ends of the front section 10B through hinges 11 so as to be able to be turned, and an end cover section (also referred to as a tip cell, an earmuff, or an ear pad) 13 mounted on a tip end portion of each of the temple sections 12, and the coupling member 20 is mounted on the central portion 10C (equivalent to a bridge portion in normal glasses) of the front section 10B, which is located between the two pupils 41 of the observer 40. Then, a nose pad 14 is mounted on the side facing the observer 40 of the coupling member 20. In addition, in FIGS. 29 and 33, illustration of the nose pad 14 is omitted. The frame 10 and the coupling member 20 are made of metal or plastic, and the shape of the coupling member 20 is a curved rod shape.

In addition, a wiring (a signal line, a power line, or the like) 15 extending from the image generating device 110A on one side passes through the insides of the temple section 12 and the end cover section 13, extends from a tip end portion of the end cover section 13 to the outside, and is connected to an external circuit (not illustrated). In addition, each of the image generating devices 110A and 110B is provided with a headphone section 16, and a wiring for a headphone section 17 extending from each of the image generating devices 110A and 110B passes through the insides of the temple section 12 and the end cover section 13 and extends from the tip end portion of the end cover section 13 to the headphone section 16. More specifically, the wiring for a headphone section 17 extends from the tip end portion of the end cover section 13 to the headphone section 16 so as to wrap around the back side of the auricle (the external ear). With such a configuration, it is possible to provide a neat head mounted display without giving the impression that the headphone section 16 or the wiring for a headphone section 17 are disposed in a disorderly manner.

Further, an imaging device 18 which includes a solid-state image sensing device which is constituted by a CCD or a CMOS sensor and a lens (none of which is illustrate) is mounted on the central portion 10C of the front section 10B. Specifically, a through-hole is provided in the central portion 10C, a concave portion is provided at a portion of the coupling member 20 facing the through-hole provided in the central portion 10C, and the imaging device 18 is disposed in the concave portion. Light incident from the through-hole provided in the central portion 10C is condensed on the solid-state image sensing device by the lens. A signal from the solid-state image sensing device is transmitted to the image generating device 110A or the external circuit through a wiring (not illustrated) extending from the imaging device 18. In addition, the wiring passes between the coupling member 20 and the front section 10B and is connected to the image generating device 110A on one side. With such a configuration, it is possible to make it difficult to visually recognize the fact that the imaging device 18 is incorporated in the head mounted display.

In this manner, in the head mounted display (HMD) of Example 7, the coupling member 20 couples the two image display devices 100 together, and the coupling member 20 is mounted on the central portion 10C of the frame 10, which is located between the two pupils 41 of the observer 40. That is, a structure is not made in which each of the image display devices 100 is directly mounted on the frame 10. Therefore, when the observer 40 mounts the frame 10 on their head, a state is created where the temple sections 12 extend toward the outside, and as a result, even if the frame 10 is deformed, displacement (position change) of the image generating devices 110A and 110B due to such deformation of the frame 10 does not occur, and even if the displacement occurs, it is to a very small degree. Therefore, a change in an angle of convergence of left and right images can be reliably prevented. In addition, since it is not necessary to increase the rigidity of the front section 10B of the frame 10, an increase in the weight of the frame 10, a decrease in designability, and an increase in cost are not caused. Further, since the image display device 100 is not directly mounted on the glasses-type frame 10, it is possible to freely choose the design, the color, or the like of the frame 10 according to the observer's preference, a restriction against the design of the frame 10 is also small, and the degree of freedom in the design is high. In addition, when viewing the head mounted display from the front of the observer, the coupling member 20 is hidden by the frame 10. Therefore, high designability and design property can be provided to the head mounted display.

EXAMPLE 8

Figure 31:
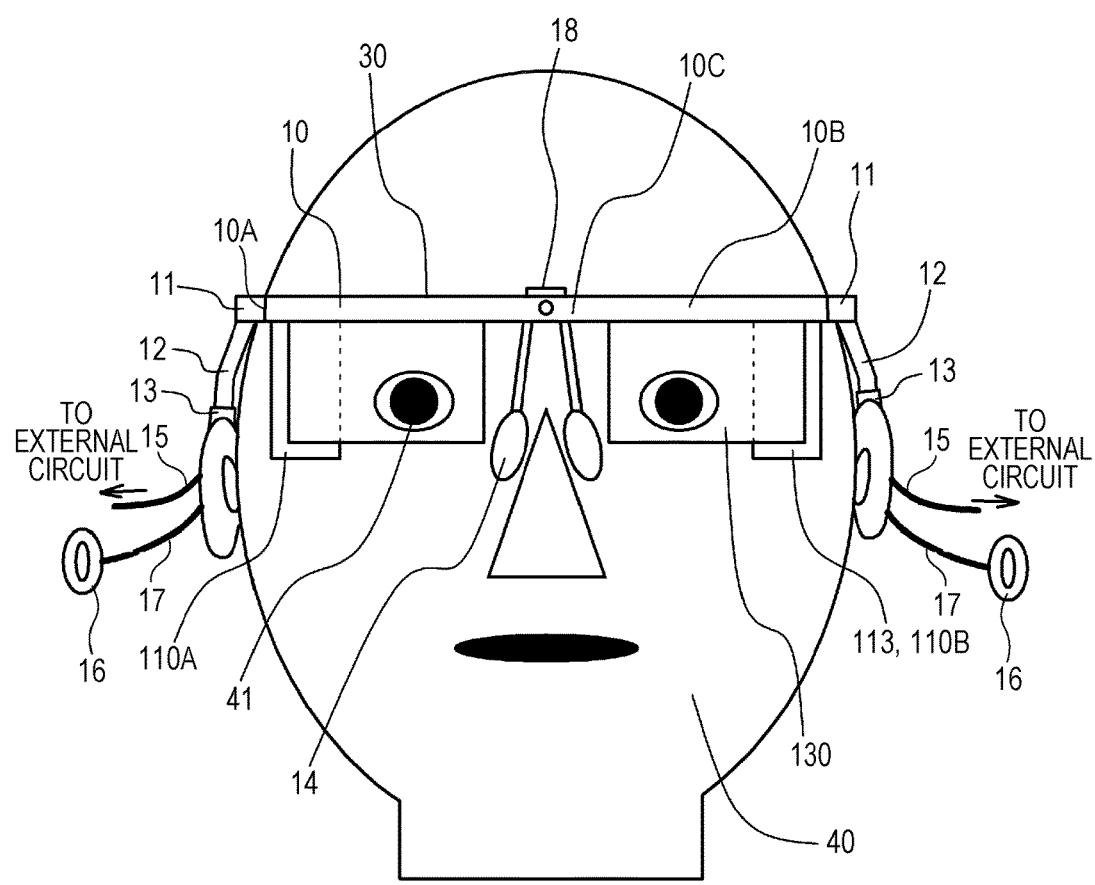
FIG. 31 is a schematic diagram when a head mounted display of Example 8 is viewed from the front.
Figure 32:
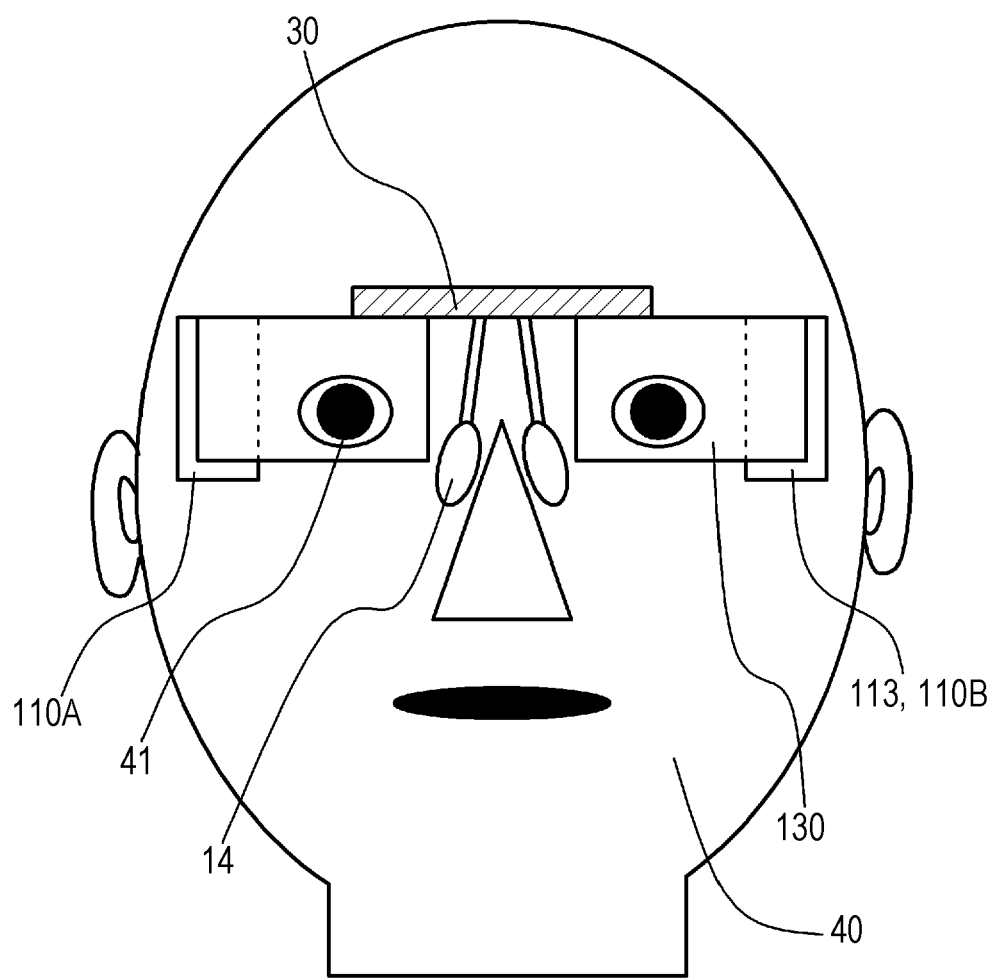
FIG. 32 is a schematic diagram when the head mounted display (however, in a state when it is assumed that a frame is removed) of Example 8 is viewed from the front.

Example 8 is a modification of Example 7. A schematic diagram when a head mounted display of Example 8 is viewed from the front is illustrated in FIG. 31, and a schematic diagram when the head mounted display (however, in a state when it is assumed that a frame is removed) of Example 8 is viewed from the front is illustrated in FIG. 32. Further, a schematic diagram when the head mounted display of Example 8 is viewed from above is illustrated in FIG. 33.

In the head mounted display of Example 8, a coupling member 30 having a rod shape is different from that in Example 7 and couples two light guide units 330 together, instead of coupling the two image generating devices 110A and 110B together. In addition, a form is also possible in which the two light guide units 330 are integrally fabricated and the coupling member 30 is mounted on the integrally fabricated light guide unit 330.

Here, also in the head mounted display of Example 8, the coupling member 30 is mounted on the central portion 10C of the frame 10, which is located between the two pupils 41 of the observer 40, by using, for example, a screw, each image generating device 110 is located further to the outside than the pupil 41 of the observer 40. In addition, each image generating device 110 is mounted on an end portion of the light guide unit 330. When a distance from a center $30_c$ of the coupling member 30 to one end portion of the frame 10 is set to be β and the length of the frame 10 is set to be L, a relationship of β=0.5×L is satisfied. In addition, also in Example 8, the value of α' and the value of γ' are the same values as the value of α and the value of γ in Example 7.

In Example 8, the frame 10 and each image display device have the same configurations and structures as those of the frame 10 and the image display device described in Example 7. Therefore, detailed description thereof is omitted. Further, since the head mounted display of Example 8 also has substantially the same configuration and structure as those of the head mounted display of Example 7 except for the differences described above, detailed description is omitted.

The present disclosure has been described above on the basis of preferred examples. However, the present disclosure is not limited to these examples. The configurations and structures of the image display devices and the optical devices described in the examples are for exemplification and can be appropriately changed. In the examples, the heights of the first A slope, the second A slope, and the first slope are set to be constant. However, in some cases, the heights of the first A slope, the second A slope, and the first slope may also be changed. Further, for example, a surface relief type hologram (refer to US Patent 20040062505A1) may also be disposed at the light guide plate. Further, in the light guide unit of Example 3 or 4, a configuration is also acceptable in which a first deflection section constituted by a transmission type hologram is disposed on the first surface 332 of the light guide plate 331 and a second deflection section constituted by a reflection type hologram is disposed on the second surface 333. In such a configuration, light incident on the first deflection section is diffracted, satisfies a total reflection condition in the light guide plate, and is propagated to the second deflection section. Then, the light is diffracted and reflected in the second deflection section and then emitted from the light guide plate. Further, in the light guide unit of Example 3 or 4, the diffraction grating element may also be constituted by a transmission type diffraction grating element, alternatively, a form is also acceptable in which any one of the first deflection section and the second deflection section is constituted by a reflection type diffraction grating element and the other is constituted by a transmission type diffraction grating element. Alternatively, the diffraction grating element may also be constituted by a reflection type blazed diffraction grating element or a surface relief type hologram. In the examples, exclusively, a binocular type provided with two image display devices is adopted. However, a monocular type provided with a single image display device may also be adopted.

Figure 34:
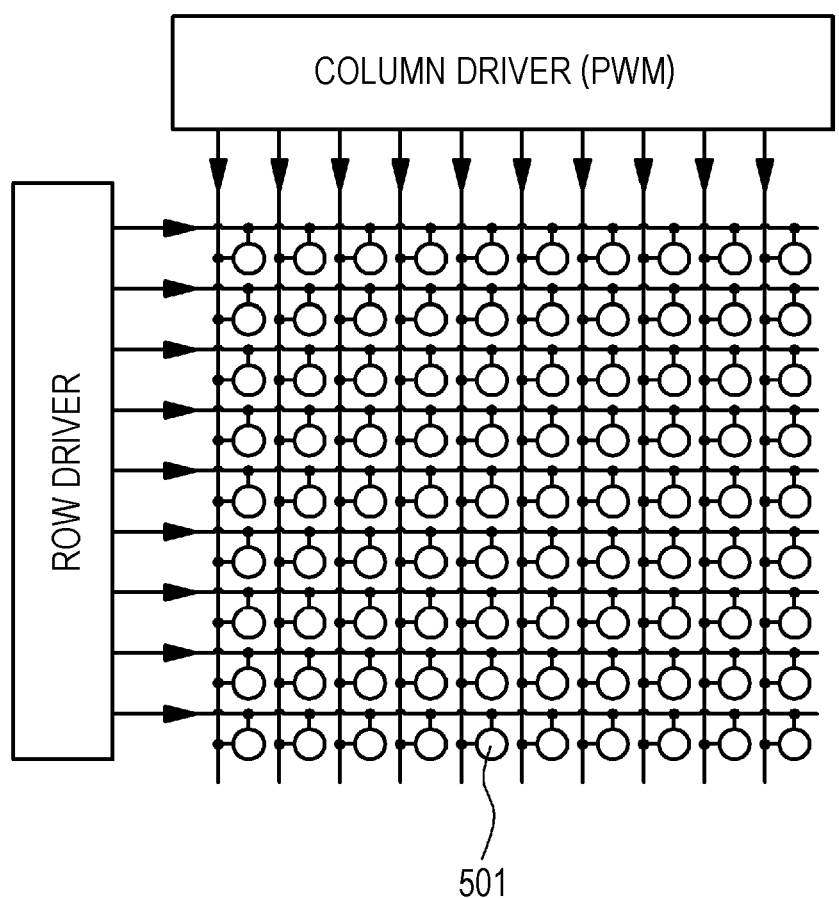
FIG. 34 is a conceptual diagram of a modified example of the image forming device suitable for use in Example 1 or 3.

As a modified example of the image forming device suitable for use in Examples 1 and 3, for example, an active matrix type image forming device, as illustrated as a conceptual diagram in FIG. 34, can also be adopted which is constituted by a light-emitting panel in which light-emitting elements 501 each constituted by a semiconductor light-emitting element are arranged in the form of a two-dimensional matrix and displays an image by making the luminescent states of the light-emitting elements 501 directly visible by controlling the luminescent/non-luminescent states of each of the light-emitting elements 501. Light emitted from this image forming device is incident on the light guide plate 131 or 331 through the collimating optical system 112 and the light beam extension device 70.

Figure 35:
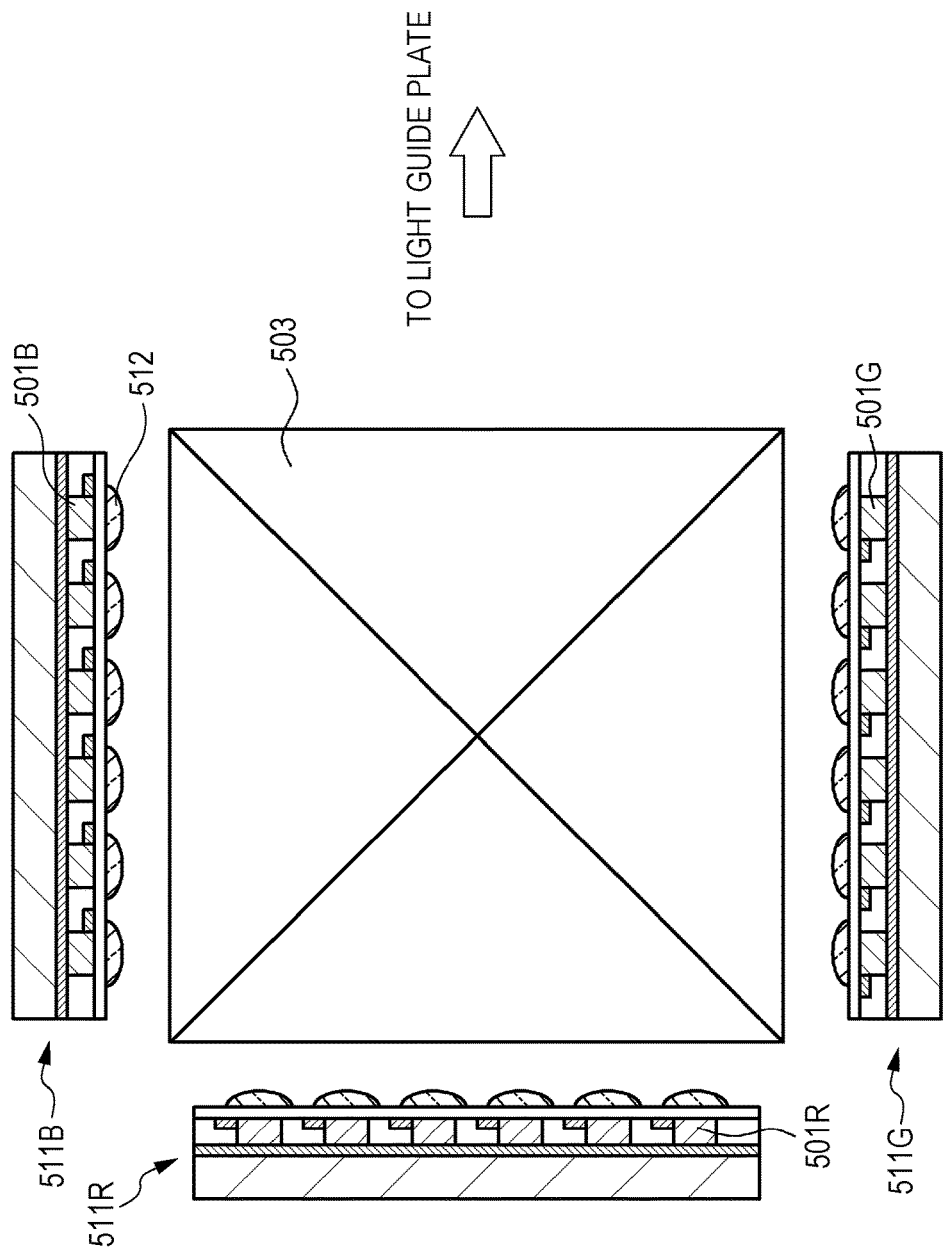
FIG. 35 is a conceptual diagram illustrating another modified example of the image forming device suitable for use in Example 1 or 3.

Alternatively, as illustrated as a conceptual diagram in FIG. 35, a color display image forming device is also adopted which includes (α) a red light-emitting panel 511R in which red light-emitting elements 501R emitting red light are arranged in the form of a two-dimensional matrix, (β) a green light-emitting panel 511G in which green light-emitting elements 501G emitting green light are arranged in the form of a two-dimensional matrix, (γ) a blue light-emitting panel 511B in which blue light-emitting elements 501B emitting blue light are arranged in the form of a two-dimensional matrix, and (δ) a unit (for example, a dichroic prism 503) collecting lights emitted from the red light-emitting panel 511R, the green light-emitting panel 511G, and the blue light-emitting panel 511B into a single optical path, and controls the luminescent/non-luminescent states of each of the red light-emitting element 501R, the green light-emitting element 501G, and the blue light-emitting element 501B. Light emitted from this image forming device is also incident on the light guide plate 131 or 331 through the collimating optical system 112 and the light beam extension device 70. In addition, reference numeral 512 denotes a microlens for condensing light emitted from the light-emitting element.

Figure 36:
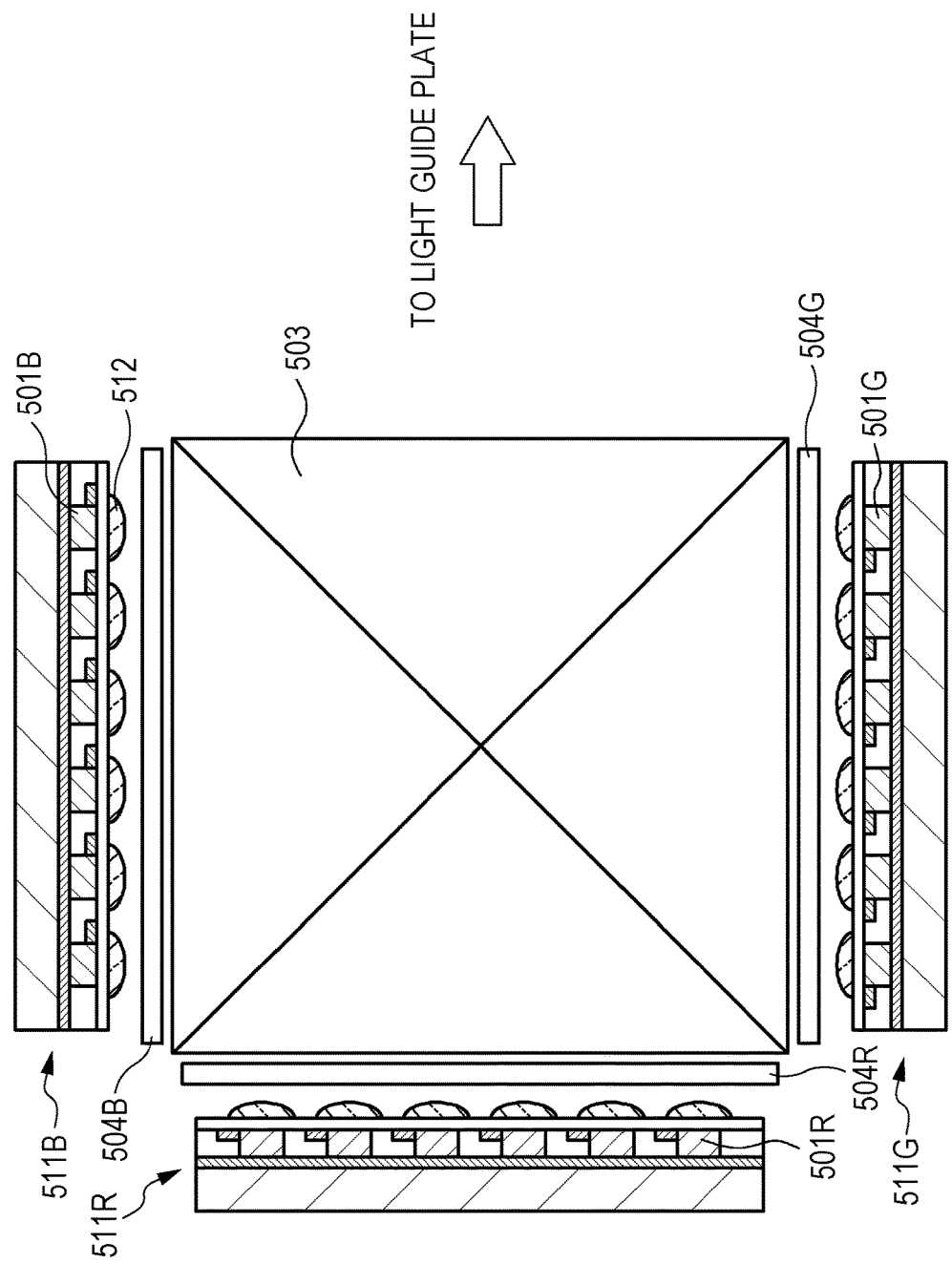
FIG. 36 is a conceptual diagram illustrating a further modified example of the image forming device suitable for use in Example 1 or 3.

Alternatively, a schematic diagram of an image forming device which includes the light-emitting panels 511R, 511G, and 511B in which the light-emitting elements 501R, 501G, and 501B are arranged in the form of a two-dimensional matrix, and the like is illustrated in FIG. 36. However, passage/non-passage of light emitted from each of the light-emitting panels 511R, 511G, and 511B is controlled by each of the light passage control devices 504R, 504G, and 504B and the lights are then incident on the dichroic prism 503, and thus the optical paths of these lights are collected into a single optical path, and the light is then incident on the light guide plate 131 or 331 through the collimating optical system 112 and the light beam extension device 70.

Figure 37:
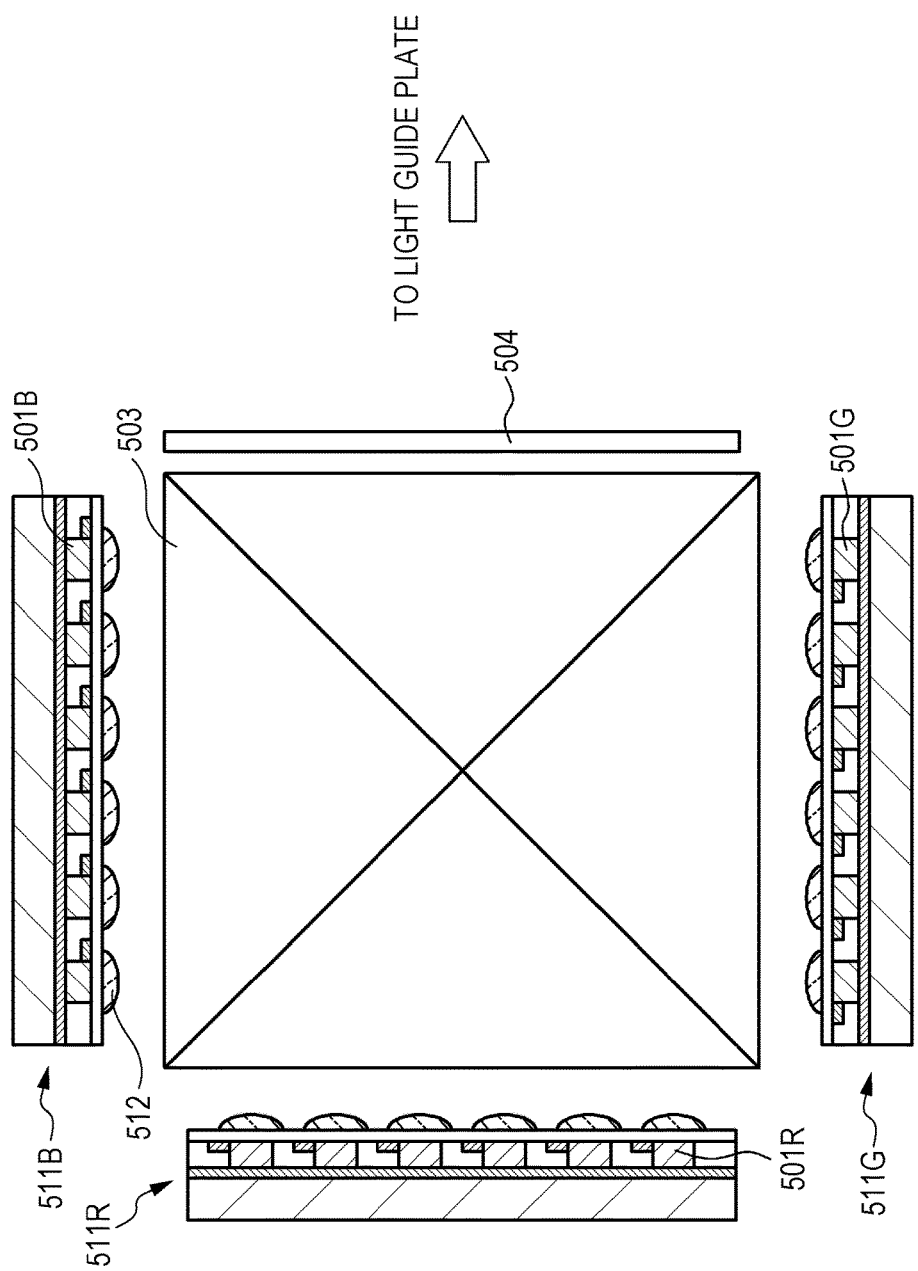
FIG. 37 is a conceptual diagram illustrating a further modified example of the image forming device suitable for use in Example 1 or 3.

Alternatively, a conceptual diagram of an image forming device which includes the light-emitting panels 511R, 511G, and 511B in which the light-emitting elements 501R, 501G, and 501B are arranged in the form of a two-dimensional matrix, and the like is illustrated in FIG. 37. However, lights emitted from the light-emitting panels 511R, 511G, and 511B are incident on the dichroic prism 503, and thus optical paths of these lights are collected into a single optical path, passage/non-passage of the light emitted from the dichroic prism 503 is controlled by a light passage control device 504, and the light is then incident on the light guide plate 131 or 331 through the collimating optical system 112 and the light beam extension device 70.

Figure 38:
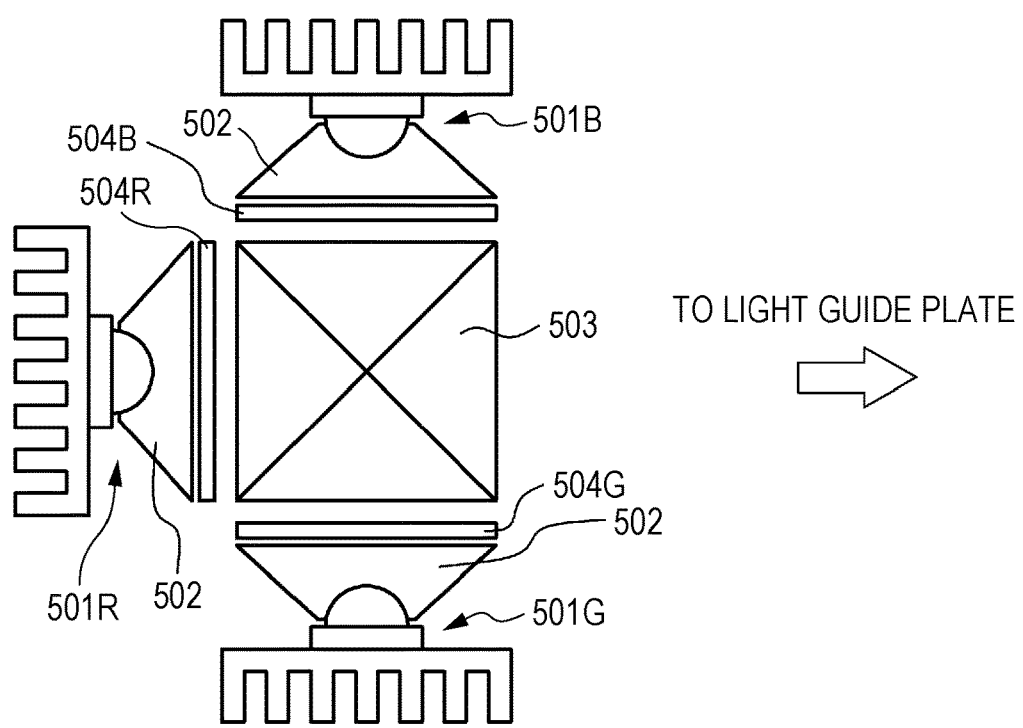
FIG. 38 is a conceptual diagram illustrating a further modified example of the image forming device suitable for use in Example 1 or 3.

Alternatively, as illustrated in FIG. 38, an image forming device can also be adopted which includes the light-emitting element 501R emitting red light, a light passage control device (for example, a liquid crystal display device 504R) that is a type of light valve for controlling passage/non-passage of the emitted light emitted from the light-emitting element 501R emitting red light, the light-emitting element 501G emitting green light, a light passage control device (for example, a liquid crystal display device 504G) that is a type of light valve for controlling passage/non-passage of the emitted light emitted from the light-emitting element 501G emitting green light, the light-emitting element 501B emitting blue light, a light passage control device (for example, a liquid crystal display device 504B) that is a type of light valve for controlling passage/non-passage of the emitted light emitted from the light-emitting element 501B emitting blue light, light guide members 502 which guide lights emitted from the light-emitting elements 501R, 501G, and 501B each made of a GaN-based semiconductor, and a unit (for example, the dichroic prism 503) collecting the lights into a single optical path.

Figure 39:
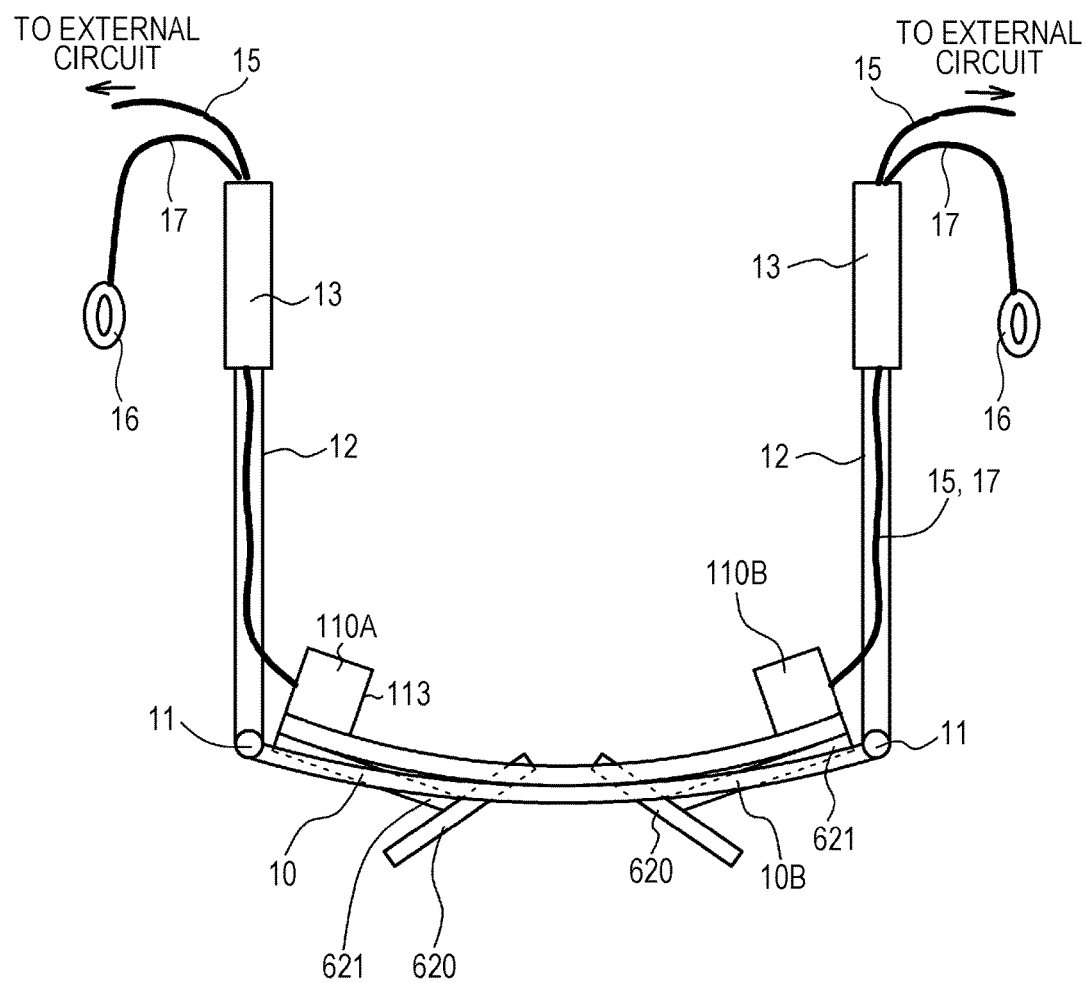
FIG. 39 is a schematic diagram when a modified example of the head mounted display of Example 7 is viewed from above.
Figure 40:
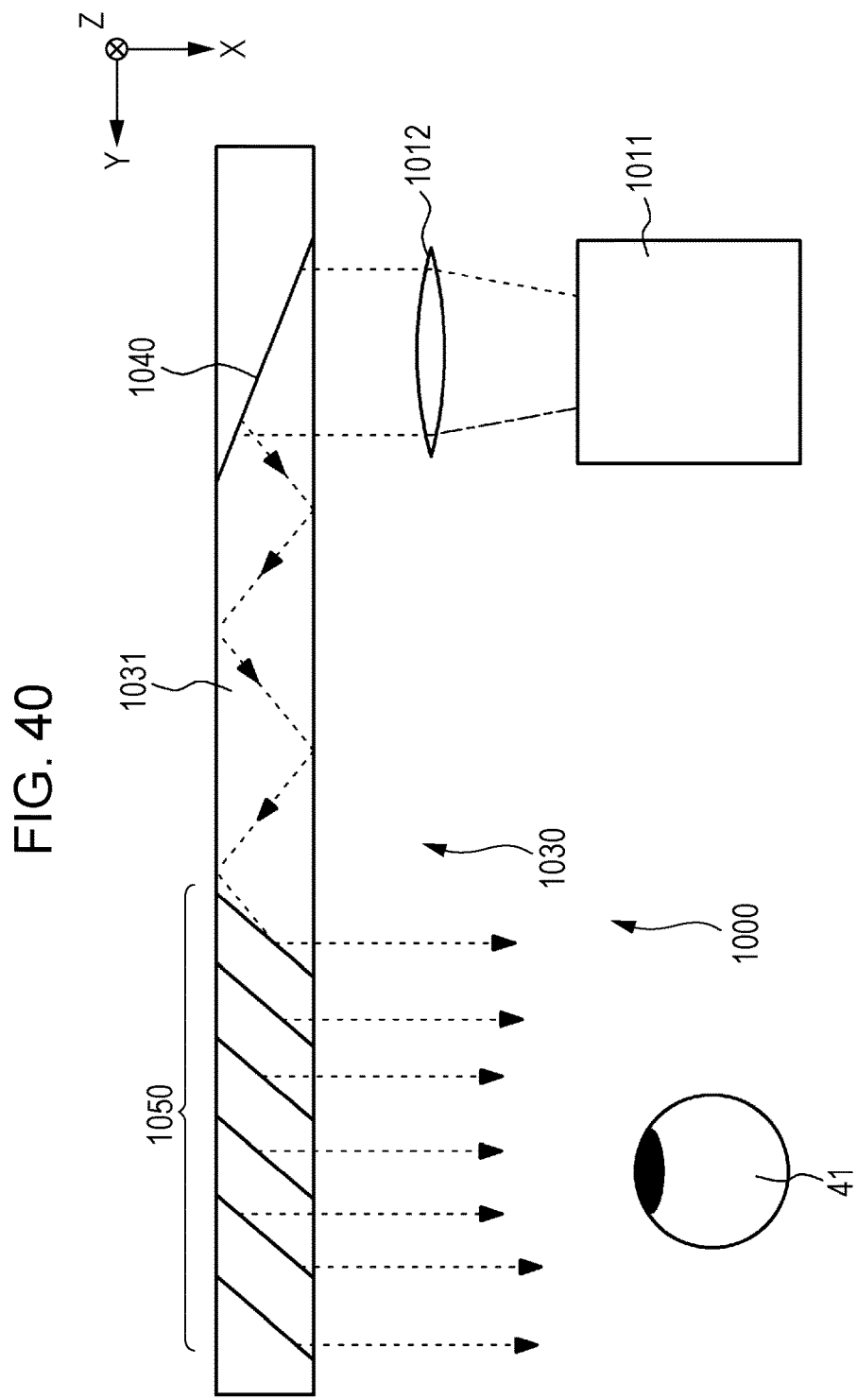
FIG. 40 is a conceptual diagram of an image display device in the related art.
Figure 41:
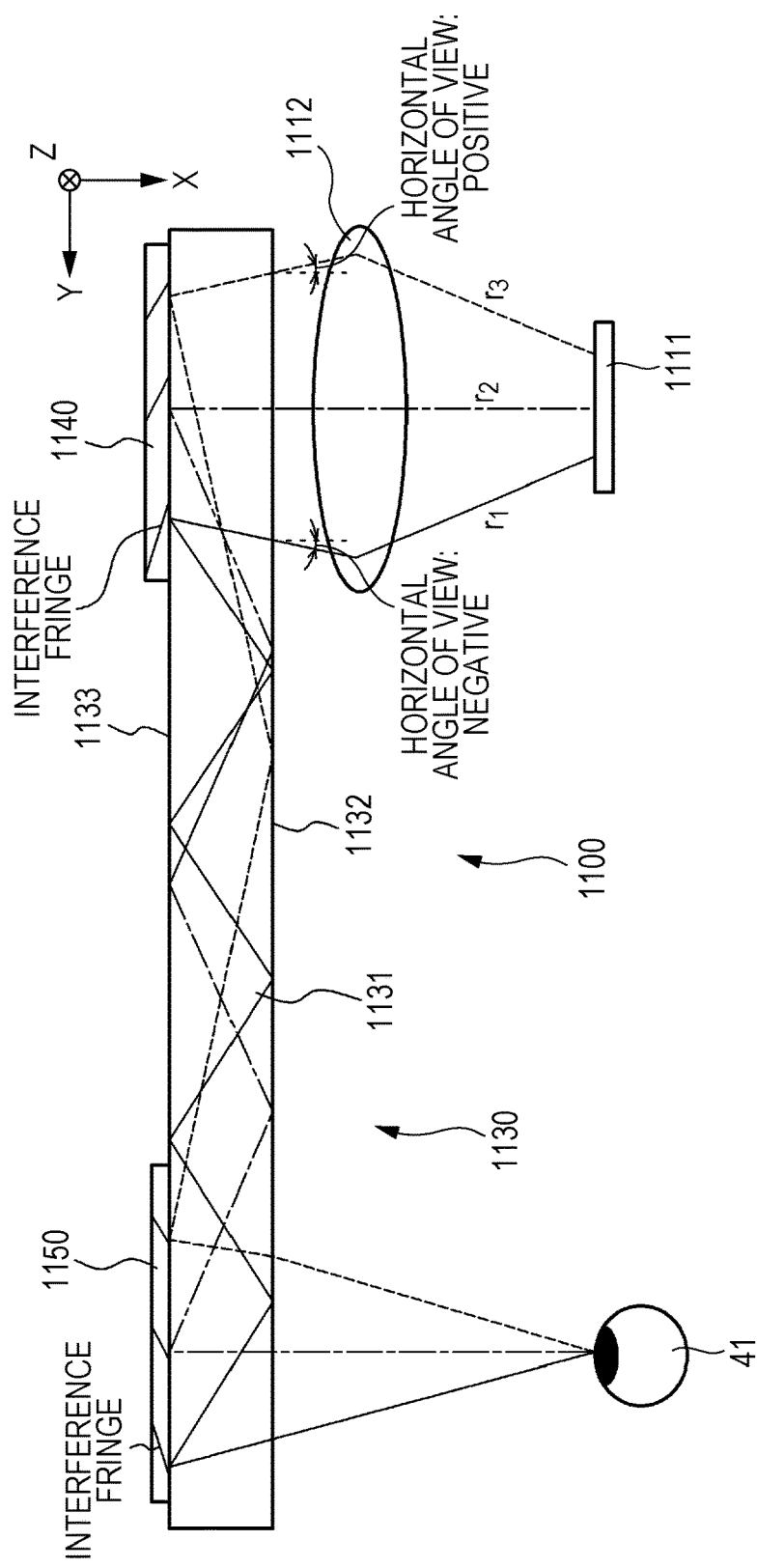
FIG. 41 is a conceptual diagram of an image display device in the related art of a different type from that illustrated in FIG. 40.
Figure 42:
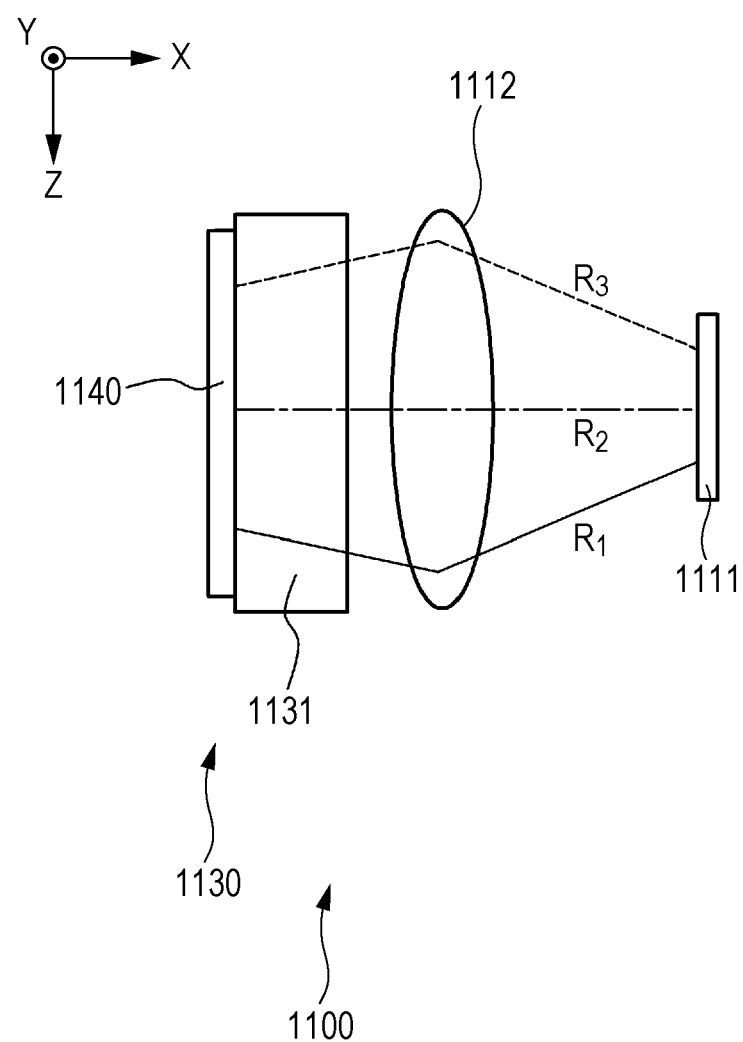
FIG. 42 is a conceptual diagram when the image display device in the related art of the type illustrated in FIG. 40 is viewed from a different direction from that illustrated in FIG. 41.

Alternatively, as illustrated in FIG. 39 illustrating a conceptual diagram of a modified example of the head mounted display of Example 7, a form can also be adopted in which the optical device is constituted by a semi-transmissive mirror 620 in which light emitted from the image generating device 110 is incident thereon and is emitted toward the pupil 41 of the observer. In addition, a structure is made in which the light emitted from the image generating device 110 is propagated in the inside of a transparent member 621 such as a glass plate or a plastic plate and is then incident on the semi-transmissive mirror 620. However, it is not limited thereto and a structure is also acceptable in which the light is propagated in the air and is then incident on the semi-transmissive mirror 620. The image generating device can adopt the image generating device 110 or 210 described in Example 1 or 2.

In addition, the present disclosure can also take the following configurations.

[1] Image Display Device: First Embodiment

An image display device including:

(A) an image generating device;

(B) a light guide unit in which light from the image generating device is incident thereon, is guided therein, and then emitted toward the pupil of an observer and which includes (B-1) a light guide plate in which incident light is propagated by total reflection in the inside and then emitted therefrom, (B-2) a first deflection section which is disposed at the light guide plate and deflects light incident on the light guide plate such that the light incident on the light guide plate is totally reflected in the inside of the light guide plate, and (B-3) a second deflection section which is disposed at the light guide plate and deflects the light propagated by total reflection in the inside of the light guide plate over multiple times so as to make the light propagated by total reflection in the inside of the light guide plate be emitted from the light guide plate; and (C) a light beam extension device which extends a light beam incident from the image generating device, along a Z direction when an incident direction of light which is incident on the light guide plate is set to be an X direction and a direction of propagation of light in the light guide plate is set to be a Y direction, and then emits the light beam to the light guide unit, wherein the light beam extension device includes a first reflecting mirror on which light from the image generating device is incident, and a second reflecting mirror on which light from the first reflecting mirror is incident and which emits the light to the light guide unit, a light reflecting surface of the first reflecting mirror has a first A slope and a first B slope which are continuously juxtaposed alternately, and a sawtooth-shaped cross-sectional shape, the top and the base of the first A slope are parallel and extend in the Z direction, in a pair of a first A slope and first B slope, an angle formed by the bottom of the first A slope and the bottom of the first B slope is 90 degrees and the length of the first A slope is shorter than the length of the first B slope, the height of the first A slope is constant, when an incidence angle of light on the first reflecting mirror is set to be $\eta_1$ (degrees), an angle of inclination of the first A slope is set to be $\zeta_1$ (degrees), and a direction of an incidence angle of light toward the first A slope side on the basis of the top of the first A slope is set to be a positive direction, a relationship of $2\zeta_1 - \eta_1 = 90 \pm 10$ is satisfied, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and when an incidence angle of light on the second reflecting mirror is set to be $\eta_2$ (degrees), an angle of inclination of the second A slope is set to be $\zeta_2$ (degrees), and a direction of an incidence angle of light toward the second A slope side on the basis of the top of the second A slope is set to be a positive direction, a relationship of $2\zeta_2 - \eta_2 = 90 \pm 10$ is satisfied.

[2] The image display device according to the above [1], wherein at least one planar reflecting member is provided between the image generating device and the first reflecting mirror, at least one planar reflecting member is provided between the first reflecting mirror and the second reflecting mirror, and one planar reflecting member provided between the image generating device and the first reflecting mirror doubles as one planar reflecting member provided between the first reflecting mirror and the second reflecting mirror.

[3] Image Display Device: Second Embodiment

An image display device including:

(A) an image generating device;

(B) a light guide unit in which light from the image generating device is incident thereon, is guided therein, and then emitted toward the pupil of an observer and which includes (B-1) a light guide plate in which incident light is propagated by total reflection in the inside and then emitted therefrom, (B-2) a first deflection section which is disposed at the light guide plate and deflects light incident on the light guide plate such that the light incident on the light guide plate is totally reflected in the inside of the light guide plate, and (B-3) a second deflection section which is disposed at the light guide plate and deflects the light propagated by total reflection in the inside of the light guide plate over multiple times so as to make the light propagated by total reflection in the inside of the light guide plate be emitted from the light guide plate; and (C) a light beam extension device which extends a light beam incident from the image generating device, along a Z direction when an incident direction of light which is incident on the light guide plate is set to be an X direction and a direction of propagation of light in the light guide plate is set to be a Y direction, and then emits the light beam to the light guide unit, wherein a light beam extension device includes a first reflecting mirror on which light from the image generating device is incident, and a second reflecting mirror on which light from the first reflecting mirror is incident and which emits the light to the light guide unit, a light reflecting surface of the first reflecting mirror has a first A slope and a first B slope which are continuously juxtaposed alternately, and a sawtooth-shaped cross-sectional shape, the top and the base of the first A slope are parallel and extend in the Z direction, in a pair of a first A slope and first B slope, an angle formed by the bottom of the first A slope and the bottom of the first B slope is 90 degrees and the length of the first A slope is shorter than the length of the first B slope, the height of the first A slope is constant, the value of a pitch between the apex of the first A slope and the apex of the first A slope at the center of the first reflecting mirror and the value of a pitch between the apex of the first A slope and the apex of the first A slope at an end portion of the first reflecting mirror are different from each other, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and the value of a pitch between the apex of the second A slope and the apex of the second A slope at the center of the second reflecting mirror and the value of a pitch between the apex of the second A slope and the apex of the second A slope at an end portion of the second reflecting mirror are different from each other.

[4] The image display device according to any one of the above [1] to [3], wherein when performing projection on a first A imaginary plane that is an imaginary plane orthogonal to the Z direction, the locus of light which is incident on the first reflecting mirror from the image generating device and the locus of light which is emitted from the first reflecting mirror are parallel, when performing projection on a first B imaginary plane that is an imaginary plane orthogonal to the normal to the first reflecting mirror, the locus of light which is incident on the first reflecting mirror from the image generating device and the locus of light which is emitted from the first reflecting mirror are symmetrical with respect to the first A imaginary plane, when performing projection on a second A imaginary plane that is an imaginary plane orthogonal to the Y direction, the locus of light which is incident on the second reflecting mirror from the first reflecting mirror and the locus of light which is emitted from the second reflecting mirror are parallel, and when performing projection on a second B imaginary plane that is an imaginary plane orthogonal to the normal to the second reflecting mirror, the locus of light which is incident on the second reflecting mirror from the first reflecting mirror and the locus of light which is emitted from the second reflecting mirror are symmetrical with respect to the second A imaginary plane.

[5] The image display device according to the above [4], wherein an optical path length of light which is emitted from the center of the image generating device and is incident on the first reflecting mirror and an optical path length of light which is light emitted from the center of the image generating device and is emitted from the first reflecting mirror, is incident on the second reflecting mirror, is emitted from the second reflecting mirror, and is incident on the light guide unit are equal to each other.

[6] The image display device according to the above [5], wherein the size along the Y direction of a light beam which is emitted from the image generating device is equal to the size along the Y direction of a light beam which is incident on the light guide unit.

[7] The image display device according to any one of the above [4] to [6], wherein the size along the Z direction of the light beam which is incident on the light guide unit is larger than the size along the Z direction of the light beam which is emitted from the image generating device.

[8] The image display device according to the above [7], wherein the size along the Z direction of a light beam which is emitted from the light guide unit is equal to the size along the Z direction of the light beam which is emitted from the image generating device.

[9] The image display device according to any one of the above [1] to [8], wherein the image generating device includes (A-1) an image forming device having a plurality of pixels arranged in the form of a two-dimensional matrix, and (A-2) a collimating optical system which turns light emitted from each pixel of the image forming device into collimated light, and light from the collimating optical system is incident on the first reflecting mirror.

[10] The image display device according to any one of the above [1] to [8], wherein the image generating device includes (A-1) a light source, (A-2) a collimating optical system which turns light emitted from the light source into collimated light, (A-3) a scanning unit which performs scanning with the collimated light emitted from the collimating optical system, and (A-4) a relay optical system which relays the collimated light irradiated from the scanning unit, and light from the relay optical system is incident on the first reflecting mirror.

[11] Image Display Device: Third Embodiment

An image display device including:

(A) an image generating device;

(B) a light guide unit in which light from the image generating device is incident thereon, is guided therein, and then emitted toward the pupil of an observer and which includes (B-1) a light guide plate in which incident light is propagated by total reflection in the inside and then emitted therefrom, (B-2) a first deflection section which is disposed at the light guide plate and deflects light incident on the light guide plate such that the light incident on the light guide plate is totally reflected in the inside of the light guide plate, and (B-3) a second deflection section which is disposed at the light guide plate and deflects the light propagated by total reflection in the inside of the light guide plate over multiple times so as to make the light propagated by total reflection in the inside of the light guide plate be emitted from the light guide plate; and (C) a light beam extension device which extends a light beam incident from the image generating device, along a Z direction when an incident direction of light which is incident on the light guide plate is set to be an X direction and a direction of propagation of light in the light guide plate is set to be a Y direction, and then emits the light beam to the light guide unit, wherein the light beam extension device includes a first reflecting mirror and a second reflecting mirror, the first reflecting mirror is located on the side opposite to the image generating device across the light guide unit, the second reflecting mirror is located on the image generating device side on the basis of the light guide unit, some of the light emitted from the image generating device passes through the light guide plate and the first deflecting section, is reflected by the first reflecting mirror, passes through the light guide plate and the first deflecting section, and is reflected by the second reflecting mirror, and passage of some of the light through the light guide plate and the first deflection section is repeated the predetermined number of times, a light reflecting surface of the first reflecting mirror has a first A slope and a first B slope which are continuously juxtaposed alternately, and a sawtooth-shaped cross-sectional shape, the top and the base of the first A slope are parallel and extend in the Y direction, in a pair of a first A slope and first B slope, an angle formed by the bottom of the first A slope and the bottom of the first B slope is 90 degrees and the length of the first A slope is shorter than the length of the first B slope, the height of the first A slope is constant, when an incidence angle of light on the first reflecting mirror is set to be $\eta_1$ (degrees), an angle of inclination of the first A slope is set to be $\zeta_1$ (degrees), and a direction of an incidence angle of light toward the first A slope side on the basis of the top of the first A slope is set to be a positive direction, a relationship of $2\zeta_1-\eta_1=90\pm10$ is satisfied, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and when an incidence angle of light on the second reflecting mirror is set to be $\eta_2$ (degrees), an angle of inclination of the second A slope is set to be $\zeta_2$ (degrees), and a direction of an incidence angle of light toward the second A slope side on the basis of the top of the second A slope is set to be a positive direction, a relationship of $2\zeta_2-\eta_2=90\pm10$ is satisfied.

[12] Image Display Device: Fourth Embodiment

An image display device including:

(A) an image generating device;

(B) a light guide unit in which light from the image generating device is incident thereon, is guided therein, and then emitted toward the pupil of an observer and which includes (B-1) a light guide plate in which incident light is propagated by total reflection in the inside and then emitted therefrom, (B-2) a first deflection section which is disposed at the light guide plate and deflects light incident on the light guide plate such that the light incident on the light guide plate is totally reflected in the inside of the light guide plate, and (B-3) a second deflection section which is disposed at the light guide plate and deflects the light propagated by total reflection in the inside of the light guide plate over multiple times so as to make the light propagated by total reflection in the inside of the light guide plate be emitted from the light guide plate; and (C) a light beam extension device which extends a light beam incident from the image generating device, along a Z direction when an incident direction of light which is incident on the light guide plate is set to be an X direction and a direction of propagation of light in the light guide plate is set to be a Y direction, and then emits the light beam to the light guide unit, wherein the light beam extension device includes a first reflecting mirror and a second reflecting mirror, the first reflecting mirror is located on the side opposite to the image generating device across the light guide unit, the second reflecting mirror is located on the image generating device side on the basis of the light guide unit, some of the light emitted from the image generating device passes through the light guide plate and the first deflecting section, is reflected by the first reflecting mirror, passes through the light guide plate and the first deflecting section, and is reflected by the second reflecting mirror, and passage of some of the light through the light guide plate and the first deflection section is repeated the predetermined number of times, a light reflecting surface of the first reflecting mirror has a first A slope and a first B slope which are continuously juxtaposed alternately, and a sawtooth-shaped cross-sectional shape, the top and the base of the first A slope are parallel and extend in the Y direction, in a pair of a first A slope and first B slope, an angle formed by the bottom of the first A slope and the bottom of the first B slope is 90 degrees and the length of the first A slope is shorter than the length of the first B slope, the height of the first A slope is constant, the value of a pitch between the apex of the first A slope and the apex of the first A slope at the center of the first reflecting mirror and the value of a pitch between the apex of the first A slope and the apex of the first A slope at an end portion of the first reflecting mirror are different from each other, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and the value of a pitch between the apex of the second A slope and the apex of the second A slope at the center of the second reflecting mirror and the value of a pitch between the apex of the second A slope and the apex of the second A slope at an end portion of the second reflecting mirror are different from each other.

[13] Optical Device: First Embodiment

An optical device including:

a light guide unit which includes a light guide plate in which light incident from a light source is propagated by total reflection in the inside and then emitted therefrom, a first deflection section which is disposed at the light guide plate and deflects light incident on the light guide plate such that the light incident on the light guide plate is totally reflected in the inside of the light guide plate, and a second deflection section which is disposed at the light guide plate and deflects the light propagated by total reflection in the inside of the light guide plate over multiple times so as to make the light propagated by total reflection in the inside of the light guide plate be emitted from the light guide plate; and a light beam extension device which extends a light beam incident from the light source, along a Z direction when an incident direction of light which is incident on the light guide plate is set to be an X direction and a direction of propagation of light in the light guide plate is set to be a Y direction, and then emits the light beam to the light guide unit, wherein the light beam extension device includes a first reflecting mirror on which light from the light source is incident, and a second reflecting mirror on which light from the first reflecting mirror is incident and which emits the light to the light guide unit, a light reflecting surface of the first reflecting mirror has a first A slope and a first B slope which are continuously juxtaposed alternately, and a sawtooth-shaped cross-sectional shape, the top and the base of the first A slope are parallel and extend in the Z direction, in a pair of a first A slope and first B slope, an angle formed by the bottom of the first A slope and the bottom of the first B slope is 90 degrees and the length of the first A slope is shorter than the length of the first B slope, the height of the first A slope is constant, when an incidence angle of light on the first reflecting mirror is set to be $\eta_1$ (degrees), an angle of inclination of the first A slope is set to be $\zeta_1$ (degrees), and a direction of an incidence angle of light toward the first A slope side on the basis of the top of the first A slope is set to be a positive direction, a relationship of $2\zeta_1 - \eta_1 = 90 \pm 10$ is satisfied, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and when an incidence angle of light on the second reflecting mirror is set to be $\eta_2$ (degrees), an angle of inclination of the second A slope is set to be $\zeta_2$ (degrees), and a direction of an incidence angle of light toward the second A slope side on the basis of the top of the second A slope is set to be a positive direction, a relationship of $2\zeta_2 - \eta_2 = 90 \pm 10$ is satisfied.

[14] The optical device according to the above [13], wherein at least one planar reflecting member is provided between the light source and the first reflecting mirror, at least one planar reflecting member is provided between the first reflecting mirror and the second reflecting mirror, and one planar reflecting member provided between the light source and the first reflecting mirror doubles as one planar reflecting member provided between the first reflecting mirror and the second reflecting mirror.

[15] Optical Device: Second Embodiment

An optical device including:

a light guide unit which includes a light guide plate in which light incident from a light source is propagated by total reflection in the inside and then emitted therefrom, a first deflection section which is disposed at the light guide plate and deflects light incident on the light guide plate such that the light incident on the light guide plate is totally reflected in the inside of the light guide plate, and a second deflection section which is disposed at the light guide plate and deflects the light propagated by total reflection in the inside of the light guide plate over multiple times so as to make the light propagated by total reflection in the inside of the light guide plate be emitted from the light guide plate; and a light beam extension device which extends a light beam incident from the light source, along a Z direction when an incident direction of light which is incident on the light guide plate is set to be an X direction and a direction of propagation of light in the light guide plate is set to be a Y direction, and then emits the light beam to the light guide unit, wherein the light beam extension device includes a first reflecting mirror on which light from the light source is incident, and a second reflecting mirror on which light from the first reflecting mirror is incident and which emits the light to the light guide unit, a light reflecting surface of the first reflecting mirror has a first A slope and a first B slope which are continuously juxtaposed alternately, and a sawtooth-shaped cross-sectional shape, the top and the base of the first A slope are parallel and extend in the Z direction, in a pair of a first A slope and first B slope, an angle formed by the bottom of the first A slope and the bottom of the first B slope is 90 degrees and the length of the first A slope is shorter than the length of the first B slope, the height of the first A slope is constant, the value of a pitch between the apex of the first A slope and the apex of the first A slope at the center of the first reflecting mirror and the value of a pitch between the apex of the first A slope and the apex of the first A slope at an end portion of the first reflecting mirror are different from each other, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and the value of a pitch between the apex of the second A slope and the apex of the second A slope at the center of the second reflecting mirror and the value of a pitch between the apex of the second A slope and the apex of the second A slope at an end portion of the second reflecting mirror are different from each other.

[16] Light Beam Extension Device: First Embodiment

A light beam extension device including: a first reflecting mirror which is disposed between a light source and an irradiated surface and on which light from the light source is incident; and a second reflecting mirror on which light from the first reflecting mirror is incident and which emits the light to the irradiated surface, wherein a light reflecting surface of the first reflecting mirror has a first A slope and a first B slope which are continuously juxtaposed alternately, and a sawtooth-shaped cross-sectional shape, the top and the base of the first A slope are parallel and extend in the Z direction, in a pair of a first A slope and first B slope, an angle formed by the bottom of the first A slope and the bottom of the first B slope is 90 degrees and the length of the first A slope is shorter than the length of the first B slope, the height of the first A slope is constant, when an incidence angle of light on the first reflecting mirror is set to be $\eta_1$ (degrees), an angle of inclination of the first A slope is set to be $\zeta_1$ (degrees), and a direction of an incidence angle of light toward the first A slope side on the basis of the top of the first A slope is set to be a positive direction, a relationship of $2\zeta_1-\eta_1=90\pm10$ is satisfied, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and when an incidence angle of light on the second reflecting mirror is set to be $\eta_2$ (degrees), an angle of inclination of the second A slope is set to be $\zeta_2$ (degrees), and a direction of an incidence angle of light toward the second A slope side on the basis of the top of the second A slope is set to be a positive direction, a relationship of $2\zeta_2-\eta_2=90\pm10$ is satisfied.

[17] Light Beam Extension Device: Second Embodiment

A light beam extension device including: a first reflecting mirror which is disposed between a light source and an irradiated surface and on which light from the light source is incident; and a second reflecting mirror on which light from the first reflecting mirror is incident and which emits the light to the irradiated surface, wherein a light reflecting surface of the first reflecting mirror has a first A slope and a first B slope which are continuously juxtaposed alternately, and a sawtooth-shaped cross-sectional shape, the top and the base of the first A slope are parallel and extend in the Z direction, in a pair of a first A slope and first B slope, an angle formed by the bottom of the first A slope and the bottom of the first B slope is 90 degrees and the length of the first A slope is shorter than the length of the first B slope, the height of the first A slope is constant, the value of a pitch between the apex of the first A slope and the apex of the first A slope at the center of the first reflecting mirror and the value of a pitch between the apex of the first A slope and the apex of the first A slope at an end portion of the first reflecting mirror are different from each other, a light reflecting surface of the second reflecting mirror has a second A slope and a second B slope which are continuously juxtaposed alternately, and a sawtooth-shaped cross-sectional shape, the top and the base of the second A slope are parallel and extend in the Y direction, in a pair of a second A slope and second B slope, an angle formed by the bottom of the second A slope and the bottom of the second B slope is 90 degrees and the length of the second A slope is shorter than the length of the second B slope, the height of the second A slope is constant, and the value of a pitch between the apex of the second A slope and the apex of the second A slope at the center of the second reflecting mirror and the value of a pitch between the apex of the second A slope and the apex of the second A slope at an end portion of the second reflecting mirror are different from each other.

[18] Light Reflecting Member: First Embodiment

A light reflecting member having a light reflecting surface in which a first slope and a second slope are continuously juxtaposed alternately and a cross-sectional shape is a sawtooth shape, wherein the top and the base of the first slope are parallel, in a pair of a first slope and second slope, an angle formed by the bottom of the first slope and the bottom of the second slope is 90 degrees and the length of the first slope is shorter than the length of the second slope, the height of the first slope is constant, when an incidence angle of light on the light reflecting member is set to be $\eta$ (degrees), an angle of inclination of the first slope is set to be $\zeta$ (degrees), and a direction of an incidence angle of light toward the first slope side on the basis of the top of the first slope is set to be a positive direction, a relationship of $2\zeta-\eta=90\pm10$ is satisfied, and when performing projection on an imaginary plane orthogonal to the extending directions of the top and the base of the first slope, the locus of light which is incident on the first slope and the locus of light which is emitted from the second slope are parallel.

[19] Light Reflecting Member: Second Embodiment

A light reflecting member having a light reflecting surface in which a first slope and a second slope are continuously juxtaposed alternately and a cross-sectional shape is a sawtooth shape, wherein the top and the base of the first slope are parallel, in a pair of a first slope and second slope, an angle formed by the bottom of the first slope and the bottom of the second slope is 90 degrees and the length of the first slope is shorter than the length of the second slope, the height of the first slope is constant, the value of a pitch between the apex of the first slope and the apex of the first slope at the center of the light reflecting member and the value of a pitch between the apex of the first slope and the apex of the first slope at an end portion of the light reflecting member are different from each other, and when performing projection on an imaginary plane orthogonal to the extending directions of the top and the base of the first slope, the locus of light which is incident on the first slope and the locus of light which is emitted from the second slope are parallel.

[20] Image Display Device: Fifth Embodiment

An image display device including:

an image generating device;

a light guide unit in which light from the image generating device is incident thereon, is guided therein, and then emitted therefrom; and a first reflecting mirror, wherein the first reflecting mirror is disposed in an optical path between the image generating device and the light guide unit, and a cross-section of the first reflecting mirror has at at least one portion thereof a sawtooth shape which is constituted by two sides having different lengths.

The present disclosure contains subject matter related to that disclosed in Japanese Priority Patent Application JP 2011-261282 filed in the Japan Patent Office on Nov. 30, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
   an image generating device;
   a light guide unit arranged to guide light provided by the image generating device and to emit the guided light; and
   a reflecting mirror, having a first area, a second area, and a central area, disposed in an optical path between the image generating device and the light guide unit, wherein:
      at least a portion of a cross-section of the reflecting mirror has a substantially sawtooth shape;
      the central area is adjacent to the first area on a first edge and adjacent to the second area on a second edge;
      a first side of the substantially sawtooth shape has a first slope, and is disposed in the first area adjacent to the first edge;
      a second side of the substantially sawtooth shape has a second slope different from the first slope, and is disposed in the first area adjacent to the first side at a recessed portion of the substantially sawtooth shape at a 90 degree angle;
      a third side of the substantially sawtooth shape has a third slope, and is disposed in the second area adjacent to the second edge;
      a fourth side of the substantially sawtooth shape has a fourth slope different from the third slope, and is disposed in the second area adjacent to the third side at a recessed portion of the substantially sawtooth shape at a 90 degree angle;
      the first side has a first length and the second side has a second length, wherein the first length is greater than the second length; and
      the third side has a third length and the fourth side has a fourth length, wherein the third length is greater than the fourth length.

2. The image display device of claim 1, wherein the light guide unit includes a light guide plate configured to propagate light incident thereon by total reflection inside the light guide plate, and configured to emit the propagated light.

3. The image display device of claim 2, wherein the light guide unit includes a first deflection section disposed at the light guide plate and configured to deflect light incident on the light guide plate such that the light incident on the light guide plate is totally reflected inside the light guide plate.

4. The image display device of claim 2, wherein the light guide unit includes a second deflection section disposed at the light guide plate and configured to deflect the light propagated by total reflection inside the light guide plate two or more times such that the light propagated by total reflection inside the light guide plate is emitted from the light guide plate.

5. The image display device of claim 1, comprising a light beam extension device configured to extend a light beam provided by the image generating device along a first direction and configured to provide the light beam to the light guide unit, wherein the light beam is incident on the light guide unit from a second direction substantially orthogonal to the first direction, and wherein a direction of propagation of light inside the light guide unit is a third direction substantially orthogonal to the first and second directions.

6. The image display device of claim 5, wherein the light beam extension device includes the reflecting mirror, and wherein light provided by the image generating device is incident on the reflecting mirror.

7. The image display device of claim 6, wherein the first slope extends between a protruding portion of the light reflecting surface and a recessed portion of the light reflecting surface, and wherein the protruding and recessed portions of the light reflecting surface extend in the first direction and are parallel in the first direction.

8. The image display device of claim 6, wherein the substantially sawtooth shape has a plurality of the first sides alternately juxtaposed with a respective plurality of the second sides, and wherein the first sides have a same height.

9. The image display device of claim 6, wherein when an incidence angle of light on the reflecting mirror is set to be $\eta_1$ (degrees), an angle of inclination of the first slope is set to be $\zeta_1$ (degrees), and a direction of an incidence angle of light toward a side of the first slope on a basis of a top of the first slope is set to be a positive direction, a relationship of $2\zeta_1 - \eta_1 = 90 \pm 10$ is satisfied.

10. The image display device of claim of claim 6, wherein a value of a first pitch between an apex of a first substantially sawtooth shape and an apex of a second substantially sawtooth shape, the first and second substantially sawtooth shapes being adjacent to each other and at a center of the reflecting mirror, differs from a value of a second pitch between an apex of a third substantially sawtooth shape and an apex of a fourth substantially sawtooth shape, the third and fourth substantially sawtooth shapes being adjacent to each other and at an end portion of the reflecting mirror.

11. The image display device of claim 6, wherein the reflecting mirror is a first reflecting mirror, wherein the light beam extension device includes a second reflecting mirror, wherein the first reflecting mirror is arranged to provide light incident on the second reflecting mirror, and wherein the second reflecting mirror is arranged to provide light to the light guide unit.

12. The image display device of claim 11, further comprising at least one planar reflecting member disposed between the first reflecting mirror and the second reflecting mirror.

13. The image display device of claim 5, wherein the light beam extension device includes the reflecting mirror, and wherein the reflecting mirror is arranged to provide light to the light guide unit.

14. The image display device of claim 13, wherein the first slope extends between a protruding portion of the light reflecting surface and a recessed portion of the light reflecting surface, and wherein the protruding and recessed portions of the light reflecting surface extend in the third direction and are parallel in the third direction.

15. The image display device of claim 13, wherein the substantially sawtooth shape has a plurality of the first sides alternately juxtaposed with a respective plurality of the second sides, and wherein the first sides have a same height.

16. The image display device of claim 13, wherein when an incidence angle of light on the reflecting mirror is set to be $\eta_2$ (degrees), an angle of inclination of the second slope is set to be $\zeta_2$ (degrees), and a direction of an incidence angle of light toward a side of the second slope on a basis of a top of the second slope is set to be a positive direction, a relationship of $2\eta_2 - \zeta_2 = 90 \pm 10$ is satisfied.

17. The image display device of claim of claim 13, wherein a value of a first pitch between an apex of a first substantially sawtooth shape and an apex of a second substantially sawtooth shape, the first and second substantially sawtooth shapes being adjacent to each other and at a center of the reflecting mirror, differs from a value of a second pitch between an apex of a third substantially sawtooth shape and an apex of a fourth substantially sawtooth shape, the third and fourth substantially sawtooth shapes being adjacent to each other and at an end portion of the reflecting mirror.

18. The image display device of claim 1, further comprising at least one planar reflecting member disposed between the image generating device and the reflecting mirror.

* * * * *